United States Patent
Zaher et al.

(10) Patent No.: US 9,962,623 B2
(45) Date of Patent: May 8, 2018

(54) PROCESS TO REMOVE PRODUCT ALCOHOLS FROM FERMENTATION BROTH

(71) Applicant: BUTAMAX ADVANCED BIOFUELS LLC, Wilmington, DE (US)

(72) Inventors: Joseph J. Zaher, Newark, DE (US); Steven Christopher Barr, West Chester, PA (US); Robert W. Sylvester, Newark, DE (US); Aidan Hurley, East Riding (GB)

(73) Assignee: Butamax Advanced Biofuels LLC, Wilmington, DE (US)

( * ) Notice: Subject to any disclaimer, the term of this patent is extended or adjusted under 35 U.S.C. 154(b) by 741 days.

(21) Appl. No.: 14/363,360

(22) PCT Filed: Dec. 6, 2012

(86) PCT No.: PCT/US2012/068288
§ 371 (c)(1),
(2) Date: Jun. 6, 2014

(87) PCT Pub. No.: WO2013/086222
PCT Pub. Date: Jun. 13, 2013

(65) Prior Publication Data
US 2014/0311889 A1  Oct. 23, 2014

Related U.S. Application Data

(60) Provisional application No. 61/568,770, filed on Dec. 9, 2011.

(51) Int. Cl.
*B01D 3/00* (2006.01)
*B01D 3/06* (2006.01)

(52) U.S. Cl.
CPC ............. *B01D 3/001* (2013.01); *B01D 3/002* (2013.01); *B01D 3/065* (2013.01)

(58) Field of Classification Search
CPC ......... B01D 3/001; B01D 3/002; B01D 3/065
See application file for complete search history.

(56) References Cited

U.S. PATENT DOCUMENTS

| 3,261,766 A | 7/1966 | Sherwood |
| 3,986,938 A * | 10/1976 | Smith, Jr. ................ B01D 1/26 159/903 |
| 4,101,297 A | 7/1978 | Uda et al. |
| 4,169,010 A | 9/1979 | Marwil |
| 4,209,364 A | 6/1980 | Rothschild |

(Continued)

FOREIGN PATENT DOCUMENTS

| EP | 0072045 | 2/1983 |
| EP | 0173544 | 5/1991 |

(Continued)

OTHER PUBLICATIONS

Cysewski, et al., Rapid Ethanol Fermentations Using Vacuum and Cell Recycle, Biotechnol. Bioeng. 19:1125-1143, 1977.

(Continued)

*Primary Examiner* — Jonathan Miller

(57) ABSTRACT

The present invention relates to processes to remove butanol and other product alcohols from a fermentation broth employing vacuum vaporization.

12 Claims, 17 Drawing Sheets

(56) References Cited

U.S. PATENT DOCUMENTS

| | | | |
|---|---|---|---|
| 4,305,790 A * | 12/1981 | Kramer, Sr. | B01D 3/001 203/19 |
| 4,330,373 A * | 5/1982 | Liu | C02F 1/14 159/17.1 |
| 4,349,628 A | 9/1982 | English et al. | |
| 4,359,533 A * | 11/1982 | Wilke | B01D 3/001 203/19 |
| 4,366,032 A | 12/1982 | Mikitenko et al. | |
| 4,399,000 A | 8/1983 | Tedder | |
| 4,538,010 A | 8/1985 | Diana | |
| 4,708,775 A | 11/1987 | McGregor et al. | |
| 4,846,240 A | 7/1989 | Erickson | |
| 4,996,038 A | 2/1991 | McAlister et al. | |
| 5,084,142 A | 1/1992 | Berg et al. | |
| 5,271,914 A | 12/1993 | Sugimoto et al. | |
| 5,961,789 A | 10/1999 | Berg | |
| 5,993,608 A | 11/1999 | Abry et al. | |
| 6,117,275 A | 9/2000 | Baumann | |
| 6,136,577 A | 10/2000 | Gaddy | |
| 6,284,023 B1 | 9/2001 | Torkildsen et al. | |
| 6,306,307 B1 | 10/2001 | McGregor et al. | |
| 6,461,413 B1 | 10/2002 | Landreau et al. | |
| 7,074,258 B2 | 7/2006 | Collins et al. | |
| 7,297,236 B1 * | 11/2007 | Vander Griend | B01D 3/005 202/153 |
| 7,419,646 B2 | 9/2008 | Cadours et al. | |
| 7,531,688 B2 | 5/2009 | Fleisher | |
| 7,566,383 B2 | 7/2009 | Everett et al. | |
| 7,601,377 B2 | 10/2009 | Aksenov et al. | |
| 7,666,282 B2 | 2/2010 | Sylvester et al. | |
| 7,867,365 B2 * | 1/2011 | Brown | B01D 3/002 159/2.1 |
| 8,075,673 B2 * | 12/2011 | Anders | B01D 53/1475 252/60 |
| 8,101,808 B2 | 1/2012 | Evanko et al. | |
| 8,373,008 B2 | 2/2013 | Grady et al. | |
| 8,373,009 B2 | 2/2013 | Grady et al. | |
| 8,409,834 B2 | 4/2013 | Burlew et al. | |
| 8,426,173 B2 | 4/2013 | Bramucci et al. | |
| 8,426,174 B2 | 4/2013 | Bramucci et al. | |
| 8,460,439 B2 | 6/2013 | Parten | |
| 8,476,047 B2 | 7/2013 | Burlew et al. | |
| 8,557,540 B2 | 10/2013 | Burlew et al. | |
| 8,563,788 B2 | 10/2013 | Grady et al. | |
| 8,569,552 B2 | 10/2013 | Grady et al. | |
| 8,574,406 B2 * | 11/2013 | Grady | B01D 3/002 203/42 |
| 8,617,861 B2 | 12/2013 | Grady et al. | |
| 8,628,643 B2 * | 1/2014 | Grady | B01D 3/002 203/2 |
| 8,697,404 B2 | 4/2014 | Anton et al. | |
| 8,759,044 B2 | 6/2014 | DiCosimo et al. | |
| 8,765,425 B2 | 7/2014 | DiCosimo et al. | |
| 8,828,695 B2 | 9/2014 | Grady et al. | |
| 8,865,443 B2 | 10/2014 | Burlew et al. | |
| 8,906,204 B2 | 12/2014 | Xu | |
| 8,956,859 B1 | 2/2015 | Anthony et al. | |
| 8,968,522 B2 | 3/2015 | Xu et al. | |
| 8,968,523 B2 | 3/2015 | Xu et al. | |
| 8,969,055 B2 | 3/2015 | Grady et al. | |
| 9,012,190 B2 | 4/2015 | Dauner et al. | |
| 9,040,263 B2 | 5/2015 | Anton et al. | |
| 9,109,196 B2 | 8/2015 | Bazzana et al. | |
| 9,156,760 B2 | 10/2015 | Zaher et al. | |
| 9,175,315 B2 | 11/2015 | Anton et al. | |
| 9,206,448 B2 | 12/2015 | Anton et al. | |
| 9,249,076 B2 | 2/2016 | Anton et al. | |
| 9,371,547 B2 | 6/2016 | Burlew et al. | |
| 9,446,326 B2 * | 9/2016 | Walker | B01D 3/002 |
| 9,469,584 B2 | 10/2016 | Anton et al. | |
| 9,517,985 B2 | 12/2016 | Basham et al. | |
| 9,523,104 B2 | 12/2016 | Fuchs et al. | |
| 2002/0072100 A1 | 6/2002 | Lightner | |
| 2003/0143704 A1 | 7/2003 | Lightner | |
| 2006/0156923 A1 | 7/2006 | Meckl et al. | |
| 2007/0031918 A1 | 2/2007 | Dunson et al. | |
| 2007/0092957 A1 | 4/2007 | Donaldson et al. | |
| 2007/0148069 A1 | 6/2007 | Chakravarti et al. | |
| 2008/0274526 A1 | 11/2008 | Bramucci et al. | |
| 2009/0171129 A1 * | 7/2009 | Evanko | C07C 29/80 568/916 |
| 2009/0283398 A1 | 11/2009 | Noro et al. | |
| 2009/0293723 A1 | 12/2009 | Steele | |
| 2009/0305370 A1 | 12/2009 | Grady et al. | |
| 2010/0011958 A1 | 1/2010 | Cadours et al. | |
| 2010/0062926 A1 | 3/2010 | Woodhouse et al. | |
| 2010/0099155 A1 | 4/2010 | Frank et al. | |
| 2010/0104490 A1 | 4/2010 | Bouillon et al. | |
| 2010/0143992 A1 | 6/2010 | Erdner-Tindall et al. | |
| 2010/0143993 A1 | 6/2010 | Erdner-Tindall et al. | |
| 2010/0143994 A1 | 6/2010 | Erdner-Tindall et al. | |
| 2010/0143995 A1 | 6/2010 | Erdner-Tindall et al. | |
| 2011/0088553 A1 | 4/2011 | Woodhouse et al. | |
| 2011/0097773 A1 | 4/2011 | Grady et al. | |
| 2011/0117633 A1 | 5/2011 | McGregor et al. | |
| 2011/0124068 A1 * | 5/2011 | Evanko | B01D 1/30 435/157 |
| 2011/0136193 A1 | 6/2011 | Grady et al. | |
| 2011/0151524 A1 | 6/2011 | Gordon et al. | |
| 2011/0168019 A1 | 7/2011 | Northrop et al. | |
| 2011/0294179 A1 | 12/2011 | Grady et al. | |
| 2011/0312053 A1 | 12/2011 | Burlew et al. | |
| 2013/0164795 A1 | 6/2013 | Lowe et al. | |
| 2013/0217060 A1 | 8/2013 | Bramucci et al. | |
| 2013/0224728 A1 | 8/2013 | Bramucci et al. | |
| 2013/0252297 A1 | 9/2013 | Parten | |
| 2013/0295661 A1 | 11/2013 | Roesch et al. | |
| 2013/0309738 A1 | 11/2013 | Barr et al. | |
| 2014/0018581 A1 | 1/2014 | Grady et al. | |
| 2014/0024064 A1 | 1/2014 | Burlew et al. | |
| 2014/0073820 A1 | 3/2014 | Bazzana et al. | |
| 2014/0093931 A1 | 4/2014 | Dauner et al. | |
| 2014/0099688 A1 | 4/2014 | Grady et al. | |
| 2014/0106419 A1 | 4/2014 | Bazzana et al. | |
| 2014/0142352 A1 | 5/2014 | Dauner et al. | |
| 2014/0162344 A1 | 6/2014 | DiCosimo et al. | |
| 2014/0178529 A1 | 6/2014 | Anton et al. | |
| 2014/0234929 A1 | 8/2014 | Barr et al. | |
| 2014/0256020 A1 | 9/2014 | DiCosimo et al. | |
| 2014/0273130 A1 | 9/2014 | Anthony et al. | |
| 2014/0363865 A1 | 12/2014 | Burlew et al. | |
| 2015/0010984 A1 | 1/2015 | Bhalla et al. | |
| 2015/0060259 A1 | 3/2015 | Xu | |
| 2015/0080615 A1 | 3/2015 | Fergusson et al. | |
| 2015/0211026 A1 | 7/2015 | Bazzana et al. | |
| 2015/0225324 A1 | 8/2015 | Cheng et al. | |
| 2015/0267225 A1 | 9/2015 | Bazzana et al. | |

FOREIGN PATENT DOCUMENTS

| | | |
|---|---|---|
| WO | WO2007075399 | 7/2007 |
| WO | WO2008021700 | 2/2008 |
| WO | WO2009079362 | 6/2009 |
| WO | WO2009086391 | 7/2009 |
| WO | WO2009108503 | 9/2009 |
| WO | WO2009156622 | 12/2009 |
| WO | WO2010024714 | 3/2010 |
| WO | WO2010151832 | 12/2010 |
| WO | WO2011003962 | 1/2011 |
| WO | WO2011100299 | 8/2011 |

OTHER PUBLICATIONS

Durre, Fermentative production of butanol—the academic perspective, Curr. Opin. Biotechnol. 22:331-336, 2011.

Maiorella, et al., Low-Cost, Low-Energy Flash Ethanol Fermentation, Chemical Process Research and Development, Energy and Environment Division Annual Report, 1980, pp. 4-9 to 4-14.

Mariano, et al., An Alternative Process for Butanol Production: Continuous Flash Fermentation, Chemical Product and Process Modeling vol. 3, Iss. 1, Article 34, 2008.

(56) References Cited

OTHER PUBLICATIONS

Mariano, et al., Dynamics of a Continuous Flash Fermentation for Butanol Production, Chem. Eng. Trans. 20:285-290, 2010.
Olah, et al., Chemical Recycling of Carbon Dioxide to Methanol and Dimethyl Ether: From Greenhouse Gas to Renewable, Environmentally Carbon Neutral Fuels and Synthetic Hydrocarbons, J. Org. Chem. 74:487-493, 2009.
Roffler, Extractive fermentation—lactic acid and acetone/butanol production, Dissertation, University of California, Berkeley, 1986.
Shi, et al., Performance evaluation of acetone-butanol continuous flash extractive fermentation process, Bioprocess Biosyst. Eng. 27:175-183, 2005.
Liu, et al., Downstream Process Synthesis for Biochemical Production of Butanol, Ethanol, and Acetone from Grains: Generation of Optimal and Near-Optimal Flowsheets with Conventional Operating Units, Biotechnol. Prog. 20:1518-1527, 2004.
International Preliminary Report on Patentability for corresponding PCT/US2012/068288; dated Jun. 19, 2014.
International Search Report and Written Opinion for corresponding PCT/US2012/068288; dated Jun. 11, 2013.

\* cited by examiner

US 9,962,623 B2

PROCESS TO REMOVE PRODUCT ALCOHOLS FROM FERMENTATION BROTH

FIELD OF THE INVENTION

The present invention relates to processes to remove butanol and other product alcohols from fermentation broth.

BACKGROUND

Currently, much industrial fermentation involves the manufacture of ethanol for either chemical or fuels use. For use in fuel, butanol has advantages as compared to ethanol, namely butanol has a lower vapor pressure.

An advantageous butanol fermentation process may encompass a complete, or substantially complete, conversion of sugars to butanol by a microorganism without reaching a butanol titer above a threshold of butanol tolerance of the microorganism that may cause the rate of butanol production to fall below an undesirable predetermined rate. While it may be possible to limit sugar loadings to a level whereby batch fermentation does not require operation at a butanol concentration above the tolerance level, this approach has disadvantages because limited sugar loadings may result in reduced capital productivity and dilute solutions that may be economically undesirable to process. Therefore, there is a need for a process by which levels of butanol are limited in a fermentation at or below the tolerance level while sugar loadings are not limited by considerations of the tolerance level.

One means by which a butanol-producing fermentation process might be made more efficient would be to remove butanol as it is being formed from the fermentation medium (or broth), for example, by a vaporization process, so that the tolerance level of the butanol-producing microorganism is not reached, allowing high loading of sugar to be charged to the fermentation vessel. Such an "in situ product removal" ("ISPR") process is described, for example, in PCT International Publication No. WO2009/079362; U.S. Patent Application Publication No. 2012/0035398; and U.S. Patent Application Publication No. 2012/0211348.

As fermentation relies on microorganisms, any temperature constraints relative to the microorganisms may be considered. To operate a vaporization process at acceptable temperatures, consideration must be given to costs and practicalities of cooling and condensing vapor streams containing product alcohols, or operation under vacuum. The costs associated with removal of heat within a chemical process can be a function of the plant location and also the time of the year. In many geographic areas, it is not possible to guarantee cooling to be available or practical at the temperature at which heat needs to be removed from the vapor stream.

Providing chilled water to the heat exchanger by which condensation is carried out significantly increases the cost of the cooling medium. An alternative would be to compress the vapor stream to a slightly higher pressure to allow the condensation to be carried out at a higher temperature. Processes described which use lithium bromide and similar hygroscopic solutions for absorption of ethanol and water vapor may not be adequate for absorbing carbon dioxide or higher alcohols of a vapor stream.

In addition, with whatever method is used, there will be a residual gas stream (e.g., carbon dioxide in the fermentation broth) that must be compressed before discharge to the atmosphere. While vacuum flashing represents an effective means by which butanol can be removed from a fermentation process, there is a need for advances in the processing of the resulting low pressure vapor stream containing butanol or other product alcohols.

SUMMARY OF THE INVENTION

The processes described herein are useful for fermentations which produce product alcohols (e.g., ethanol, butanol) because of the desire to remove these alcohols during fermentation to diminish the impact on productivity and/or viability of the microorganisms in the fermentation. The processes provided herein provide for effective product recovery during fermentation with minimized impact on fermentation conditions.

The present invention is directed to a method for removing a product alcohol from a fermentation broth comprising: (a) at least partially vaporizing a fermentation broth or a portion thereof to form one or more vapor streams, wherein vaporizing comprises: (i) vaporizing the fermentation broth or a portion thereof by one or more pre-flashes; and (ii) vaporizing the fermentation broth or a portion thereof by a flash; wherein the vapor streams comprise one or more components selected from product alcohol, water, and carbon dioxide; and (b) recovering the product alcohol from the one or more vapor streams or a portion thereof. In some embodiments, the pressure of the flash may be lower than the pressure of the one or more pre-flashes. In some embodiments, the method may further comprise condensing the one or more vapor streams by contacting the one or more vapor streams or a portion thereof with a condensing solution. In some embodiments, the step of forming the one or more vapor streams and the step of condensing the one or more vapor streams are conducted in a single vessel. In some embodiments, the method may further comprise contacting the one or more vapor streams with an absorption liquid wherein at least a portion of the one or more vapor streams is absorbed into the absorption liquid to form an absorption liquid phase; and distilling the absorption liquid phase comprising the one or more absorbed vapor streams to remove at least a portion of product alcohol, water, and/or carbon dioxide from the absorption liquid. In some embodiments, contacting the one or more vapor streams with an absorption liquid may be conducted under vacuum conditions.

In some embodiments, the method may further comprise processing the vapor stream formed by vaporizing the fermentation broth or a portion thereof by a flash. In some embodiments, the vapor stream may be processed to form a liquid stream and a residual vapor stream. In some embodiments, the processing of the vapor stream may be by compression, condensation, absorption, refrigeration, or combinations thereof. In some embodiments, the method may further comprise compressing the residual vapor stream to form a compressed vapor stream. In some embodiments, the compressed vapor stream comprises product alcohol, water, and/or carbon dioxide. In some embodiments, the product alcohol content of the compressed vapor stream may be lower than the product alcohol content of the vapor stream (e.g., the vapor stream of step (a)(ii) described herein). In some embodiments, the method may further comprise contacting a compressed vapor stream with fermentation broth. In some embodiments, the fermentation broth may be fermentation broth from the fermentation vessel or the one or more pre-flashes.

The present invention is also directed to a method for removing a product alcohol from a fermentation broth comprising: (a) at least partially vaporizing a fermentation broth or a portion thereof to form one or more vapor streams, wherein vaporizing comprises: (i) optionally vaporizing the fermentation broth or a portion thereof in a first pre-flash at a first pressure P1; (ii) vaporizing the fermentation broth or a portion thereof in a second pre-flash at a second pressure P2; and (iii) vaporizing the fermentation broth or a portion thereof in a flash at a third pressure P3; wherein the one or more vapor streams comprise product alcohol, water, and/or carbon dioxide; and (b) recovering the product alcohol from the one or more vapor streams. In some embodiments, the third pressure P3 may be lower than the second pressure P2. In some embodiments, the method may further comprise condensing the one or more vapor streams by contacting the one or more vapor streams or a portion thereof with a condensing solution. In some embodiments, the step of forming the one or more vapor streams and the step of condensing the one or more vapor streams may be conducted in a single vessel. In some embodiments, the method may further comprise contacting the one or more vapor streams with an absorption liquid wherein at least a portion of the one or more vapor streams is absorbed into the absorption liquid to form an absorption liquid phase; and distilling the absorption liquid phase comprising the one or more absorbed vapor streams to remove at least a portion of product alcohol, water, and/or carbon dioxide from the absorption liquid. In some embodiments, contacting the one or more vapor streams with an absorption liquid may be conducted under vacuum conditions. In some embodiments, the method may further comprise processing the vapor stream formed by vaporizing the fermentation broth or a portion thereof by a flash. In some embodiments, the vapor stream may be processed to form a liquid stream and a residual vapor stream. In some embodiments, the processing of the vapor stream may be by compression and/or condensation. In some embodiments, the processing of the vapor stream may be by absorption. In some embodiments, the processing of the vapor stream may be by refrigeration. In some embodiments, the method may further comprise compressing the residual vapor stream to form a compressed vapor stream. In some embodiments, the compressed vapor stream comprises product alcohol, water, and/or carbon dioxide. In some embodiments, the product alcohol content of the compressed vapor stream may be lower than the product alcohol content of the vapor stream (e.g., the vapor stream of step (a)(ii) described herein). In some embodiments, the method may further comprise contacting a compressed vapor stream with fermentation broth. In some embodiments, the fermentation broth may be fermentation broth from the fermentation vessel or the one or more pre-flashes.

The present invention is also directed to a method for removing a product alcohol from a fermentation broth comprising: (a) introducing a gas into the fermentation broth, wherein a portion of product alcohol transfers into the gas; (b) removing the gas from the fermentation broth to recover the product alcohol; (c) removing a portion of fermentation broth from a fermentation vessel; (d) at least partially vaporizing a fermentation broth or a portion thereof to form one or more vapor streams, wherein vaporizing comprises: (i) optionally vaporizing the fermentation broth or a portion thereof in a first pre-flash at a first pressure P1; (ii) vaporizing the fermentation broth or a portion thereof in a second pre-flash at a second pressure P2; and (iii) vaporizing the fermentation broth or a portion thereof in a flash at a third pressure P3; wherein the one or more vapor streams comprise product alcohol, water, and/or carbon dioxide; and (e) recovering the product alcohol from the one or more vapor streams. In some embodiments, the third pressure P3 may be lower than the second pressure P2. In some embodiments, the method may further comprise condensing the one or more vapor streams by contacting the one or more vapor streams or a portion thereof with a condensing solution. In some embodiments, the step of forming the one or more vapor streams and the step of condensing the one or more vapor streams may be conducted in a single vessel. In some embodiments, the method may further comprise contacting the one or more vapor streams with an absorption liquid wherein at least a portion of the one or more vapor streams is absorbed into the absorption liquid to form an absorption liquid phase; and distilling the absorption liquid phase comprising the one or more absorbed vapor streams to remove at least a portion of product alcohol, water, and/or carbon dioxide from the absorption liquid. In some embodiments, contacting the one or more vapor streams with an absorption liquid may be conducted under vacuum conditions.

In some embodiments of the methods described herein, the condensing solution may comprise product alcohol. In some embodiments of the methods described herein, the step of vaporizing the fermentation broth or a portion thereof to form one or more vapor streams may occur at a temperature of about 20° C. to about 100° C.

In some embodiments of the methods described herein, the methods may further comprise culturing a microorganism in the fermentation broth to produce the product alcohol. In some embodiments, the microorganism may be a thermotolerant microorganism. In some embodiments, the methods may further comprise supplementing the fermentation broth with micronutrients. In some embodiments, the micronutrients may comprise corrosive products. In some embodiments, the methods may further comprise preventing contamination in the fermentation by treating the fermentation broth or stream thereof with an antimicrobial agent.

In some embodiments of the methods described herein, the methods may further comprise providing a feedstock slurry comprising fermentable carbon source, undissolved solids, and water; separating at least a portion of the undissolved solids from said slurry whereby (i) an aqueous solution comprising fermentable carbon source and (ii) a wet cake co-product comprising undissolved solids are generated; and adding the aqueous solution to fermentation broth comprising microorganisms in a fermentation vessel whereby the product alcohol is produced. In some embodiments, the undissolved solids may be separated from feedstock slurry by decanter bowl centrifugation, three-phase centrifugation (e.g., Tricanter®), disk stack centrifugation, filtering centrifugation, decanter centrifugation, filtration, vacuum filtration, beltfilter, pressure filtration, filtration using a screen, screen separation, grating, porous grating, flotation, hydroclone, filter press, screwpress, gravity settler, vortex separator, or combination thereof.

In some embodiments of the methods described herein, the methods may further comprise adding a feedstock slurry comprising fermentable carbon source, undissolved solids, and water to fermentation broth comprising microorganisms in a fermentation vessel whereby the product alcohol is produced. In some embodiments, the methods may further comprise separating at least a portion of the undissolved solids from the fermentation broth prior to the one or more pre-flashes or flash. For example, at least a portion of the undissolved solids may be separated from the fermentation broth prior to the first pre-flash or the second pre-flash.

In some embodiments of the methods described herein, the one or more pre-flashes may occur in a pre-flash tank. For example, in some embodiments, the first pre-flash and/or second pre-flash may occur in a pre-flash tank. In some embodiments, the pre-flash tank may be a spray tower. In some embodiments, the flash may occur in a flash tank. In some embodiments, the flash tank may be a spray tower.

In some embodiments of the methods described herein, the methods may further comprise distilling the liquid stream to recover product alcohol.

In some embodiments of the methods described herein, the fermentation broth may be removed from the fermentation vessel at a flow rate to minimize shear damage to the microorganism.

The present invention is also directed to a system for recovering product alcohol comprising one or more components selected from fermentation vessels, pre-flash tanks, flash tank, scrubber, evaporation train, and distillation columns. In some embodiments, the evaporation train comprises a two (2) effect by four (4) body setup or a four (4) effect by two (2) body setup. In some embodiments, the pre-flash tank and/or flash tank may be a spray tower. In some embodiments, the system further comprises one or more components selected from beer column, rectifier, reboiler, condenser, and compressor.

The present invention is directed to a composition comprising a product alcohol recovered by the methods described herein. The present invention is directed to a composition comprising a wet cake produced by the methods described herein. The present invention is also directed to an animal feed comprising the wet cake composition.

DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DESCRIPTION OF THE INVENTION

Figures 1A, 1B:
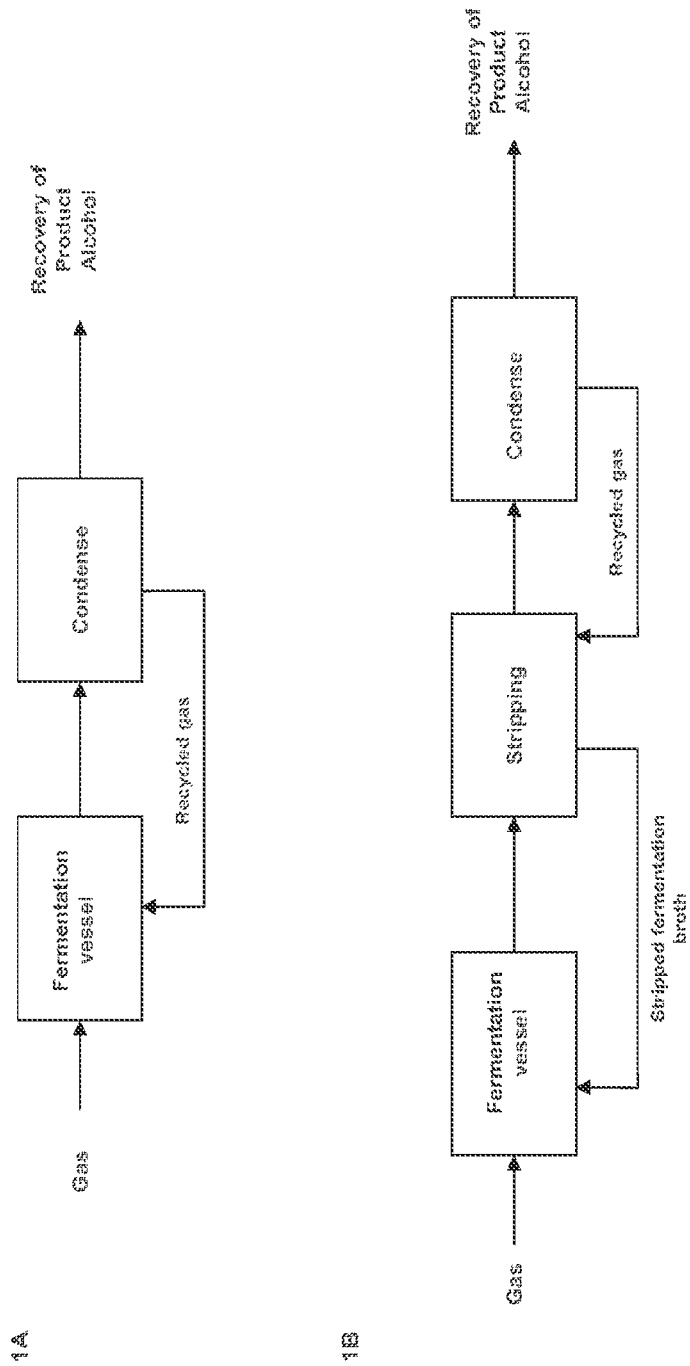
FIGS. 1A-C schematically illustrates example systems useful for practicing processes according to embodiments described herein FIGS. 2A and 2B schematically illustrate exemplary process flow diagrams for production of a product alcohol.

The processes provided herein can be more fully understood from the following detailed description and accompanying figures which form a part of this application. Reference made to figures is intended to aid in the understanding of the processes described herein, and should not be construed as limiting. In addition, where process conditions are proposed in reference to a figure, these are supplied as an example and variation from these conditions is within the spirit of the invention.

Unless defined otherwise, all technical and scientific terms used herein have the same meaning as commonly understood by one of ordinary skill in the art to which this invention belongs. In case of conflict, the present application including the definitions will control. Also, unless otherwise required by context, singular terms shall include pluralities and plural terms shall include the singular. All publications, patents, and other references mentioned herein are incorporated by reference in their entireties for all purposes.

In order to further define this invention, the following terms and definitions are herein provided.

As used herein, the terms "comprises," "comprising," "includes," "including," "has," "having," "contains," or "containing," or any other variation thereof, will be understood to imply the inclusion of a stated integer or group of integers but not the exclusion of any other integer or group of integers. For example, a composition, a mixture, a process, a method, an article, or an apparatus that comprises a list of elements is not necessarily limited to only those elements but can include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the term "consists of," or variations such as "consist of" or "consisting of," as used throughout the specification and claims, indicate the inclusion of any recited integer or group of integers, but that no additional integer or group of integers may be added to the specified method, structure, or composition.

As used herein, the term "consists essentially of," or variations such as "consist essentially of" or "consisting essentially of," as used throughout the specification and claims, indicate the inclusion of any recited integer or group of integers, and the optional inclusion of any recited integer or group of integers that do not materially change the basic or novel properties of the specified method, structure, or composition.

Also, the indefinite articles "a" and "an" preceding an element or component of the invention are intended to be nonrestrictive regarding the number of instances, i.e., occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

As used herein, the term "about" modifying the quantity of an ingredient or reactant of the invention employed refers to variation in the numerical quantity that can occur, for example, through typical measuring and liquid handling procedures used for making concentrates or solutions in the real world; through inadvertent error in these procedures; through differences in the manufacture, source, or purity of the ingredients employed to make the compositions or to carry out the methods; and the like. The term "about" also encompasses amounts that differ due to different equilibrium conditions for a composition resulting from a particular initial mixture. Whether or not modified by the term "about," the claims include equivalents to the quantities. In one embodiment, the term "about" means within 10% of the reported numerical value, alternatively within 5% of the reported numerical value.

"Biomass" as used herein refers to a natural product comprising hydrolysable polysaccharides that provide fermentable sugars, including any sugars and starch derived from natural resources such as corn, sugar cane, wheat, cellulosic or lignocellulosic material and materials comprising cellulose, hemicellulose, lignin, starch, oligosaccharides, disaccharides and/or monosaccharides, and mixtures thereof. Biomass may also comprise additional components, such as protein and/or lipids. Biomass may be derived from a single source, or biomass may comprise a mixture derived from more than one source; for example, biomass may comprise a mixture of corn cobs and corn stover, or a mixture of grass and leaves. Biomass includes, but is not limited to, bioenergy crops, agricultural residues, municipal solid waste, industrial solid waste, sludge from paper manufacture, yard waste, waste sugars, wood and forestry waste. Examples of biomass include, but are not limited to, corn grain, corn cobs, crop residues such as corn husks, corn stover, grasses, wheat, rye, wheat straw, barley, barley straw, hay, rice straw, switchgrass, waste paper, sugar cane bagasse, sorghum, soy, whey, whey permeate, components obtained from milling of grains, trees, branches, roots, leaves, wood chips, sawdust, shrubs and bushes, vegetables, fruits, flowers, animal manure, and mixtures thereof. For example, mash, juice, molasses, or hydrolysate may be formed from biomass by any processing known in the art for processing the biomass for purposes of fermentation, such as by milling, treating and/or liquefying and comprises fermentable sugar and may comprise an amount of water. For example, cellulosic and/or lignocellulosic biomass may be processed to obtain a hydrolysate containing fermentable sugars by any method known to one skilled in the art (see, e.g., U.S. Patent Application Publication No. 2007/0031918, which is herein incorporated by reference). Enzymatic saccharification of cellulosic and/or lignocellulosic biomass typically makes use of an enzyme consortium for breaking down cellulose and hemicellulose to produce a hydrolysate containing sugars including glucose, xylose, and arabinose. Saccharification enzymes suitable for cellulosic and/or lignocellulosic biomass are reviewed in Lynd, et al., (Microbiol. Mol. Biol. Rev. 66:506-577, 2002).

"Vacuum flash" or "flash" as used herein refers to a process step whereby a liquid stream is subjected to a reduction in pressure (e.g., held under vacuum). The liquid stream may be from a fermentation vessel or separate vessel such as a pre-flash tank. The reduction in pressure causes a fraction of the liquid stream to vaporize into a vapor phase. A liquid stream subjected to this step may be referred to as "flashed" or "partially vaporized" or "vaporized." In some embodiments, the liquid stream from a fermentation vessel may be passed to a separate vessel (which can be a multi-stage distillation column or a single-stage tank) which may be held under vacuum. In some embodiments, the liquid stream may be fermentation broth in a fermentation vessel. In some embodiments, the flash may be conducted in the fermentation vessel.

In some embodiments where the "flash" is carried out in a multi-stage distillation column, the flash may also be referred to as a "distillation" or a "flash distillation."

"Flash tank" or "flash vessel" as used herein refers to the physical location in which at least a fraction of a liquid stream flashes into the vapor phase.

"Pre-flash" as used herein refers to a process step, prior to a flash step, whereby a liquid stream is subjected to a reduction in pressure (e.g., held under vacuum). The reduction in pressure causes a fraction of the liquid stream to vaporize into a vapor phase. The liquid stream may be from a fermentation vessel or separate vessel such as a pre-flash tank. A liquid stream subjected to this step may be referred to as "pre-flashed." In some embodiments, there may be two or more pre-flash steps.

"Pre-flash tank" or "pre-flash vessel" as used herein refers to the physical location in which at least a fraction of a liquid stream vaporizes into a vapor phase.

"Absorption liquid" as used herein refers to a liquid introduced into a process which is capable of absorbing any portion of the vapor phase produced during the flash.

"Fermentation" as used herein refers to a process step whereby a carbon substrate is converted into a product, such as a product alcohol, by the action of microorganisms.

"Fermentation broth" or "fermentation liquid" as used herein refers to a mixture of any of the following: water, sugars, dissolved solids, suspended solids, microorganisms producing alcohol, product alcohol and all other constituents of the material held in the fermentation vessel in which product alcohol is being made by the reaction of sugars to alcohol, water, and carbon dioxide ($CO_2$) by the microorganisms present. From time to time, as used herein the term "fermentation medium" and "fermented mixture" can be used synonymously with "fermentation broth."

"Fermentation vessel" as used herein refers to a vessel in which the fermentation reaction is carried out whereby product alcohol such as butanol is made from a fermentable carbon source (e.g., sugars). In some embodiments, the fermentation reaction may be carried out in one or more fermentation vessels. The term "fermentor" can be used synonymously with "fermentation vessel."

"Fermentable carbon source" as used herein refers to a carbon source capable of being metabolized by the microorganisms disclosed herein for the production of a product alcohol. Suitable fermentable carbon sources include, but are not limited to, monosaccharides such as glucose or fructose; disaccharides such as lactose or sucrose; oligosaccharides; polysaccharides such as starch or cellulose; C5 sugars such as xylose and arabinose; carbon substrates such as methane; and mixtures thereof. From time to time, as used herein the term "fermentable carbon source" can be used synonymously with "carbon substrate" or "fermentable carbon substrate." The carbon source may be derived from biomass.

"Feedstock" as used herein refers to a feed in a fermentation process, the feed containing a fermentable carbon source with or without undissolved solids, and where applicable, the feed containing the fermentable carbon source before or after the fermentable carbon source has been liberated from starch or obtained from the breakdown of complex sugars by further processing such as by liquefaction, saccharification, or other process. Feedstock includes or may be derived from biomass. Suitable feedstocks include, but are not limited to, rye, wheat, barley, corn, corn mash, cane, cane mash, cellulosic material, lignocellulosic material, and mixtures thereof.

"Sugar" as used herein refers to oligosaccharides, disaccharides, and/or monosaccharides. The term "saccharide" also includes carbohydrates including starches, dextrans, glycogens, cellulose, pentosans, as well as sugars.

"Fermentable sugar" as used herein refers to one or more sugars capable of being metabolized by the microorganisms disclosed herein for the production of a product alcohol.

"Undissolved solids" as used herein refers to non-fermentable portions of feedstock which are not dissolved in the liquid phase, for example, germ, fiber, and gluten. For example, the non-fermentable portions of feedstock include the portion of feedstock that remains as solids and can absorb liquid from the fermentation broth.

"Dried Distillers' Grains with Solubles" (DDGS) as used herein refers to a co-product or by-product from a fermentation of a feedstock or biomass (e.g., fermentation of grain or grain mixture that produces a product alcohol). In some embodiments, DDGS may also refer to an animal feed produced from a process of making a product alcohol (e.g., ethanol, butanol, isobutanol, and the like).

"Liquefaction vessel" as used herein refers to a vessel in which liquefaction is carried out. Liquefaction is the process in which oligosaccharides are liberated from the feedstock. In embodiments where the feedstock is corn, oligosaccharides are liberated from the corn starch content during liquefaction.

"Product alcohol" as used herein refers to any alcohol that can be produced by a microorganism in a fermentation process that utilizes biomass as a source of fermentable carbon substrate. Product alcohols include, but are not limited to, $C_1$ to $C_8$ alkyl alcohols, isomers of $C_1$ to $C_8$ alkyl alcohols, and mixtures thereof. In some embodiments, the product alcohols are $C_2$ to $C_8$ alkyl alcohols. In other embodiments, the product alcohols are $C_2$ to $C_5$ alkyl alcohols or $C_3$ to $C_6$ alkyl alcohols. It will be appreciated that $C_1$ to $C_8$ alkyl alcohols include, but are not limited to, methanol, ethanol, propanol, butanol, pentanol, and hexanol. Likewise $C_2$ to $C_8$ alkyl alcohols include, but are not limited to, ethanol, propanol, butanol, and pentanol. "Alcohol" is also used herein with reference to a product alcohol. The term "fermentative alcohol" may be used synonymously with product alcohol.

"Butanol" as used herein refers to the butanol isomers 1-butanol (1-BuOH), 2-butanol (2-BuOH), tert-butanol (t-BuOH), and/or isobutanol (iBuOH or i-BuOH, also known as 2-methyl-1-propanol), either individually or as mixtures thereof.

"Carboxylic acid" as used herein refers to any organic compound with the general chemical formula —COOH in which a carbon atom is bonded to an oxygen atom by a double bond to make a carbonyl group (—C=O) and to a hydroxyl group (—OH) by a single bond. A carboxylic acid may be in the form of the protonated carboxylic acid, in the form of a salt of a carboxylic acid (e.g., an ammonium, sodium, or potassium salt), or as a mixture of protonated carboxylic acid and salt of a carboxylic acid. The term carboxylic acid may describe a single chemical species (e.g., oleic acid) or a mixture of carboxylic acids as can be produced, for example, by the hydrolysis of biomass-derived fatty acid esters or triglycerides, diglycerides, monoglycerides, and phospholipids.

"Recombinant microorganism" as used herein refers to a microorganism (e.g., bacteria, yeast) that has been engineered using molecular biological techniques. The microorganism can be optionally engineered to express a metabolic pathway, and/or the microorganism can be optionally engineered to reduce or eliminate undesired products and/or increase the efficiency of the desired metabolite. As an example, the recombinant microorganism may be engineered to express a biosynthetic pathway to produce an alcohol such as butanol.

"Titer" as used herein refers to the total amount of a particular alcohol (e.g., ethanol, butanol) produced by fermentation per liter of fermentation medium.

"Rate" as used herein is the titer divided by the fermentation time.

"Yield" as used herein is the total grams of product alcohol produced per gram of glucose consumed.

"Substantial portion" as used herein with reference to a process stream or a component thereof, refers to at least about 50% of the indicated process stream or indicated component thereof. In some embodiments, a substantial portion may comprise at least about 60%, at least about 70%, at least about 80%, at least about 90%, or at least about 95% or the indicated process stream or indicated component thereof. "Substantially" as used herein with reference to a process stream or a component thereof, refers to at least about 50% of the indicated process stream or indicated component thereof. In some embodiments, a substantial portion may comprise at least about 60%, at least about 70%, at least about 80%, at least about 90%, or at least about 95% or the indicated process stream or indicated component thereof.

"A portion" or "portion thereof" as used herein with reference to a process stream refers to any fractional part of the stream which retains the composition of the stream, including the entire stream, as well as any component or components of the stream, including all components of the stream.

Product alcohols such as ethanol and butanol may be produced utilizing fermentation processes. In order to develop an economically competitive fermentation process, a number of factors such as, the development of a microorganism that can produce the product alcohol ("biocatalyst"), carbon sources capable of being metabolized by the microorganism, recovery of the product alcohol from a fermentation broth, co-product formation, and the potential for contamination may all be considered in the development of this process.

In the development of a microorganism that can produce a product alcohol, accumulation of the product alcohol during fermentation may be toxic to the microorganism and potentially impact the performance of the microorganism. That is, the end product (e.g., product alcohol) of the fermentation may inhibit the growth rate and production rate of the microorganism and may result in lower cell densities. One option to address toxicity is the dilution of the fermentation broth, for example, by the addition of water. However, this additional water load in the fermentation process may reduce capital productivity and may require further handling and processing including the need for additional equipment such as fermentors, pumps, mixing tanks, storage tanks, heat exchangers, distillation columns, and the like as well as additional costs.

A microorganism that is tolerant to the product alcohol (e.g., ethanol, butanol) can improve cell viability as well as the rate, titer, and yield of the fermentation process. Microorganisms with improved tolerance to product alcohols may be identified by a number of methods such as screening methods. For example, a sampling of microorganisms may be cultured in a growth medium and when the microorganisms reach a certain growth phase, product alcohol may be added to the growth medium. For example, increasing concentrations of product alcohol may be added to the growth medium. The microorganisms may continue to grow for a period of time, and may be contacted with product alcohol several times to select for increased tolerance to the product alcohol. The microorganisms may then be separated to isolate the individual strains that are tolerant to, for example, increasing concentrations of product alcohol (see, e.g. U.S. Pat. Nos. 7,659,104 and 7,541,173; U.S. Patent Application Publication No. 2008/0138870; the entire disclosures of which are incorporated in their entirety herein).

Product alcohol-tolerant microorganisms may also be generated by genetic modification methods such as genetic mutagenesis which includes, for example, chemical mutagensis, mutagenesis by mutator genes, irradiation with UV or X-rays, and transposon insertion. These modified microorganisms may have an improved tolerance to a product alcohol as compared to an unmodified microorganism. Examples of genetic modifications that may improve tolerance to product alcohols include, but are not limited to, expression and/or modifications of relA, spoT, and dksA genes (described in U.S. Patent Application Publication No. 2009/0203139, incorporated herein by reference), elongase genes (Yazawa, et al., Appl. Microbiol. Biotechnol. 91:1593-1600, 2011), heat shock proteins (HSPs), as well as genes associated with lipid and fatty acid metabolism and cell membrane composition (see, e.g. Ma, et al., Appl. Microbiol. Biotechnol. 87:829-845, 2010).

The metabolic pathways of microorganisms may also be genetically modified to produce product alcohol. These pathways may also be modified to reduce or eliminate undesired metabolites, and thereby improve yield of the product alcohol. For example, the production of butanol utilizing fermentation with a microorganism, as well as microorganisms which produce butanol, is disclosed, for example, in U.S. Patent Application Publication Nos. 2007/0092957; 2007/0259410; 2007/0292927; 2008/0182308; 2008/0274525; 2009/0305363; and 2009/0305370, herein incorporated by reference. In some embodiments, microorganisms comprise a butanol biosynthetic pathway or a biosynthetic pathway for a butanol isomer such as 1-butanol, 2-butanol, or isobutanol. In some embodiments, at least one, at least two, at least three, or at least four polypeptides catalyzing substrate to product conversions of a pathway are encoded by heterologous polynucleotides in the microorganism.

In addition, a microorganism with a certain level of thermotolerance such that elevated fermentation or process temperatures are more tolerated may also be beneficial to the overall process efficiency. If the microorganism could tolerate higher temperatures, then fermentation process steps such as saccharification and process recovery steps such as vacuum extraction (vacuum flash) could be conducted at higher temperatures. For example, the vacuum flash may be conducted at temperatures of about 25° C. to about 60° C. without having a negative effect on the thermotolerant microorganism and/or the saccharifying enzyme. In some embodiments, the vacuum flash may be conducted at temperatures of about 20° C. to about 100° C. Also, energy costs may be reduced. To illustrate, liquefaction of feedstock may be performed at temperatures greater than 80° C., and it would be necessary to cool the liquefied feedstock to about 30-35° C., the typical temperature range for yeast, prior to addition to the fermentation broth. Using a microorganism that could tolerate higher temperatures (e.g., about 40-50° C.), overall energy costs may be reduced because the liquefied feedstock would only need to be cooled to about 40-50° C., that is, lower energy requirements would be needed for cooling.

The potential for contamination may also be minimized if the microorganism is tolerant to higher temperatures. As an example, bacterial contamination may impact the nutrients available to the product alcohol-producing microorganisms by competing for these nutrients. In addition, these bacterial contaminants may generate by-products (e.g., lactic acid) that are detrimental to the growth of product alcohol-producing microorganisms. Thus, the ability to conduct a fermentation process at a temperature that minimizes bacterial contamination, but has no effect on the thermotolerant product alcohol-producing microorganisms would be cost-effective.

Examples of thermotolerant microorganisms include *Issatchenkia orientalis, Kluyveromvces marxianus, Kluyveromyces fiagilis, Hansenula polymorpha* (see, e.g., U.S. Patent Application Publication No. 2011/0045562; Ballesteros, et al., Appl Biochem Biotechnol. 28-29:307-315, 1991; Edgardo, et al., Enzyme Microb. Technol. 43:120-123, 2008). Microorganisms may also be genetically modified to be thermotolerant, for example, by genetically modifying the microorganism to express stress-related genes such as the genes encoding proteins involved in the ubiquitination process (see, e.g., Shahsavarani, et al., Biotechnol. Adv. (2011), doi:10.1016/jbiotechadv.2011.09.002)

These thermotolerant microorganisms may also be genetically modified to express a biosynthetic pathway that produces a product alcohol, such as a butanol biosynthetic pathway (see, e.g., U.S. Patent Application Publication Nos. 2007/0092957; 2007/0259410; 2007/0292927; 2008/0182308; 2008/0274525; 2009/0305363; and 2009/0305370, herein incorporated by reference).

As described herein, the invention relates to the production of product alcohols such as ethanol and butanol utilizing fermentation processes. Fermentation is an enzyme-catalyzed pathway wherein sugar molecules are metabolically broken down by microorganisms in a series of oxidation and reduction reactions. Sugars suitable for fermentation as a fermentable carbon source may be obtained from a variety of crop and waste materials such as cane, sugarcane juice, molasses, sugar beet, corn, corn steep liquor, cassava, sweet potatoes, sweet sorghum, Jerusalem artichoke, primary clarifier sludge, newsprint, cardboard, cotton linters, rice straw, rice hulls and corn stillage. For cellulosic biomass such as agricultural residues, forestry residues, waste paper and yard waste, the cellulose and hemicellulose in these materials, which are long chain polymers made up of sugar molecules, may be treated with dilute acid hydrolysis at a temperature of about 240° C. to hydrolyze the cellulose and hemicellulose to break down the molecules into smaller fractions that can be readily fermented. Alternatively, cellulose enzymes may be used to hydrolyze the cellulose to glucose for direct fermentation.

In addition to the fermentable carbon source, the fermentation broth (or fermentation medium) as used in a process described herein may contain various nutrients and/or micronutrients. Included among the nutrients and micronutrients typically used in a fermentation process are nitrogen, minerals, trace elements, and vitamins, as well as growth factors. In particular, micronutrients may include chromium, copper, iron, lithium, magnesium, manganese, molybdenum, potassium, vanadium, and zinc. In some embodiments, these micronutrients may be supplied as a by-product of the corrosion of the fermentation system equipment used in the fermentation process. For example, the fermentation system equipment may be constructed of stainless steel, and corrosion of stainless steel may lead to the release of elements such as chromium, nickel, and iron into the fermentation broth which in turn, may be utilized as a source of micronutrients for microorganisms. The fermentation broth may also be supplemented with gases such as oxygen which may enhance production of product alcohol.

Suitable growth factors include vitamins, purines, pyrimidines, nucleotides, nucleosides, amino acids, fatty acids, sterols, and polyamines. Nitrogen may be obtained from sources such as gaseous ammonia; ammonium salts such as ammonium sulfate or diammonium hydrogen phosphate; nitrates; urea; organic forms of nitrogen such as mixtures of peptides and amino acids (which may in turn be obtained from hydrolysed plant protein material such as corn steep liquor, casein hydrolysate, soybean meal, barley malt, corn gluten meal, linseed meal, whey powder, beet and cane molasses, rice and wheat meal, and yeast extract); and peptones, which are protein hydrolysates derived from meat, casein, gelatin, keratin, peanuts, soybean meal, cottonseeds, and sunflower seeds.

Suitable minerals and elements typically include phosphorus [e.g., $(NH_4)_2HPO_4$], potassium (e.g., KCl), magnesium, sulfur (e.g., $MgSO_4.7H_2O$) sodium, chlorine, cobalt, nickel (e.g., $NiCl_2$), iron (e.g., $FeCl_2.H_2O$), zinc (e.g., $ZnC_2$), manganese, calcium (e.g., $CaCl_2$), copper (e.g., $CuSO_4.5H_2O$), and molybdenum (e.g., $Na_2MoO_4$). Suitable vitamins typically include riboflavin, nicotinic acid, pantothenic acid, folic acid, choline, inositol, biotin, pyroxidine, and thiamin.

Other agents that may be added to the fermentation broth include, for example, glycerol or any other biocompatible compounds which enhance the relative volatility of the product alcohol. In some embodiments, these biocompatible compounds may be hydrophilic. In addition, compounds such as peroxide or other non-volatile oxidizing agents may also be added to the fermentation broth.

In some embodiments, antimicrobial agents may also be added to the fermentation vessel to minimize contamination. Examples of antimicrobial agents include, but are not limited to, antibiotics such as erythromycin, tylosin, and virginiamycin, hops-derived antimicrobials such as IsoStab™ and LactoStab™, and/or disinfectants such as Wescodyne®, Virkon® S, and Sporocidine®. In some embodiments, the fermentation broth or stream may be treated with antibiotics, hops-derived antimicrobials, disinfectants, acid treatment, ammonia, urea, hydrogen peroxide, and/or chlorine dioxide. In some embodiments, the fermentation broth or stream may be treated prior to recycling to the fermentation vessel for another fermentation cycle. The effects of antimicrobial agents on a microorganism may be analyzed using the methods described in Example 5.

In some embodiments, the fermentation process may be controlled by measuring and monitoring relevant conditions and variables which may include, but not limited to, one or more of the following: temperature, pressure, gas flow rate, liquid inlet and outlet flow rates, culture level, culture volume, culture weight, culture viscosity, agitation power, agitation speed, foaming, dissolved oxygen concentration, dissolved oxygen tension, dissolved $CO_2$ concentration, redox potential, pH, conductivity, ionic strength, dilution rate, carbohydrate concentration, total protein concentration, vitamin concentration, nucleic acid concentration, total cell count, viable cell count, biomass concentration, cell size, age, doubling time, substrate uptake rate, or product formation rate. Measurement of reaction conditions and variables may be performed using analytical methods such as high performance liquid chromatography, nuclear magnetic resonance, flow cytometry, fluorometry, flow injection analysis, mass spectrometry, gas chromatography, or infrared spectroscopy. The effects of fermentation conditions such as pressure, temperature, and pH on a microorganism may be analyzed using the methods described in Examples 1 to 4.

In addition, the fermentation process may be monitored using on-line measurements or real-time measurements, and these measurements may be used to improve the overall fermentation process. To optimize fermentation conditions, an in situ measurement of product alcohol in the fermentation broth may be made so that the ISPR process can be optimized. For example, a real-time measurement of the product alcohol concentration in the fermentation broth may be compared to a predetermined set point and the rate of product alcohol removal may be adjusted. As an example, the rate of product alcohol removal may be adjusted to minimize the toxic effects of the product alcohol on the microorganism. Real-time process measurements may be used to adjust the fermentation broth removal flow rate to match the generation of product alcohol. In this way, the ISPR process may be performed at rates required to maintain a low product alcohol set point in the fermentation broth throughout the fermentation. One benefit of this approach is the microorganism experiences the least exposure to potentially damaging temperature and pressure extremes. Another benefit of using process measurements to adjust the rate of ISPR processes is the potential for energy savings. For example, depending on the design of the ISPR process, as the product alcohol production rate increases, one or more ISPR processing units may be brought on line as needed to maintain the desired product alcohol set point in the fermentation broth.

Real-time measurements may also be used to monitor the product alcohol concentration in recycled fermentation broth following the ISPR process. This measurement can impact the efficient operation of the ISPR process as well as fermentation conditions. These measurements allow for the optimization of the ISPR unit operation throughout the course of the fermentation process and provide an early indication of any disruption of the ISPR process, for example, an increase in product alcohol concentration (e.g., above the desired set point) in the recycled fermentation broth.

Process measurements may also be used to improve the efficiency and operation of the ISPR process. As an example, real-time measurements of the production rate of product alcohol in the fermentation broth may be used to adjust the flow rate of the fermentation broth to the pre-flash tank or flash tank. As another example, the absorption liquid may be monitored using real-time measurements. These measurements may be used to adjust the flow of the absorption liquid as well as to monitor the regeneration of the absorption liquid and generation of by-products of the fermentation process which may inhibit absorption. Real-time measurements may be used to monitor the reaction of carbon dioxide with the absorption liquid, the generation of bicarbonate, and the regeneration of the absorption liquid. Examples of real-time measurements of carbon dioxide and bicarbonate are described in U.S. Patent Application Publication No.

2012/0035398, which is incorporated herein by reference. The bicarbonate measurement may be used to adjust the operation of the absorption unit and absorption liquid regeneration units.

The type of process used to conduct the fermentation may be either batch, fed batch in which sterile culture medium is added continuously or periodically to the inoculated fermentation batch, and the volume of the fermentation broth increases with each addition of medium, or continuous in which sterile medium is fed continuously into the fermentation vessel and the fermented product is continuously withdrawn so the fermentation volume remains unchanged.

The fermentation may be conducted at a temperature in the range of about 20° C. to about 60° C., in the range of about 25° C. to about 50° C., in the range of about 25° C. to about 42° C., or in the range of about 28° C. to about 35° C. In some embodiments, the fermentation may be at a temperature of about 20° C., about 25° C., about 30° C., about 35° C., about 40° C., about 45° C., about 50° C., about 55° C., or about 60° C. The pH is often somewhat acidic, with optimum pH typically in the range of about 4.5 to about 6.5, although there is usually tolerance to lower pH such as about 3 or about 2. In some embodiments, the fermentation may be conducted at a pH of about 7, about 8, about 9, about 10, or about 11. In some embodiments, the fermentation may be conducted at a pH in the range of about 2 to about 7 or higher. In some embodiments, the fermentation may be performed at about atmospheric pressure. In some embodiments, the fermentation may be performed at a pressure of about 0.9 atm, about 1.0 atm, about 2.0 atm, about 3.0 atm, about 4.0 atm, or about 5.0 atm (e.g., about 13 psia to about 75 psia).

For the processes and methods described herein, microorganisms may be cultured in a fermentation broth until a certain cell density is attained known as the "growth phase" (or "propagation phase"). In addition, fermentations may be performed under aerobic, microaerobic, or anaerobic conditions, and with or without agitation. For example, anaerobic conditions are those that are devoid of oxygen, aerobic conditions are those that contain oxygen, and microaerobic conditions are those where oxygen is present at a level below that found in air. Growth of the culture may be monitored by measuring optical density, typically at a wavelength of 600 nm.

The microorganism may be removed from the fermentation broth by a number of means including flocculation, centrifugation, settling, and/or filtration. This may be done before or after the fermentation broth is circulated to the pre-flash tank or flash tank. Where further desired, the microorganism may be recycled to the fermentation broth. Recycling of the microorganism creates a high biomass concentration which can reduce the time for the conversion of substrate to product and increase productivity. In some embodiments, fresh fermentation medium and/or microorganism may be added to the fermentation vessel at any time during the fermentation process.

In some embodiments, the microorganism may be immobilized or encapsulated by various immobilization or encapsulation techniques including, for example, but not limited to, entrapment in a gel matrix, covalent binding to surfaces of various support materials, or adsorption on a support. As examples, the microorganism may be immobilized or encapsulated using alginate, calciumalginate, or polyacrylamide gels, or through the induction of biofilm formation onto a variety of high surface area support matrices such as diatomite, celite, diatomaceous earth, silica gels, plastics, or resins. Immobilized cells may be used in a fixed-bed or fluidized-bed reactors. Immobilization or encapsulation may improve productivity such as specific volumetric productivity, metabolic rate, product alcohol yields, tolerance to product alcohol.

In some embodiments, the fermentation broth may be agitated to maintain suspension of the microorganism or the fermentation broth may be passed through a pressure letdown device such as a valve, nozzle, or orifice, which may subject the microorganism to shear stress. Shear stress may lead to cell damage such as cell wall damage, morphological variations, changes in cellular metabolism, and decreased cell viability. In order to determine the impact of shear stress on a microorganism, a number of factors may be assessed including, for example, slurry viscosity, flow rates, energy dissipation rate, and exposure time (see, e.g., Lange, et al., J. Chem. Technol. Biotechnol. 76:501-505, 2001; Katherine Smart, *Brewing Yeast Fermentation Performance*, Chapter 4 (2d ed. 2003); El-Temtamy, et al., Eur. J. Appl. Microbiol. Biotechnol. 15:156-160, 1982). Based on the assessment of these factors, equipment operating parameters such as pump and agitator speeds, tank occupancy time, nozzle size, pressure changes, and flow rates (m/s) may be adjusted to minimize shear damage to the microorganism. In addition, immobilization and encapsulation may minimize the effects of shearing on the microorganisms.

During fermentation, the fermentation broth may be subjected to alternating cycles of high and low pressures. During a low pressure cycle, gas/vapor bubbles may form in the fermentation broth, and these bubbles may then collapse when the fermentation broth is subjected to a high pressure cycle (known as "cavitation"). The collapse of the gas/vapor bubbles can generate strong shear forces that may cause damage to the microorganism (e.g., cell disruption). To minimize the effect of high/low pressure cycles, the fermentation equipment, for example, a pressure letdown device, may be designed to prevent the occurrence of cavitation. The process of cavitation can be analyzed utilizing models of cavitation flow as described in Doulah, et al., (Biotechnol. Bioeng. 19:649-660, 1977) and Baranov, et al., (Technol. Physics 52:927-933, 2007). In some embodiments, the microorganism may be separated from the fermentation broth, for example, by centrifugation or membrane filtration prior to a pressure letdown, and the microorganism may be recycled to the fermentation vessel for another fermentation cycle.

In a further embodiment of the methods described, removal of product alcohol may be initiated when the concentration of product alcohol in the fermentation vessel reaches a certain concentration range, when a certain rate or titer is reached, or at the commencement of the fermentation. For example, removal of butanol from the fermentation vessel may be initiated when the concentration of butanol is at least about 5 g/L to at least about 40 g/L, which may lead to a reduction in the inhibitory effect of butanol on the microorganism. In some embodiments, the concentration of butanol may be at least about 50 g/L, at least about 60 g/L, or higher. In turn, a reduction in the inhibitory effect of a product alcohol can lead to improved growth, rate, titer, and/or yield of the fermentation process. In other embodiments, the product alcohol in the fermentation vessel may be maintained below a preselected threshold. The preselected threshold may depend on the tolerance of the microorganism to the product alcohol. In some embodiments, the threshold may be less than about 20 g/L. In other embodiments, the threshold may be below about 8 g/L, below about 10 g/L, below about 15 g/L, below about 25 g/L, below about 30 g/L, or below about 40 g/L. Using methods described herein, one skilled in the art can easily measure the tolerance threshold of a microorganism to determine when the removal of product alcohol may be initiated.

At a preselected point in time during the fermentation process, intermittently according to a preselected schedule, or continuously during the process of fermentation, product alcohol may be recovered from the fermentation broth. Following recovery of the product alcohol from the fermentation broth, the residual fermentation broth may be recycled back to the fermentation vessel to continue the fermentation process. Additional medium components, such as glucose or other fermentable carbon sources and nutrients, may be added to the fermentation vessel as necessary.

Initiation of the removal of product alcohol can have an impact on the viability of the microorganism and the economic operation of the fermentation process. For example, initiating product alcohol removal too early may result in an excess consumption of energy and may also expose the microorganism to unnecessary stress. Similarly, initiating product alcohol removal too late can result in inhibition of microorganism growth and fermentation due to exposure of the microorganism to excess concentrations of product alcohol. As such, removal of product alcohol from the fermentation broth may be initiated when the concentration of the product alcohol in the fermentation broth reaches a certain amount.

The optimum time to initiate product alcohol removal may also be determined, for example, by modeling (e.g., dynamic modeling). Factors that may be considered in developing a model for product alcohol removal include, but are not limited to, microorganism growth rate, glucose consumption rate, and product alcohol yield. Other factors that may also be considered for this modeling include chemostat data, batch cycle data, or commercial operation data (e.g., yield loss due to contamination of fermentation vessel). Dynamic modeling may be performed using, for example, Excel® (Microsoft® Corporation, Redmond, Wash.), MatLab® (The MathWorks, Inc., Natwick, Mass.), and Aspen Custom Modeler® or Aspen Plus Dynamics® (Aspen Technology, Inc., Burlington, Mass.); and examples of dynamic modeling are described in, for example, Nandong, et al., Chemical Product and Process Modeling 1: Article 8, 2006.

The inhibitory effects of the product alcohol may be minimized by removal of the product alcohol from the fermentation broth (e.g., in situ product removal). Technologies such as liquid-liquid extraction, gas stripping, absorption, ionic liquids, pervaporation, phase separation, supercritical extraction, perstraction, vacuum fermentation, reverse osmosis, or a combination of these technologies may be used to remove the product alcohol from the fermentation broth. In some embodiments, the product alcohol may be continuously removed from the fermentation broth.

Vacuum flash (or flash fermentation) is another means to remove product alcohol from a fermentation broth. This technology provides an economical method to recover a product alcohol such as butanol from a fermentation broth or aqueous solution.

Generally, in a vacuum flash, the fermentation broth is circulated to a flash tank (e.g., vacuum chamber) where the product alcohol is vaporized. For example, in the flash tank, a flashed fermentation broth may form a vapor stream enriched in product alcohol and a liquid stream (e.g., bottoms stream) at least partially depleted in product alcohol. The vapor stream may be further processed for recovery of product alcohol. The liquid stream, which may be partially depleted of product alcohol, may be returned to the fermentation vessel. The vacuum flash may be a batch process, fed-batch-process, or continuous process.

As described herein, gas stripping is another technology that may be used to remove product alcohol from the fermentation broth or other aqueous solutions. This technology reduces the inhibitory effects of the product alcohol and does not impair the microorganism nor remove nutrients from the fermentation broth. Gas (e.g., carbon dioxide, oxygen, nitrogen, hydrogen, air) may be sparged into the fermentation broth to remove the product alcohol. The volatile product alcohol and other gases, including sparged gases as well as any gases produced during fermentation, may then be partially condensed and recovered from the condenser, and the gas may be recycled to the fermentation broth (see FIG. 1A). In some embodiments, the fermentation broth may be removed from a fermentation vessel and fed to a gas stripper (or scalper) and then to a condenser to remove product alcohol from the fermentation broth. The stripped fermentation broth may be recycled to the fermentation vessel (see FIG. 1B). The gas stripper may be, for example, a continuous stripper or a packed bed stripper. Gases may also be removed (i.e., stripped or scalped) using other means such as heating the fermentation broth or aqueous solution to between about 20° C. to about 100° C. to volatize the gas. In addition, gases may be removed by reducing the pressure of the fermentation broth or aqueous solution to below atmospheric pressure (e.g., between about 0.3 psia to about 10 psia) to vaporize the gas or by absorption of the gases from the fermentation broth or aqueous solution, or a combination of these technologies. The stripped gases may also be further processed, for example, by the use of a scrubber, absorption, or condensation, to remove any product alcohol from the gas.

Figure 1C:
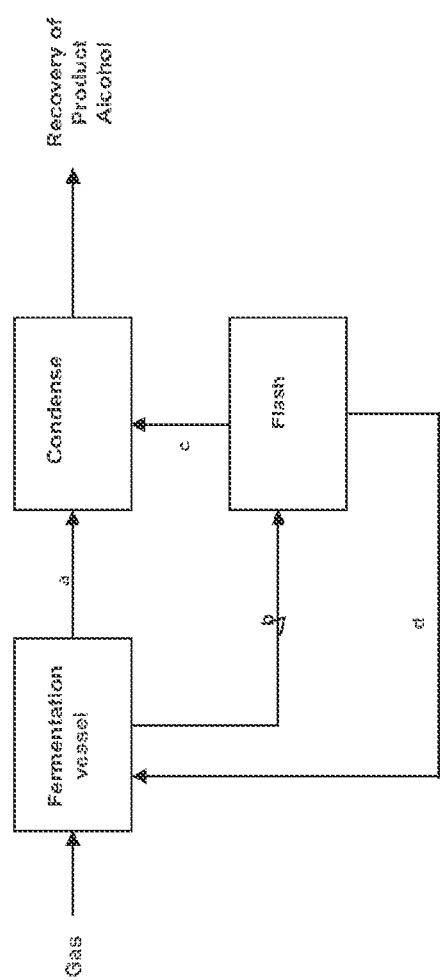

In some embodiments, gas stripping may be used in combination with vacuum flash. By removing the gases prior to vaporization of the product alcohol, the gases are not processed in the flash recovery of the product alcohol and therefore, do not become part of the vapor stream produced by the flash process. Additionally, the volume of vaporized product alcohol is smaller and easier to process. Referring to FIG. 1C, gas may be sparged into the fermentation vessel and then may exit (a) the fermentation vessel to a condenser. The fermentation broth or a portion thereof (b) may be conducted to a flash tank for vaporization creating a vapor stream comprising product alcohol. In some embodiments, the flash tank may operate at a pressure lower than the fermentation vessel (e.g., atmospheric pressure). The vapor stream (c) may be sent to the condenser and eventually for further processing and recovery of product alcohol, water, and carbon dioxide. The portion of fermentation broth that was not vaporized, and is now partially depleted of product alcohol (d), may be returned to the fermentation vessel. In some embodiments, the fermentation broth may be treated or neutralized to remove components that may have an adverse effect on the fermentation, and the treated fermentation broth may be recycled to the fermentation vessel.

Also, provided herein are processes by which fermentation broth leaving a fermentation vessel is processed using a vacuum flash. The vacuum flash may be carried out in a single-stage flash tank. Alternatively or in conjunction, the vacuum flash may be carried out in a multi-stage distillation column under conditions such that a flashed fermentation broth forms a vapor stream enriched in product alcohol and a bottoms stream substantially depleted in product alcohol. In some embodiments, the vapor stream from the flashed fermentation broth may be absorbed into a second liquid stream at a higher temperature than it could be condensed on its own.

As one embodiment of the processes described herein, a stream of fermentation broth, which includes product alcohol, gases (e.g., carbon dioxide), other components of the fermentation broth and may include the microorganism, is removed from a fermentation vessel and conducted to the gas stripper (or scalper) where the gases are removed from the fermentation broth and product alcohol remains in the fermentation broth. After removal of the gases, the fermentation broth is conducted to a flash tank and partially vaporized to produce a vapor stream that comprises water and product alcohol. The vapor stream may comprise between about 1% by weight to about 95% by weight product alcohol. The vaporization can take place at temperatures of from about 20° C. to about 100° C. and under vacuum conditions (e.g., at pressures from about 0.3 psia to about 10 psia). For example, vaporization may take place at temperatures of from about 20° C., about 25° C., about 30° C., about 35° C., about 40° C., about 45° C., about 50° C., about 55° C., about 60° C., about 65° C., about 70° C., about 80° C., about 90° C., about 95° C., or about 100° C.; and at pressures from about 0.3 psia, about 0.4 psia, about 0.5 psia, about 1.0 psia, about 2.0 psia, about 3.0 psia, about 4.0 psia, about 5 psia, or about 10 psia. The heat generated from the fermentation process may be used as a source of heat for vaporization in the flash tank. The flash tank may be maintained at below atmospheric pressure. The fermentation broth or portion thereof that has not been vaporized and is partially depleted in product alcohol may be returned to the fermentation vessel. The vapor stream may be conducted to a vapor condenser for condensation, and then the condensed solution may be conducted to a separator to recover the product alcohol.

To facilitate condensation, the vapor stream may be contacted with a condensing solution. In some embodiments, the condensing solution may be at a temperature less than about 30° C. In some embodiments, the temperature of the vapor stream may be different from the temperature of the condensing solution by at least about 1° C. to at least about 20° C. In some embodiments, the temperature of the vapor stream may be different from the temperature of the condensing solution by at least about 1° C., at least about 2° C., at least about 3° C., at least about 4° C., at least about 5° C., at least about 6° C., at least about 7° C., at least about 8° C., at least about 9° C., at least about 10° C., at least about 11° C., at least about 12° C., at least about 13° C., at least about 14° C., at least about 15° C., at least about 16° C., at least about 17° C., at least about 18° C., at least about 19° C., or at least about 20° C. In some embodiments, the condensing solution may comprise the product alcohol or another alkyl alcohol. In some embodiments, the vapor stream may be sprayed (e.g., spray nozzle) with a condensing solution. As an example, the fermentation broth (or an aqueous solution) comprising the product alcohol is subjected to a flash (i.e., reduced pressure) to form a vapor stream comprising the product alcohol. This vapor stream may then be contacted with a condensing solution comprising product alcohol or another alkyl alcohol to form a condensate comprising the product alcohol. The concentration of the product alcohol in the condensate may be greater than the concentration of the product alcohol in the fermentation broth. In some embodiments, the condensate comprising the product alcohol may be used as the condensing solution, and in some embodiments, this condensate may be cooled using, for example, a heat exchanger or evaporative cooling, prior to contact with the vapor stream. In another embodiment, vaporization of the fermentation broth (or aqueous solution) to produce a vapor stream and condensation of the vapor stream may be conducted in a single vessel.

In some embodiments, the condensate may form a product alcohol-rich liquid phase and a product alcohol-lean liquid phase (or water-rich liquid phase). In a further embodiment, the product alcohol-rich liquid phase and the water-rich liquid phase may be separated, and the product alcohol may be recovered from both the product alcohol-rich liquid phase and the water-rich liquid phase. A portion of the water-rich liquid phase may be returned to the fermentation vessel or may be used as the condensing solution.

In some embodiments, the concentration of the product alcohol in the fermentation broth or a portion thereof may be increased to at least the saturated concentration (e.g., saturation point) of the product alcohol in the fermentation broth. That is, the concentration of the product alcohol is increased in the fermentation broth or a portion thereof to at least saturation point of the product alcohol. In another embodiment, the concentration of water is decreased in the fermentation broth or a portion thereof to at least that of saturation of the product alcohol in the fermentation broth. The point of saturated concentration may depend on the conditions (e.g., temperature, pressure) of the fermentation broth. In some embodiments, increasing the concentration of the product alcohol in the fermentation broth or a portion thereof refers to an increase in the concentration of the product alcohol in the fermentation broth or a portion thereof relative to the initial (or starting) concentration of the product alcohol in the fermentation broth or a portion thereof.

In some embodiments of the processes and methods described herein, the fermentation broth, or at least a portion thereof, may be removed from the fermentation vessel to a second vessel or "flash vessel" and may be at least partially vaporized by vacuum flash. In other embodiments, the fermentation broth, or at least a portion thereof, may be partially vaporized at temperatures from about 20° C. to about 100° C. and under vacuum conditions (e.g., about 0.3 psia to about 10 psia). For example, vaporization may take place at temperatures of from about 20° C., about 25° C., about 30° C., about 35° C., about 40° C., about 45° C., about 50° C., about 55° C., about 60° C., about 65° C., about 70° C., about 80° C., about 90° C., about 95° C., or about 100° C.; and at pressures from about 0.3 psia, about 0.4 psia, about 0.5 psia, about 1.0 psia, about 2.0 psia, about 3.0 psia, about 4.0 psia, about 5 psia, or about 10 psia. The vapor stream produced by the vaporization may comprise water, product alcohol, and carbon dioxide. In some embodiments, the vapor stream may be contacted with an absorption liquid to form an absorption liquid phase (see, e.g., WO 2011/100299 and U.S. Patent Application Publication No. 2012/0211348, the entire disclosures of which are incorporated in their entirety herein by reference). In some embodiments, the absorption temperature may be greater than the vaporization temperature. For example, the absorption temperature can be about 5° C., about 10° C., about 15° C., about 20° C., about 25° C., about 30° C., or about 35° C. greater than the vaporization temperature. In some embodiments, the absorption pressure may be greater than the vaporization pressure. For example, the absorption pressure can be about 1 psia, about 2 psia, about 3 psia, about 4 psia, about 5 psia, about 10 psia, or about 15 psia greater than the vaporization pressure.

In some embodiments, the absorption liquid may preferably absorb a portion of the product alcohol out of the vapor stream. In some embodiments, the absorption liquid may absorb carbon dioxide. The absorption liquid minimizes the need for a reduction in temperature (e.g., chilling) and reduces the portion of the vapor stream that may require an increase in pressure (e.g., recompression). The absorption liquid may be tailored to optimize the removal of certain components of the vapor stream. For example, an absorption liquid comprising 2-ethyl hexanol and a glycol can be used to recover substantial portions of product alcohol and water from the vapor stream. Furthermore, the heat from this absorption may provide at least a portion of the heat of vaporization.

In some embodiments, the contact with the absorption liquid takes place at a sub-atmospheric pressure close to that of operation of the flash, and in some embodiments, substantially all the vapor stream is absorbed. The flash and absorption units can be coupled in such a way as to minimize pressure drop between the two operations.

To recover the product alcohol, the heat of absorption is removed from the absorption liquid, for example, by circulation over a cooler. In such an embodiment, the heat can be removed from the circulating fluid using an inexpensive cooling medium (e.g., using the fermentation liquid) than would be required for condensation of the vapor stream without an absorption liquid. The cooling may be conducted via an air cooler or a heat exchanger operating from a cooling water circuit or using, for example, river water directly. The amount of absorption liquid that would need to be re-circulated depends on the temperature rise that may be allowed over the absorption device which may be an absorber, absorption column (e.g., multi-stage absorption column), spray tower, ejector-venturi scrubber, an agitated tank, a liquid ring vacuum pump, an eductor, or any such device or apparatus that enables the contacting of a vapor and a liquid. As an example, in a multi-stage absorption column, the upper temperature is limited by vapor pressures from the solution at the pressure of absorption while the lower temperature is limited by approach to the cold utility temperature (e.g., cooling water).

For processes provided herein, contact of the vapor stream with an absorption liquid may be carried out under a vacuum, and may be carried out at pressures of from about 0.3 psia to about 3 psia. In some embodiments, the contacting can take place at a pressure of about 0.3 psia, about 0.4 psia, about 0.5 psia, about 0.6 psia, about 0.7 psia, about 0.8 psia, about 0.9 psia, about 1 psia, about 2 psia, or about 0.3 psia. In some embodiments, the contacting may take place at a pressure of less than about 3 psia, or less than about 2 psia. The contacting may be carried out at temperatures of from about 25° C. to about 60° C. In some embodiments, contacting may be carried out at temperatures of from about 25° C., about 30° C., about 35° C., about 40° C., about 45° C., about 50° C., about 55° C., or about 60° C. In some embodiments, the vaporization step and the contacting step are carried out at the same pressure or essentially the same pressure.

Suitable absorption liquids include, but are not limited to, organic liquids, organic amines, and ionic liquids, as well as biologically-derived liquids of the above, or mixtures thereof (see, e.g., WO 2011/100299 and U.S. Patent Application Publication No. 2012/0211348, the entire disclosures of which are incorporated in their entirety herein by reference). For example, organic liquids that may be utilized as absorption liquids include ethylene glycol, ethylene glycol monomethyl ether, diethylene glycol, propylene glycol, dipropylene glycol, polyethylene glycols, polyethylene glycol ethers, polypropylene glycol ethers, 1,3-propanediol, or a mixture thereof. Organic amines that may be used as absorption liquids include monoethanolamine (MEA), 2-amino 2-methyl propanol (AMP), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP), and methyldiethanolamine (MDEA), any mixture thereof, or any aqueous solutions thereof. In some embodiments, the molar ratio of absorption liquid amine to carbon dioxide in the vapor stream is at least about 1.01 to about 2, that is, the molar ratio is greater than about 1.

Examples of suitable ionic liquids include those described in U.S. Patent Application Publication Nos. 2010/0143993, 2010/0143994, and 2010/0143995, incorporated herein by reference. Other examples of absorption liquids include 2-ethyl hexanol (2-EH), isolauryl alcohol, isocetyl alcohol, oleyl alcohol, phenol, glycerol, fatty acids, fatty esters, fatty alcohols, acids, alcohols, amides such as, but not limited to, dialkyl acetamide, N,N-bis(2-ethylhexyl)acetamide, and di-isobutyl isobutyramide, esters, ketones, carbonates, phosphates such as, but not limited to, tri-butyl phosphate and tri-isobutyl phosphate, salt solutions such as brine, potassium carbonate, and mixtures thereof. The fatty acids, fatty esters, and fatty alcohols may be derived from corn oil, soybean oil, or castor oil.

In some embodiments, the temperature at the onset of the absorption of the vapor stream into the absorption liquid may be greater than the temperature at the onset of condensation of the vapor stream in the absence of the absorption liquid. The temperature of onset of absorption or condensation can be assessed by calculation using standard vapor liquid equilibrium methods that are based on experimental data or by direct measurement from the process. In some embodiments, the temperature at the onset of the absorption of the vapor stream into the absorption liquid phase may be greater than the temperature at the onset of condensation of the vapor stream in the absence of the absorption liquid by at least about 2° C.; at least about 3° C.; at least about 5° C.; at least about 10° C.; at least about 15° C.; at least about 20° C.; or at least about 30° C.

In another embodiment, the absorption temperature may be higher than the vaporization temperature. For example, the absorption temperature may be about 5° C., about 10° C., about 15° C., about 20° C., about 25° C., about 30° C., about 35° C. higher than the vaporization temperature. In some embodiments, the absorption pressure may be higher than the vaporization pressure. In some embodiments, the absorption pressure may be increased by, for example, vapor recompression. For example, the absorption pressure may be about 1 psia, about 2 psia, about 3 psia, about 4 psia, about 5 psia, about 10 psia, or about 15 psia higher than the vaporization pressure.

It will be appreciated that it is beneficial to absorb as much of the vapor stream as possible into the absorption liquid. In some embodiments, at least about 50% of the vapor stream may be captured by the absorption liquid. In some embodiments, at least about 55%, at least about 60%, at least about 65%, at least about 70%, at least about 75%, at least about 80%, at least about 85%, at least about 90%, at least about 95%, or at least about 99% of the vapor stream is absorbed into the absorption liquid. In some embodiments where the product alcohol is butanol, the vapor stream may comprise about 50-80% by mass of water, about 10-40% by mass of butanol, and about 0-20% by mass carbon dioxide. It will be appreciated that absorption, condensation, and similar processes may be made easier by establishing a low concentration of carbon dioxide in the vapor stream. It will be further appreciated that absorption, condensation, and similar processes may be made easier by establishing a high mass ratio of butanol to carbon dioxide. This ratio may be on the order of 1 to 2 parts butanol to 100 parts carbon dioxide for the fermentation vessel vent. In some embodiments, this ratio may be increased to 1 to 5 parts butanol to 1 part carbon dioxide. In some embodiments, this ratio may be increased to 5 to 30 parts butanol to 1 part carbon dioxide. In some embodiments, this ratio may be increased to 10 to 100 parts butanol to 1 part carbon dioxide.

In some embodiments where product alcohol is absorbed into the absorption liquid, the product alcohol may be recovered from the absorption liquid such that the absorption liquid is concurrently regenerated and recycled. The recovery and regeneration may be achieved using a process comprising: pumping the absorption liquid to a distillation column comprising a stripping section and optionally a rectification section; distilling the absorption liquid such that a bottoms liquid product and a tops vapor product are produced; and recovering the bottoms product comprising water and the absorption liquid from the distillation column. The feed to the distillation column may be preheated to reduce the energy input required at the base of the distillation column using techniques well known to those skilled in the art. In some embodiments, the distillation column may be at a pressure at or above atmospheric pressure.

The present invention will also be described with reference to the Figures. From time to time, terms referred to in the text and Figures such as "condense" and "condensation," "compress" and "compression." or "fermentation" or "fermentation vessel" may be used synonymously. The processes described herein may also include methods for producing a fermentative product such as a product alcohol, through fermentation. For example, feedstock comprising one or more fermentable carbon sources and a microorganism may be introduced to a fermentation vessel. The microorganism may metabolize the one or more fermentable carbon sources to produce a product alcohol such as butanol. As described below, in some embodiments, prior to the introduction to the fermentation vessel, the feedstock may be liquefied to create feedstock slurry; and in some embodiments, the feedstock slurry may be separated to produce a liquid phase and a solid phase. In some embodiments, the feedstock may be dry milled or wet milled. In some embodiments, simultaneous saccharification and fermentation may occur in the fermentation vessel. The product alcohol produced from the fermentation process may be recovered utilizing the methods described herein and as illustrated in the Figures. As one skilled in the art can appreciate, the methods described herein may be modified in a variety of ways to optimize the fermentation process for the production of a product alcohol.

Figure 2A:
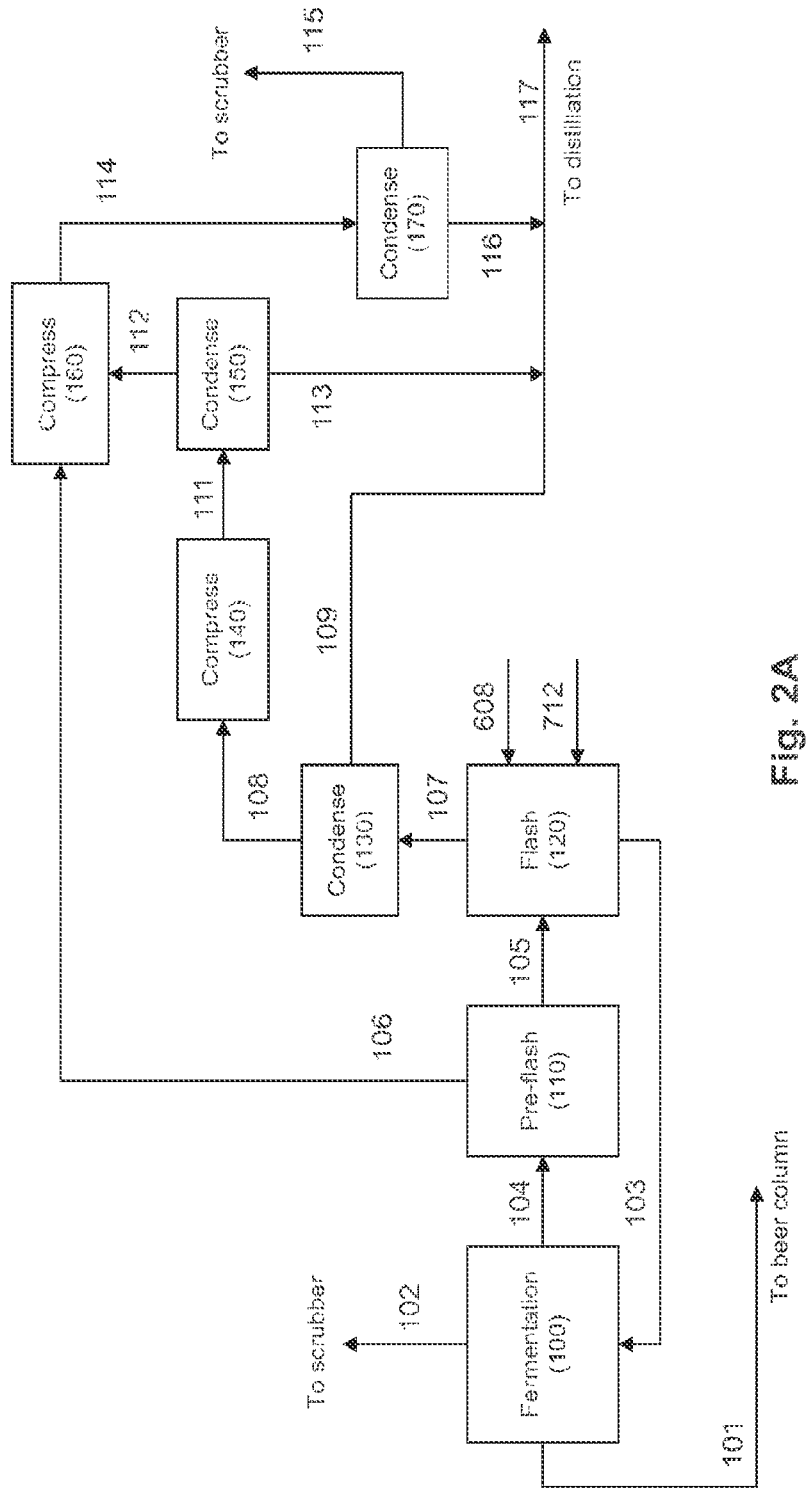
Figure 2B:
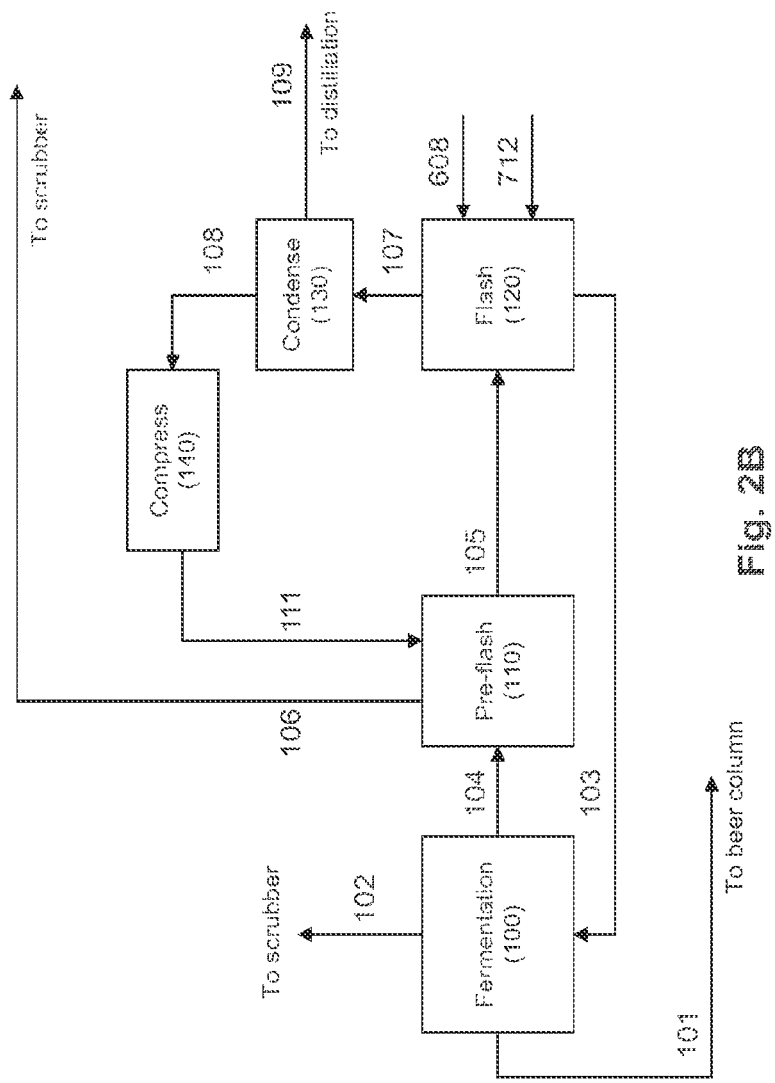

FIGS. 2A and 2B illustrate exemplary process flow diagrams for production of a product alcohol such as ethanol or butanol, according to an embodiment of the present invention. During production of a product alcohol in fermentation 100, the product alcohol may be removed from the fermentation broth to minimize the toxic effects of the product alcohol on the microorganism. For example, vapor stream 102 produced during fermentation may be vented, for example, to a scrubber system. When the fermentation batch is complete, the entire contents 101 of the fermentation vessel 100 may be transferred to a beer column for the separation of remaining product alcohol from the fermentation broth.

Product alcohol removal may be accomplished continuously throughout the fermentation batch, by looping a stream of fermentation broth through a flash system. The flash system may be used to vaporize product alcohol from the fermentation broth. Fermentation broth 104 may be transferred to pre-flash 110. Fermentation broth 104 may be taken from any level of a fermentation vessel 100. Reduced pressure may be used in pre-flash 110 to remove non-condensibles 106 such as carbon dioxide, from the fermentation broth. The purpose of the pre-flash is to reduce the volume of non-condensibles which may be processed through downstream condensers and compressors. The pre-flash may be heated by passing fermentation broth 104 through a heat exchanger, injecting steam into the flash tank, or by any other means. The pre-flash may be augmented by injecting another non-condensible gas. Vapor stream 106 may be compressed to above atmospheric pressure in compression 160 (FIG. 2A) or vapor stream 106 may be directed to a scrubber system (FIG. 2B). Compression 160 may be the source of the vacuum in the pre-flash. Vacuum and compression may be achieved, for example, by a vacuum pump, compressor, steam jet, or other means determined by those skilled in the art. Liquid stream 105 from pre-flash 110 may be transferred to flash 120. The pressure of the flash may be operated at a pressure lower than the pre-flash pressure. In some embodiments, the pressure of the pre-flash may be about 3 psia to about 25 psia. In some embodiments, there may be one or more pre-flashes. Heat may be applied to the flash by passing liquid stream 105 through a heat exchanger prior to entering flash 120, adding steam 608 and/or hot water 712 directly to flash 120, or by other means. The flash may be designed and operated to avoid deactivating the microorganism by exposure to excessive temperature. For example, acceptable exposure time and temperature may be determined by measuring the change in activity of the microorganism over a one-hour period after exposure to a ladder of temperatures, for example, from about 30° C. to about 50° C. or higher temperatures (e.g., about 60° C., 70° C., 80° C., 90° C., or 95° C.) if the microorganism remains active at 50° C. for a ladder of time periods (see, e.g., Example 2). The temperature of the flash may be as high as possible, given the length of time that the microorganism is exposed to elevated temperature without deactivating the microorganism by more than about 10%, or more than about 5%, or more than about 1%.

The flash may be directly heated by injection of process steam generated in downstream steps including absorption regeneration, absorption liquid cooling, refining, and evaporators (e.g., thin stillage evaporators). The flash may be directly heated by injection of sub-atmospheric steam generated by heat exchange between the process water substantially free of product alcohol and the condensers of vacuum columns in the refining area. In one embodiment of this invention, the flash may be heated by injection of hot water substantially free of product alcohol from the refining train (e.g., from the bottoms of a side stripper column) via stream 712 (see FIG. 8). In some embodiments, the temperature of the hot water may be greater than the temperature of the flash. The hot water may contain, for example, less than 0.05 weight percent product alcohol. The hot water may be injected under a baffle so that the hot water partially flashes and cools by flashing before mixing with the fermentation broth. The hot water may be injected at a rate which maintains a constant level in a full fermentation vessel. The flash may also be heated by the injection of a mixture of hot water and steam whereby the amount of hot water is selected to maintain constant fermentation broth volume and the amount of steam is selected to vaporize the product alcohol at the rate it is produced, thereby holding the product alcohol concentration constant at a target selected based on the activity of the microorganism. The combination of steam and hot water may be created by heating water from the refining train or thin stillage evaporators with condensing vapor in the refining train or absorbent regeneration system.

Directly heated flash systems may be vacuum rated pressure vessels without internals or with only steam spargers as internals. Directly heated flash systems may be fouling resistant distillation columns including trayed columns designed to operate with low pressure drop. Directly heated flash systems may be spray columns or may be baffle columns.

The flash may be indirectly heated by exchange with a gas, a condensing vapor, or a liquid. The flash may be indirectly heated with absorbent liquid, for example, where the absorbent liquid is at a higher temperature than the flash (see, e.g., processes described in U.S. Patent Application Publication Nos. 2011/0162953 and 2011/0162954, incorporated herein by reference). The flash may be indirectly heated with condensing vapors from vacuum columns in other sections of the process. The flash may be indirectly heated by condensing compressed vapors generated in a refrigerant loop absorbing heat from the flash vapor condenser. The flash may be indirectly heated by compressing the flash vapors to a higher pressure and condensing said vapors in the hot side of an indirect exchanger. The feed to the flash may be preheated by exchange with the flash bottoms in a heat exchanger. In some embodiments, the flash bottoms may be maintained at a higher temperature using another heat source such as a steam heater. In some embodiments, a portion of the flash bottoms stream may be recirculated through a heat exchanger to absorb heat from other sections of the process, and injected back into the flash.

The indirectly heated flash may be a design similar to an ethanol plant thin stillage evaporator modified so that the vapor velocities do not cause excessive liquid froth formation and the surface area is adequate to assure sufficient heat transfer. The feed to such a flash may be fed into a baffle column or other fouling resistant counter-current column above the evaporator, said column also receiving vapors from the evaporator.

The flash may be heated by a combination of direct and indirect heating using any combination of the processes and methods described herein. The flash may be indirectly heated by condensation of steam 608 from the thin stillage evaporator train (see FIG. 7) or steam generated in condensers in the refining train and also by direct injection of hot water. In addition, the pre-flash may also be heated by a combination of direct and indirect heating using any combination of the processes and methods described herein.

It is not necessary to remove all entrained liquid from the flash. Flow from the flash may be vertical rising or vertical falling. If vertical falling, the vapor flow direction may be changed to vertical rising in a way which disengages liquid.

A pre-flash or flash may be provided for each of several pressure stages of the vacuum system. As an example, the pressure to operate one pre-flash or flash may be at the vacuum produced in a water sealed liquid ring pump such as a Roots blower, operated at the vacuum which corresponds to the vapor pressure of the liquid seal at a temperature of available cooling water plus an allowance of 2° C. to 10° C. for indirect heat transfer from the product alcohol-containing condensate. A liquid ring pump may be economical to purchase and operate compared to a centrifugal compressor. Further economies may be achieved by venting a centrifugal compressor operating a lower inlet pressure than may be achieved in the liquid ring pump but discharging into the suction of the liquid ring pump. The design of such a system may also evaluate the potential of investment and operating cost savings which may be achieved by operating one or more pre-flashes or flashes at pressures intermediate to that of said liquid ring pump and the atmospheric flash. This may substantially reduce the size of the low pressure liquid ring pump. Each pre-flash or flash stage may be followed with a variable area orifice in the liquid discharge which may be necessary to prevent obstruction by bridging of suspended solids upstream of the orifice. No special design may be required to minimize shear exposure or rate of pressure letdown from atmospheric pressure for the microorganism. Suitable devices include valves with an inflatable elastomeric liner or butterfly valves. An inflatable liner may be preferred to benefit clean-in-place (CIP). These valves may be "stroked" as necessary when the level of suspended solids in the upstream flash tank exceeds a target, indicating the possibility of bridging.

Referring to FIG. 2A, vapor stream 107 from flash 120, containing product alcohol and water may be transferred to condensation 130. Liquid stream (or return line) 103 from flash 120 may be returned using a pump to fermentation 100. The pump may be a centrifugal pump placed below the flash system. The feed line to the pump may be designed to meet the net positive suction head requirements of the pump, and to avoid vapor lock. The circulation loop may be constructed in a way which facilitates cleaning between fermentation batches. For example, the circulation loop may have nozzles to allow injection of hot water or clean-in-place solution. It may have low point drains. It may be constructed of stainless steel or other non-corroding alloys. Return line 103 from flash 120 may enter fermentation 100 at a location at least one radius distance from the feed line to the flash. An existing circulation loop may be retrofitted for this purpose. Additional heat exchangers may be employed in the circulation loop to control temperature if needed.

Condensation 130 may be accomplished with, for example, a heat exchange condenser, spray condenser, or other means. Cooling may be achieved, for example, with cooling tower water, chilled water, or a refrigeration system. Residual non-condensed vapor stream 108 comprising carbon dioxide, product alcohol, and water may be compressed through one, two, three, or more compressor stages with interstage cooling which may induce partial condensation. Vapor stream 108 from condensation 130 may enter compression 140 and be compressed to sub-atmospheric pressure or to at least a pressure that is greater than the pressure of pre-flash 110. Compression 140 may be the source of the vacuum in the flash. Vacuum and compression may be achieved, for example, by a vacuum pump, compressor, steam jet, or other means determined by those skilled in the art. Vapor stream 111 from compression 140 may enter condensation 150 (FIG. 2A) or vapor stream 111 from compression 140 may enter pre-flash 110 (FIG. 2B). Condensation 150 may be accomplished with, for example, a heat exchange condenser, spray condenser, or other means. Cooling may be achieved, for example, with cooling tower water, chilled water, or a refrigeration system. Vapor stream 112 from condensation 150 may be transferred to compression 160. Streams 106 and 112 may be compressed to atmospheric pressure or above atmospheric pressure in compression 160. Stream (or outlet) 114 of compression 160 may be transferred to condensation 170. Condensation 170 may be accomplished with, for example, a heat exchange condenser, spray condenser, or other means. Cooling may be achieved, for example, with cooling tower water, chilled water, or a refrigeration system. Liquid condensate 109 from condensation 130, liquid condensate 113 from condensation 150, and/or liquid condensate 116 from condensation 170 may be combined to form stream 117, and stream 117 may be transferred by pumping to the distillation process area for recovery of product alcohol (FIG. 2A). In another embodiment as illustrated in FIG. 2B, liquid condensate 109 from condensation 130 may be transferred by pumping to the distillation process area for recovery of product alcohol. Vapor stream 115 from condensation 170 may be sent to a scrubber system (FIG. 2A).

Figure 3:
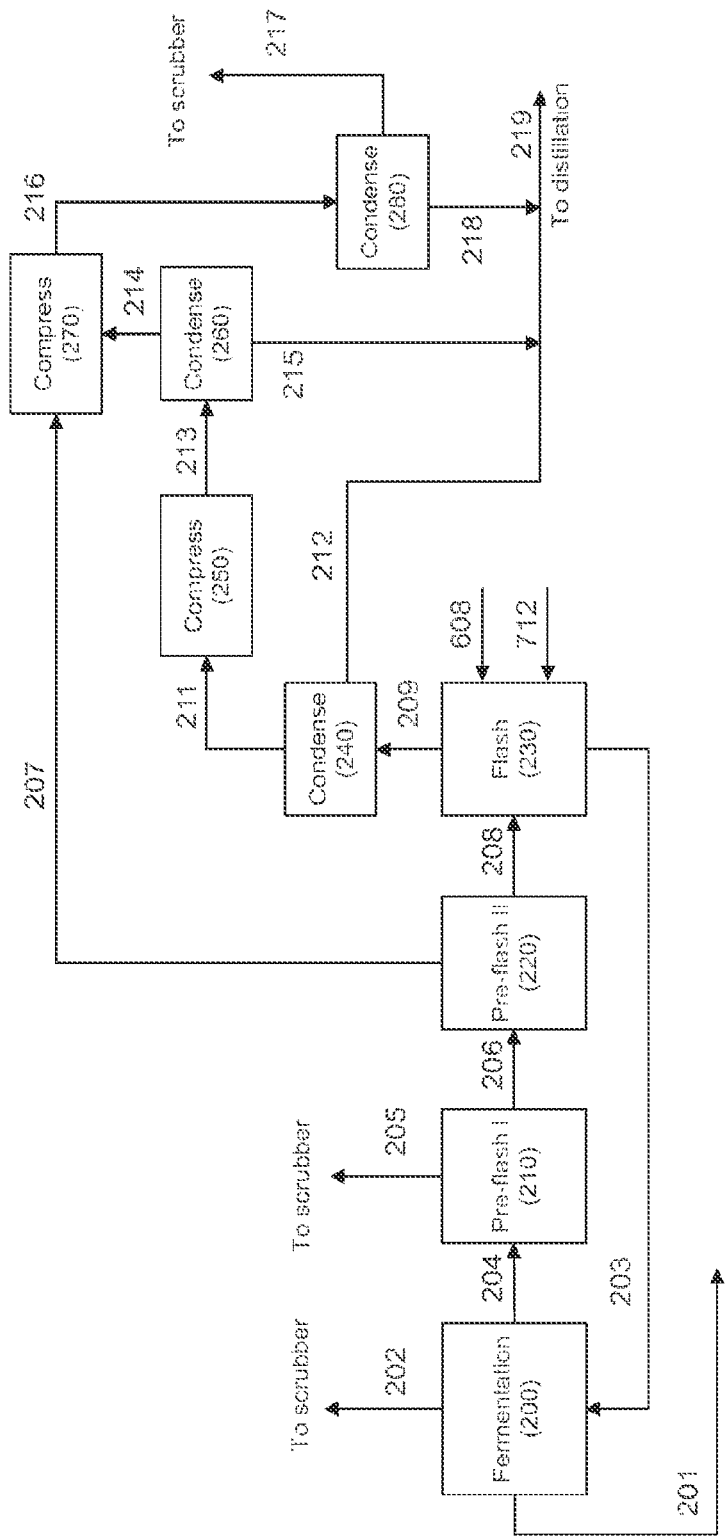
FIG. 3 is an example flow diagram for an embodiment of the processes provided herein.

FIG. 3 represents another embodiment of the processes and methods described herein. In this embodiment, an initial pre-flash may be performed at or above atmospheric pressure to remove some carbon dioxide to avoid the need to compress this volume, and subsequently reduce the cost of the compression equipment.

Vapor stream 202 produced during fermentation may be vented to a scrubber system. When fermentation is complete, the entire contents 201 of fermentation 200 may be transferred to a beer column for the separation of remaining product alcohol from fermentation broth.

Product alcohol removal may be accomplished continuously throughout the fermentation by looping a stream of fermentation broth through a flash system. If fermentation broth 204 is taken from the bottom or lower half of a fermentation vessel 200, carbon dioxide may be flashed from the fermentation broth in pre-flash I (or first pre-flash) 210 at pressure P1 (e.g., at least about 10 psia to about 25 psia) to permit atmospheric discharge of carbon dioxide 205 through a scrubber system while reducing the volume of carbon dioxide processed in subsequent compression 270. The effectiveness of pre-flash I 210 may be increased by sparging with non-condensible gas or by adding heat using any of the means described herein.

Additional pre-flashing of carbon dioxide vapor may be accomplished at sub-atmospheric pressures to reduce the carbon dioxide loading on the product alcohol vapor condenser and hence improve the efficiency of the product alcohol vapor condenser. Stream 206 from pre-flash I 210 may be transferred to pre-flash II (or second pre-flash) 220 at pressure P2 (e.g., at least about 3 psia to about 12 psia). Reduced pressure may be used in pre-flash II 220 to remove the majority of the non-condensibles, such as carbon dioxide, from the fermentation broth (e.g., P2 may be lower than P1). Pre-flash II may be heated by passing fermentation broth through a heat exchanger, injecting steam into the pre-flash tank, or by any other means described herein. Vapor stream 207 may be transferred to compression 270 and may be compressed to above atmospheric pressure. Compression 270 may be the source of the vacuum in pre-flash II 220. Vacuum and compression may be achieved, for example, by a vacuum pump, compressor, steam jet, or other means determined by those skilled in the art. Liquid stream 208 from pre-flash II 220 may be transferred to flash 230.

A flash may be used to vaporize product alcohol from the fermentation broth. The pressure P3 (e.g., at least about 0.3 psia to about 10 psia) of the flash may be operated at a pressure lower than the pressure (P2) of pre-flash II. The flash system may be heated by any of the methods described herein, which include hot water from the distillation area via stream 712 and/or steam from the evaporation area via stream 608 (see FIGS. 7 and 8). Vapor stream 209 from flash 230, containing product alcohol and water may be transferred to condensation 240. Liquid stream (or return line) 203 from flash 230 may be returned using a pump to fermentation 200. The pump may be a centrifugal pump placed below the flash system. The feed line to the pump may be designed to meet the net positive suction head requirements of the pump, and to avoid vapor lock. The circulation loop may be constructed in a way which facilitates cleaning between fermentation batches. The circulation loop may have nozzles to allow injection of hot water or clean-in-place solution. It may have low point drains. It may be constructed of stainless steel or other non-corroding alloys. Return line 203 from the flash 230 may enter fermentation 200 at a location at least one radius distance from the feed line to the flash. An existing circulation loop may be retrofitted for this purpose. Additional heat exchangers may be employed in the circulation loop to control temperature if needed.

Condensation 240 may be accomplished with, for example, a heat exchange condenser, spray condenser, or other means. Cooling may be achieved, for example, with cooling tower water, chilled water, or a refrigeration system. Residual non-condensed vapor stream 211 comprising carbon dioxide, product alcohol, and/or water may be compressed through one, two, three, or more compressor stages with interstage cooling which may induce partial condensation. Vapor stream 211 from condensation 240 may enter compression 250 and may be compressed to sub-atmospheric pressure. Compression 250 may be the source of the vacuum in flash 230. Vacuum and compression may be achieved, for example, by a vacuum pump, compressor, steam jet, or other means determined by those skilled in the art. Vapor stream 213 from compression 250 may enter condensation 260. Condensation 260 may be accomplished with, for example, a heat exchange condenser, spray condenser, or other means. Cooling may be achieved, for example, with cooling tower water, chilled water, or a refrigeration system. Vapor stream 214 from condensation 260 may be transferred to compression 270. Streams 207 and 214 may be compressed to above atmospheric pressure in compression 270. Stream (or outlet) 216 of compression 270 may be transferred to condensation 280. Condensation 280 may be accomplished with, for example, a heat exchange condenser, spray condenser, or other means. Cooling may be achieved, for example, with cooling tower water, chilled water, or a refrigeration system. Liquid condensate 212 from condensation 240, liquid condensate 215 from condensation 260, and/or liquid condensate 218 from condensation 280 may be combined to form stream 219. Stream 219 may be transferred by pumping to the distillation process area for recovery of product alcohol. Vapor stream 217 from condensation 280 may be sent to a scrubber system.

Figure 4:
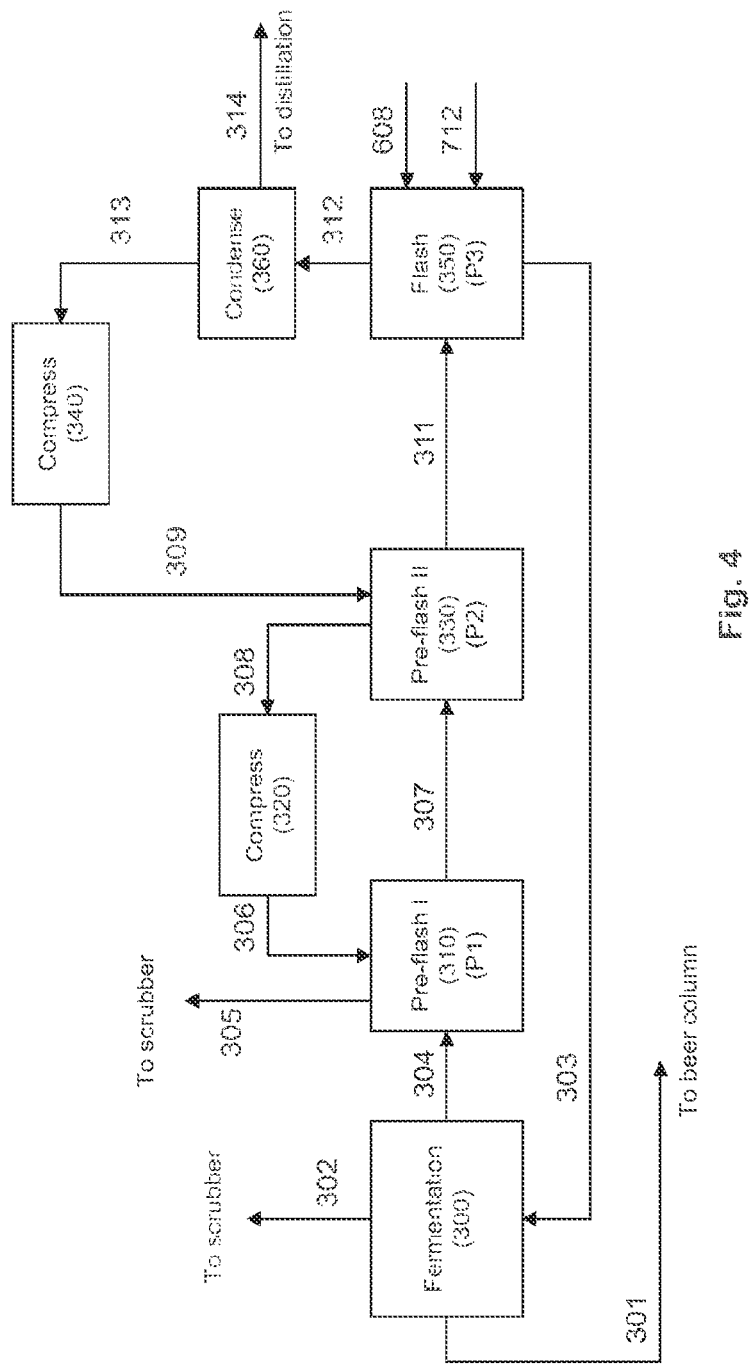
FIG. 4 is an example flow diagram for an embodiment of the processes provided herein.

FIG. 4 illustrates another embodiment of the processes and methods of the present invention. In this embodiment, the flash equipment may be used for cooling and condensing vapors between the compression steps. The heat of compression and condensation may also provide at least some of the heat required for the pre-flash steps.

Vapor stream 302 produced during fermentation may be vented to a scrubber system. When the fermentation batch is complete, the entire contents 301 of fermentation 300 may be transferred to a beer column for the separation of remaining product alcohol from fermentation broth.

Product alcohol removal may be accomplished continuously throughout the fermentation by looping a stream of fermentation broth through a flash system. If fermentation broth 304 is taken from the bottom or lower half of fermentation vessel 300, carbon dioxide may be flashed from the fermentation broth in pre-flash I 310 at pressure P1 (e.g., at least about 10 psia to about 25 psia) to permit atmospheric discharge of carbon dioxide 305 through a scrubber system while reducing the volume of carbon dioxide processed in subsequent compressions 320 and 340. The effectiveness of pre-flash I 310 may be increased by sparging with non-condensible gas or by adding heat using any of the means described herein. Also, heat may be provided from the heat of compression 320 and the partial condensation of vapor stream 306 entering pre-flash I 310, which may provide all of the necessary heat for pre-flash I 310.

Additional pre-flashing of carbon dioxide vapor may be accomplished at sub-atmospheric pressures to reduce the carbon dioxide loading on the product alcohol vapor condensation 360 and hence improve the efficiency of the product alcohol vapor condenser. Stream 307 may be transferred to pre-flash II 330 at pressure P2 (e.g., at least about 3 psia to about 12 psia). Reduced pressure may be used in pre-flash II 330 to remove the majority of the non-condensibles, such as carbon dioxide, from the fermentation broth (e.g., P2 may be lower than P1). The pre-flash II may be heated by passing the fermentation broth through a heat exchanger, injecting steam into the flash tank, or by any other means described herein. Also, heat may be provided from the heat of compression 340 and the partial condensation of vapor stream 309 entering pre-flash II 330, which may provide all of the necessary heat for pre-flash II 330. Vapor stream 308 may be compressed to above atmospheric pressure in compression 320. Compression 320 may be the source of the vacuum in pre-flash II 330. Vacuum and compression may be achieved, for example, by a vacuum pump, compressor, steam jet, or other means determined by those skilled in the art. Vapor stream 306 from compression 320 may enter pre-flash I 310 for cooling and condensation. The condensate may be combined with the degassed fermentation broth in pre-flash I 310. Liquid stream 311 from pre-flash II 330 may be transferred to flash 350. In some embodiments, compressions 320 and 340 may be conducted in a single multi-stage compression device.

A flash may be used to vaporize product alcohol from the fermentation broth. The pressure P3 (e.g., at least about 0.3 psia to about 10 psia) of flash 350 may be lower than the pressure P2 of pre-flash II 330. The flash system may be heated by any of the methods described herein, which include hot water from the distillation area via stream 712 and/or steam from the evaporation area via stream 608 (see FIGS. 7 and 8). Vapor stream 312 from flash 350, containing product alcohol and water may be transferred to condensation 360. Liquid stream 303 from flash 350 may be returned using a pump to fermentation 300. The pump may be a centrifugal pump placed below the flash system. The feed line to the pump may be designed to meet the net positive suction head requirements of the pump, and to avoid vapor lock. The circulation loop may be constructed in a way which facilitates cleaning between fermentation batches. The circulation loop may have nozzles to allow injection of hot water or clean-in-place solution. It may have low point drains. It may be constructed of stainless steel or other non-corroding alloys. Return line 303 from flash 350 may enter fermentation 300 at a location at least one radius distance from the feed line to the flash. An existing circulation loop may be retrofitted for this purpose. Additional heat exchangers may be employed in the circulation loop to control temperature if needed.

Condensation 360 may be accomplished with, for example, a heat exchange condenser, spray condenser, or other means. Cooling may be achieved, for example, with cooling tower water, chilled water, or a refrigeration system. Liquid condensate 314 may be transferred by pumping to the distillation process area for recovery of product alcohol. Residual non-condensed vapor stream 313 comprising carbon dioxide, product alcohol, and/or water may be compressed through one, two, three, or more compressor stages with interstage cooling which may induce partial condensation. Compression 340 may be the source of the vacuum in flash 350. Vacuum and compression may be achieved, for example, by a vacuum pump, compressor, steam jet, or other means determined by those skilled in the art. Vapor stream 309 from compression 340 may enter pre-flash II 330 for cooling and partial condensation. The condensate may be combined with the degassed fermentation broth in pre-flash II 330. In some embodiments, pre-flash I 310, pre-flash II 330, and/or flash 350 may be a spray tower. In some embodiments, the liquid and vapor streams entering a spray tower may be contacted co-currently or counter-currently.

Figure 5:
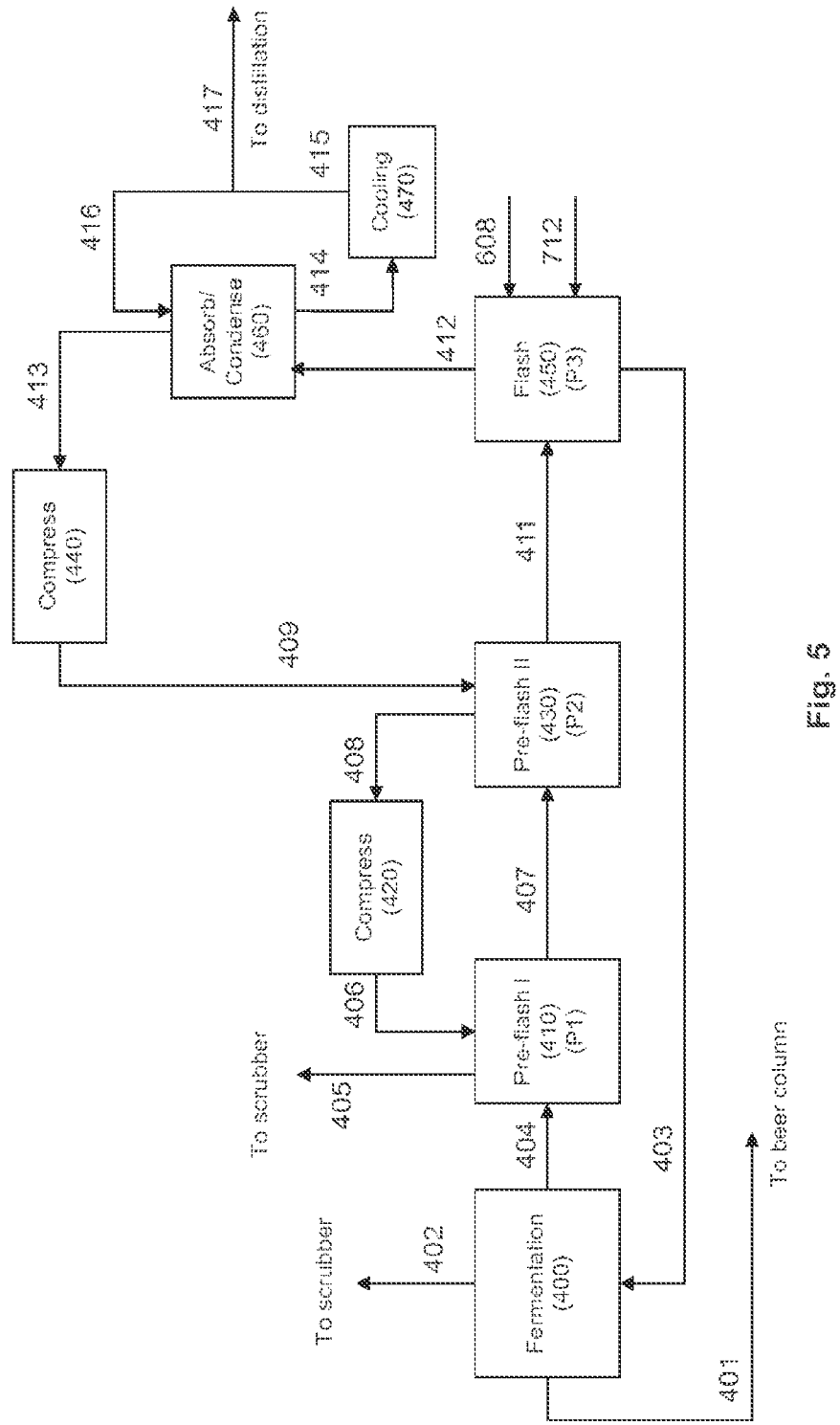
FIG. 5 is an example flow diagram for an embodiment of the processes provided herein.

FIG. 5 illustrates another embodiment of the processes and methods of the present invention. In this embodiment, removal of product alcohol may be accomplished by flashing and absorbing, for example, utilizing an absorption liquid to absorb any portion of the vapor phase produced during the flash. Any remaining product alcohol may be recovered from the fermentation broth at the end of the fermentation by distillation. During the production of product alcohol in fermentation 400, product alcohol may be removed from the fermentation broth to improve fermentation conditions resulting in increased growth of the microorganism and increased production of the product alcohol.

Vapor stream 402 produced during fermentation may be vented to a scrubber system. When the fermentation batch is complete, the entire contents 401 of fermentation 400 may be transferred to a beer column for the separation of remaining product alcohol from fermentation broth.

Product alcohol removal may be accomplished continuously throughout the fermentation by looping a stream of fermentation broth through a flash system. If fermentation broth 404 is taken from the bottom or lower half of fermentation vessel 400, carbon dioxide may be flashed from the fermentation broth in pre-flash I 410 at pressure P1 (e.g., at least about 10 psia to about 25 psia) to permit atmospheric discharge of carbon dioxide 405 through a scrubber system while reducing the volume of carbon dioxide processed in subsequent compressions 420 and 440. The effectiveness of pre-flash I 410 may be increased by sparging with non-condensible gas or by adding heat using any of the means described herein. Also, heat may be provided from the heat of compression 420 and the partial condensation of vapor stream 406 entering pre-flash I 410, which may provide all of the necessary heat for pre-flash I 410.

Additional pre-flashing of carbon dioxide vapor may be accomplished at sub-atmospheric pressures to reduce the carbon dioxide loading on the product alcohol vapor absorption/condensation 460 and hence improve the efficiency of the product alcohol vapor condenser. Stream 407 may be transferred to pre-flash II 430 at pressure P2 (e.g., at least about 3 psia to about 12 psia). Reduced pressure may be used in pre-flash II 430 to remove the majority of the non-condensibles, such as carbon dioxide, from the fermentation broth (e.g., P2 may be lower than P1). The pre-flash II may be heated by passing the fermentation broth through a heat exchanger, injecting steam into the flash tank, or by any other means described herein. Also, heat may be provided from the heat of compression 440 and the condensation of vapor stream 409 entering pre-flash II 430, which may provide all of the necessary heat for pre-flash II 430.

Vapor stream 408 may be compressed to above atmospheric pressure in compression 420. Compression 420 may be the source of the vacuum in pre-flash II 430. Vacuum and compression may be achieved, for example, by a vacuum pump, compressor, steam jet, or other means determined by those skilled in the art. Vapor stream 406 from the compression 420 may enter pre-flash I 410 for cooling and partial condensation. The condensate may be combined with the degassed fermentation broth in pre-flash I 410. Liquid stream 411 from pre-flash II 430 may be transferred to flash 450. In some embodiments, compressions 420 and 440 may be conducted in a single multi-stage compression device.

A flash may be used to vaporize product alcohol from the fermentation broth. The pressure P3 (e.g., at least about 0.3 psia to about 10 psia) of flash 450 may be lower than the pressure P2 of pre-flash II 430. The flash system may be heated by any of the methods described herein, which include hot water from the distillation area via stream 712 and/or steam from the evaporation area via stream 608 (see FIGS. 7 and 8). Vapor stream 412 from flash 450, containing product alcohol and water may be transferred to the absorption/condensation 460. Liquid stream 403 from flash 450 may be returned using a pump to fermentation 400. The pump may be a centrifugal pump placed below the flash system. The feed line to the pump may be designed to meet the net positive suction head requirements of the pump, and to avoid vapor lock. The circulation loop may be constructed in a way which facilitates cleaning between fermentation batches. The circulation loop may have nozzles to allow injection of hot water or clean-in-place solution. It may have low point drains. It may be constructed of stainless steel or other non-corroding alloys. Return line 403 from flash 450 may enter fermentation 400 at a location at least one radius distance from the feed line to the flash. An existing circulation loop may be retrofitted for this purpose. Additional heat exchangers may be employed in the circulation loop to control temperature if needed.

Absorption/condensation 460 of the vapor may be accomplished by absorption, for example, utilizing the processes described in U.S. Patent Application Publication Nos. 2011/0162953 and 2011/0162954, incorporated herein by reference. In one embodiment of the processes and methods described herein, a co-current spray of absorbent or cooled condensate or a co-current spray contactor may be used to educt the vapor. Liquid stream 414 from absorption/condensation 460 may be transferred to cooling 470 with the assistance of a pump. The cooling source for cooling 470 may be suitably cold cooling water or may be chilled water. Stream 415 may be split into at least two streams, for example, stream 416 for return to absorption/condensation 460 and stream 417 which may be transferred to the distillation area for separation of the product alcohol from the absorbent. Non-absorbed vapor stream 413 may exit absorption/condensation 460 and enter compression 440. Compression 440 may be the source of the vacuum in flash 450. Vacuum and compression may be achieved, for example, by a vacuum pump, compressor, steam jet, or other means determined by those skilled in the art. Vapor stream 409 from compression 440 may enter pre-flash II 430 for cooling and condensation. The condensate may be combined with the degassed fermentation broth in pre-flash II 430. In some embodiments, pre-flash I 410, pre-flash II 430, and/or flash 450 may be a spray tower. In some embodiments, the liquid and vapor streams entering a spray tower may be contacted co-currently or counter-currently.

Figure 6:
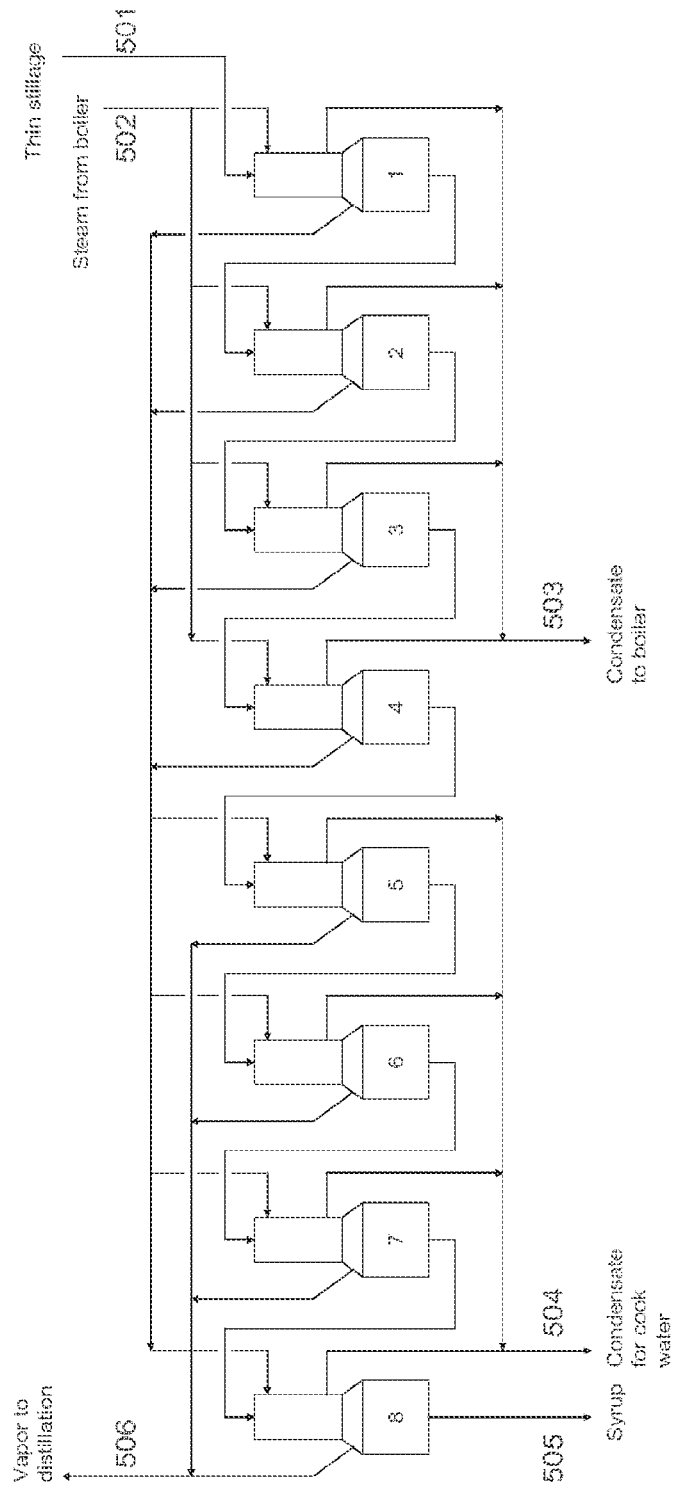
FIG. 6 is an example of an evaporation train that may be used with the processes described herein.

In another embodiment of the processes and methods described herein, an evaporation train may be used to remove water from thin stillage generated during the fermentation process. FIG. 6 illustrates a typical configuration of an evaporation train comprising a two (2) effect by four (4) body setup. This configuration may be employed at many existing ethanol plants. The first four stages (1-4) may operate near one pressure ($P_{1-4}$), with the last four stages (5-8) operating near a lower pressure ($P_{5-8}$) (e.g., $P_{5-8}$ is lower than $P_{1-4}$). In this configuration, thin stillage 501 enters the first stage evaporator and steam from boiler 502 (or other heat sources not shown) enters stages 1-4. The steam and thin stillage may be indirectly contacted to transfer heat from the condensing steam to the boiling thin stillage. The steam condensate from the first four stages (1-4) of the evaporation may be combined and returned to the boiler via stream 503. The thin stillage may be concentrated as some of the water is evaporated in each stage of the evaporation train. The concentrated stillage may be removed from the bottom of each stage and fed to the top of the subsequent stage evaporator. The steam produced from the concentration of thin stillage exits the first four stages (1-4) and may be used as the heat source for the last four stages (5-8). The concentration of stillage may be increased throughout the stages until exiting stage 8 as syrup 505. The condensate 504 from stages 5-8 may be used for cook water. In some embodiments, the condensate may be treated by wastewater treatment processes to remove volatile organic compounds, adjust pH, adjust alkalinity, and the like. In some embodiments, the condensate may be treated in an anaerobic water treatment process to convert volatile organic compounds to biogas and similar fuels. In some embodiments, the condensate may be treated in an aerobic water treatment process to convert volatile organic compounds into carbon dioxide. The steam 506 evaporated through concentration of the stillage in stages 5-8 may be used for heat in the distillation area.

Figure 7:
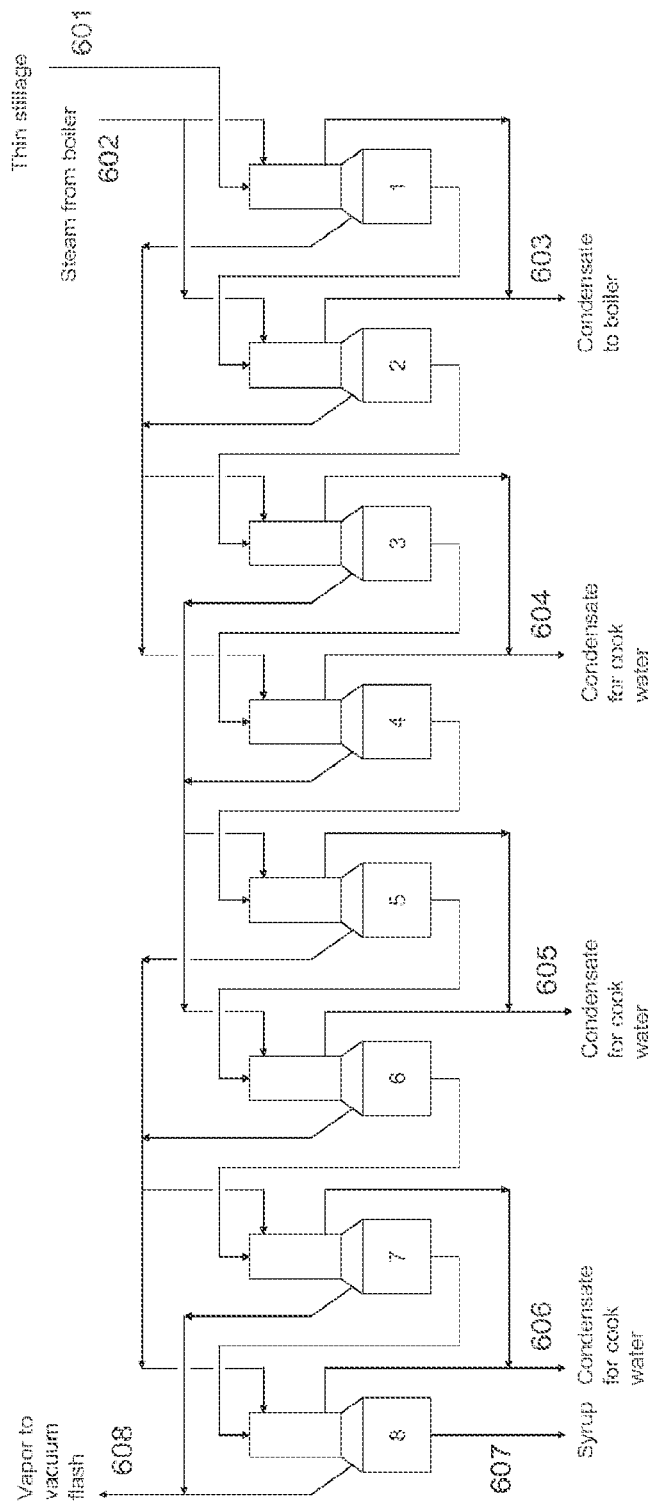
FIG. 7 is an example of an evaporation train that may be used with the processes described herein.

FIG. 7 illustrates another embodiment of an evaporation train that may be used in the methods and processes described herein. In this evaporation train configuration, a four (4) effect by two (2) body system may be used to concentrate thin stillage. One advantage of this configuration is that more energy may be recovered from the input steam from the boiler. Thin stillage 601 enters the first stage evaporator. The thin stillage proceeds through all eight evaporator stages in series and the resulting syrup exits as stream 607. Steam 602 from the boiler is fed to the first two stages (1 and 2). The steam and thin stillage may be indirectly contacted to transfer heat from the condensing steam to the boiling thin stillage. In one embodiment, the water evaporated from the thin stillage in stages 1 and 2 may be used to heat stages 3 and 4, water evaporated from the thin stillage in stages 3 and 4 may be used to heat stages 5 and 6, and water evaporated from the thin stillage in stages 5 and 6 may be used to heat stages 7 and 8. In another embodiment, the pressure of stages 7 and 8 ($P_d$) may be lower than the pressure of stages 5 and 6 ($P_c$), which may be at a lower pressure than stages 3 and 4 ($P_b$), which may be at a lower pressure than stages 1 and 2 ($P_a$) (e.g., $P_d<P_c<P_b<P_a$). Steam condensate from stages 1 and 2 may be combined and returned to the boiler via stream 603. Condensates 604, 605, and 606 from stages 3-8 may be used for cook water and transferred via pumping. In some embodiments, the condensates or portion thereof from stages 3-8 may be treated by wastewater treatment processes to remove volatile organic compounds (e.g., butyric acid), adjust pH, adjust alkalinity, and the like. In some embodiments, the condensates or portion thereof may be treated in an anaerobic water treatment process to convert volatile organic compounds to biogas and similar fuels. In some embodiments, the condensates or portion thereof may be treated in an aerobic water treatment process to convert volatile organic compounds into carbon dioxide. The resulting steam 608 exiting stages 7 and 8 is at low pressure ($P_d$) (e.g., as compared to $P_{5-8}$ of a two (2) effect by four (4) body setup), and may be used for direct heating of a flash tank. The low pressure steam may also minimize the effect of heat stress on the microorganism.

Figure 8:
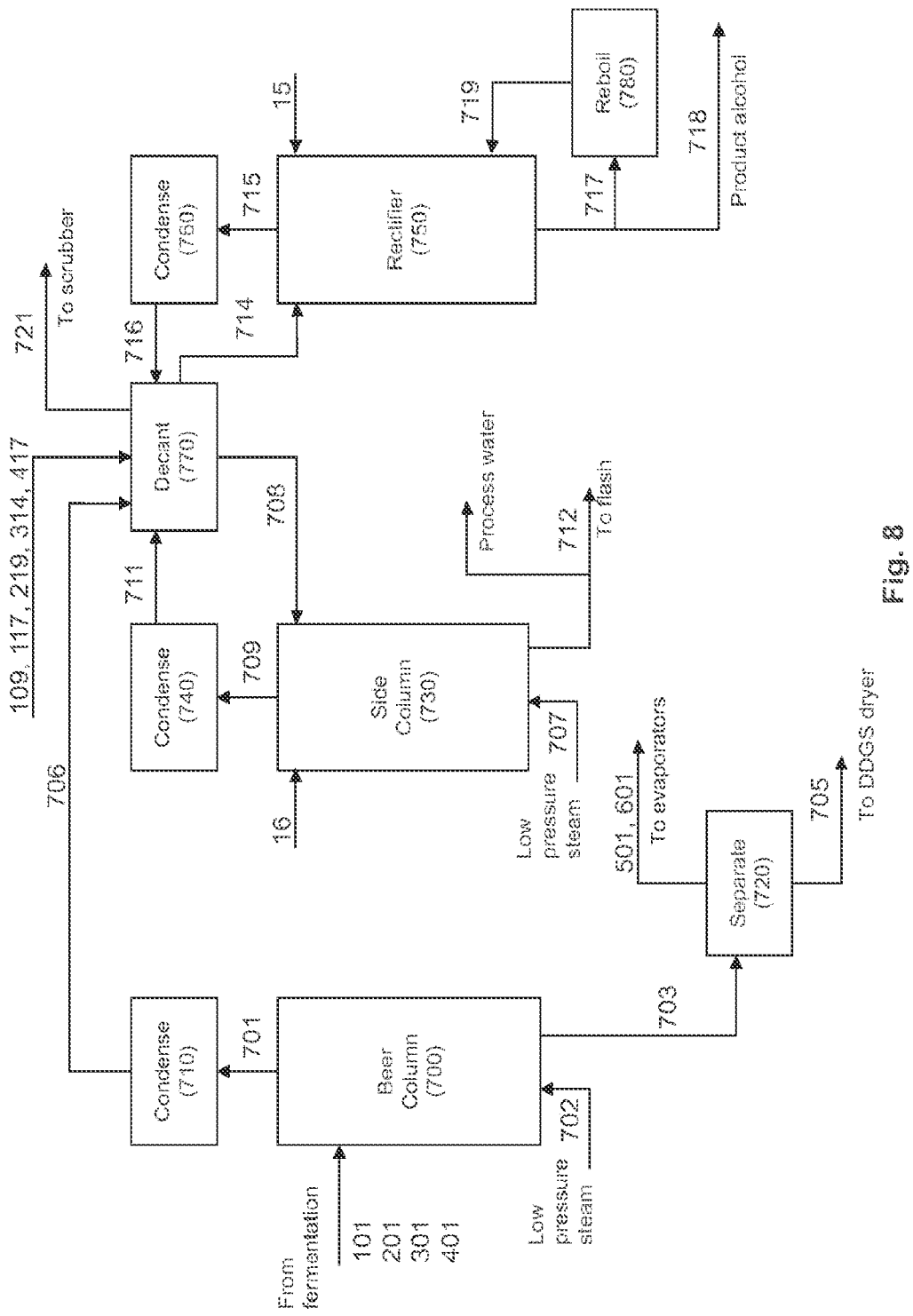
FIG. 8 illustrates an example of a recovery process that may be used with the processes described herein.

In another embodiment of the processes and methods described herein, product alcohol may be recovered from fermentation broth using the process illustrated in FIG. 8. Beer column 700 may be used to recover product alcohol from the fermentation broth remaining at the end of the fermentation. Fermentation broth (101, 201, 301, 401; see FIGS. 2 to 5) may enter beer column 700 forming product alcohol/water azeotrope overhead 701 which may then be sent to condensation 710. Low pressure steam from the evaporation system (506; see FIG. 6) may be used to provide direct contact heating via 702 to distill the product alcohol/water azeotrope 701 overhead. The condensed product alcohol and water 706 may be transferred to decantation 770. Bottoms 703 from beer column 700 may be sent to separation 720 to separate thin stillage (501, 601; see FIGS. 6 and 7) from distillers grains solids 705, which may be sent to a distillers grains dryer to produce dry distillers grains. Following the dryer, syrup (505, 607; see FIGS. 6 and 7) from evaporation may be added to the distillers grains to produce dry distillers grains with solubles (DDGS). Separation 720 may be a centrifuge, filter, or any other equipment that may be used for separating liquids from solids.

Decantation 770 may be used to separate the product alcohol phase and aqueous phase from product alcohol-rich streams. The inlets to decantation 770 may be the distillation column overheads (e.g., 706 from the beer column, 711 from the side column, 716 from the rectifier column) and condensate from the flash system (109, 117, 219, 314, 417; see FIGS. 2 to 5). Vapor stream 721 that builds up in decantation 770 may be vented to a scrubber system. In some embodiments, decantation 770 may operate at sub-atmospheric pressure and a vacuum pump may be used to conduct vapor stream 721 to the scrubber system.

Figure 10:
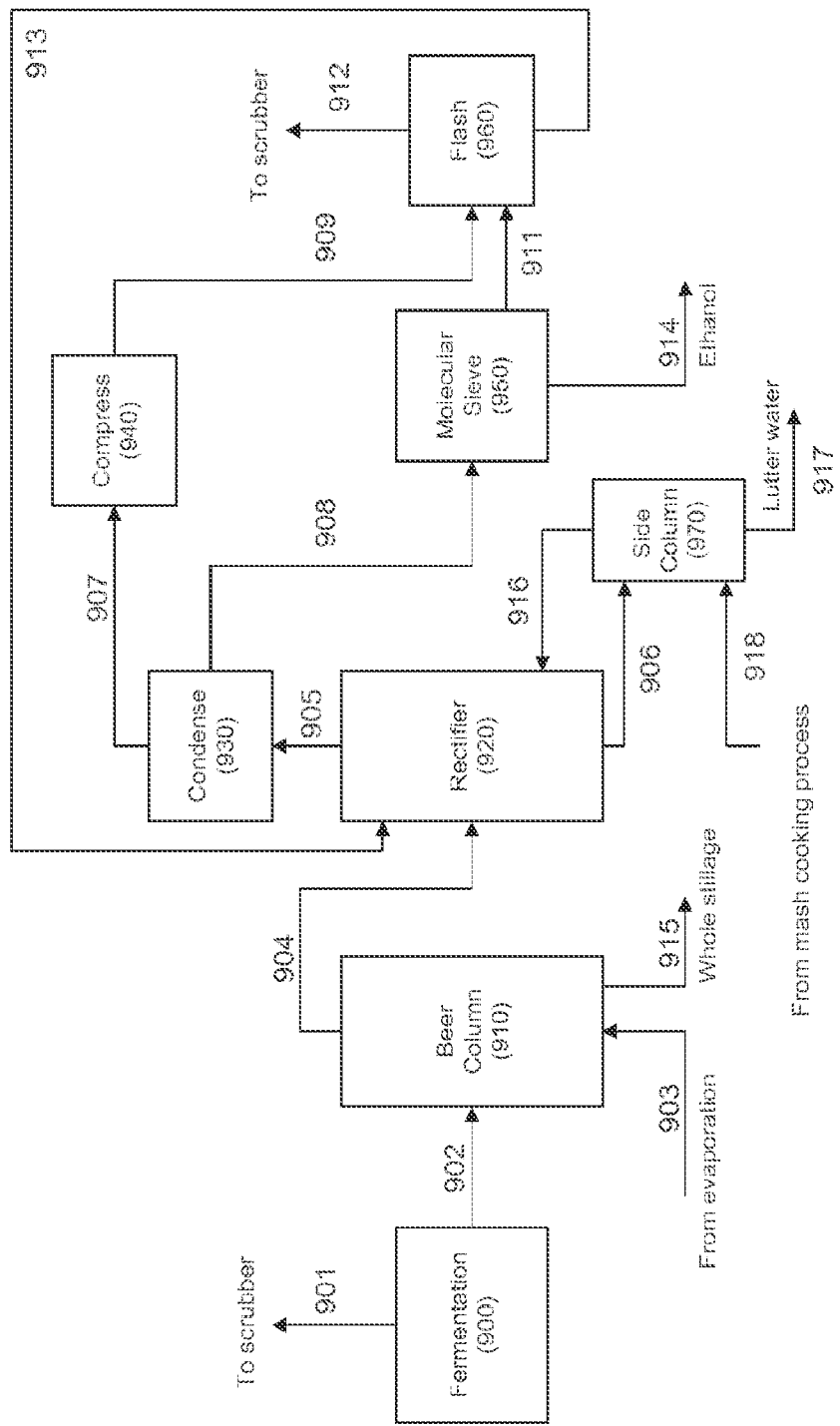
FIG. 10 illustrates an example of the production of a product alcohol from fermentation to recovery of the product alcohol.
Figure 11:
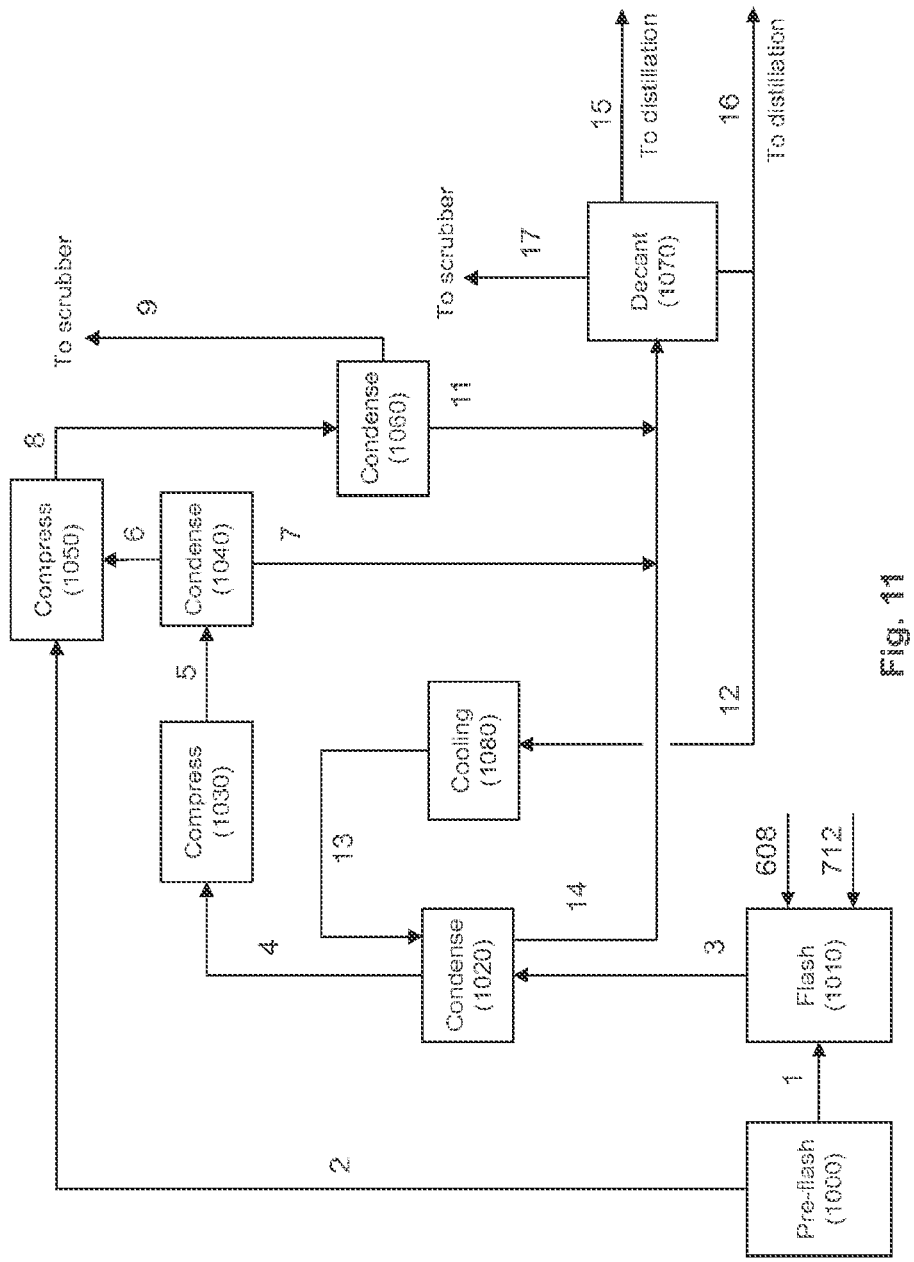
FIG. 11 illustrates an example of a recovery process that may be used with the processes described herein.

Aqueous phase 708 from decantation 770 may be sent to side column 730 (as well as stream 16; see FIG. 11). A side column may be used to recover product alcohol soluble in the aqueous phase before water is discharged from the bottom of the column for use in other sections of the process. Hot water from the bottom of side column 730 may also be used to provide heat to a flash tank via stream 712 (see FIGS. 2 to 5), which also replaces water lost through the flash process and facilitates control of a level of fermentation broth in the fermentation vessel. Low pressure steam heat 707 for side column 730 may be provided from the mass cooking process (see stream 918 in FIG. 10). Product alcohol/water azeotrope 709 may be distilled overhead to condensation 740. Condensate 711 may enter decantation 770.

Product alcohol phase 714 from decantation 770 may be sent to rectifier 750 (as well as stream 15; see FIG. 11). Rectifier 750 may remove any water soluble in the product alcohol phase before purified product alcohol is discharged from the bottom of rectifier 750. Water may be removed as the product alcohol/water azeotrope overhead 715 and sent to condensation 760. Condensate 716 may be transferred to decantation 770. Rectifier 750 may be heated with an indirectly heated reboiler 780. Reboiler 780 may be a kettle type, thermosiphon, or any other design typically considered by those familiar with the art. A portion of rectifier column bottoms may enter reboiler 780 via stream 717. Vapor stream 719 from reboiler 780 may enter the bottom of rectifier 750. Bottoms side stream 718 may be cooled and sent to a product storage tank. The cooling of stream 718 may be heat integrated with other streams, for example, heat from 718 may be transferred to stream 714 via a heat exchanger. Condensation 760 may be heat integrated with other equipment and/or devices. For example, condensation 760 may supply heat to an evaporator train.

Figure 9:
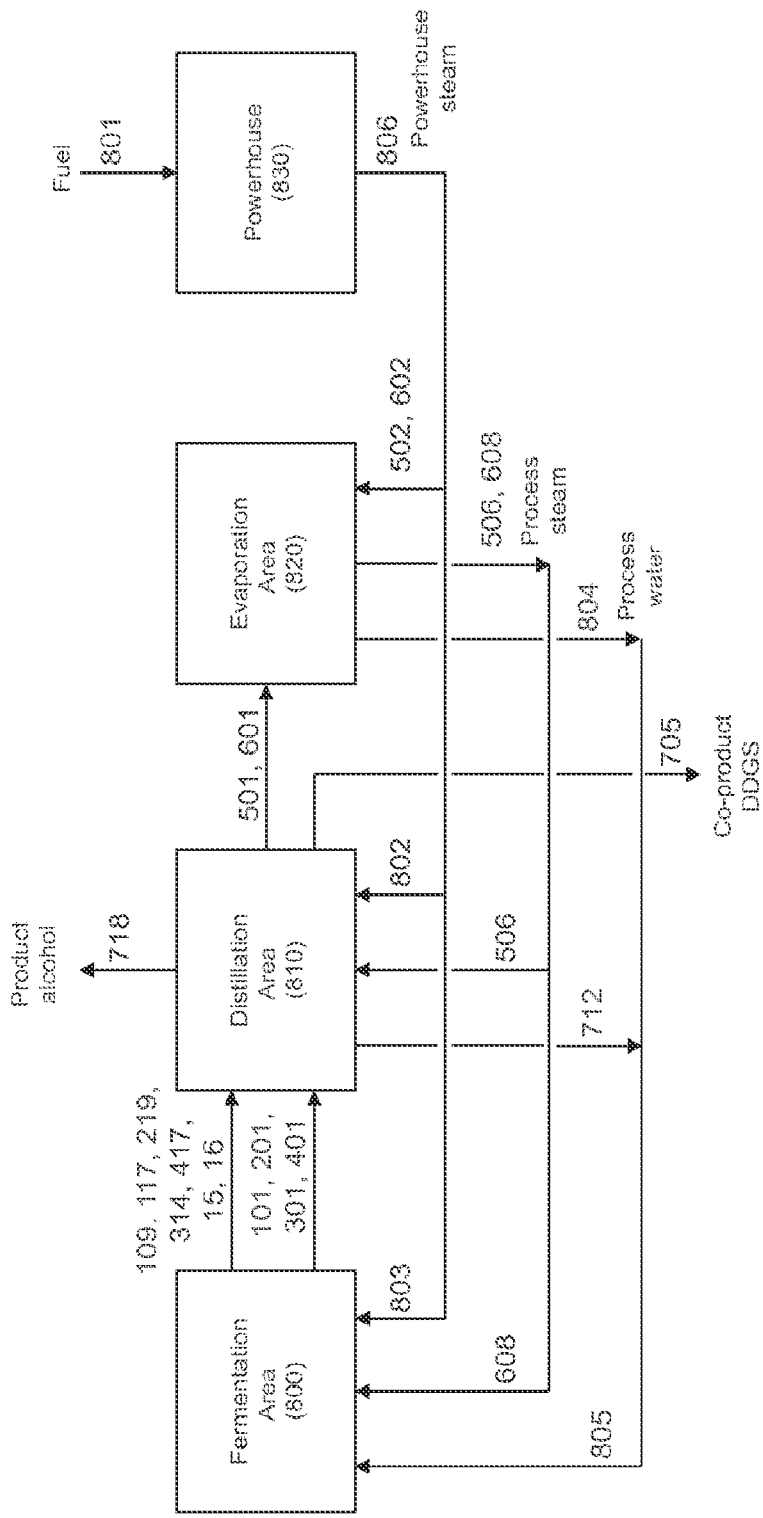
FIG. 9 illustrates an example of the overall process flow of the processes described herein.

FIG. 9 depicts the overall flow of the processes (e.g., material, steam, and water between the different areas or processes) as described herein and as illustrated in FIGS. 2 to 8. Fermentation area 800 as illustrated in FIGS. 2 to 5 includes fermentation and the flash system. Streams 109, 117, 219, 314, 417, 101, 201, 301, and 401, and streams 15 and 16 (see FIG. 11), all transfer material from fermentation area 800 to distillation area 810 of the processes as illustrated in FIG. 9. Product alcohol 718 may be removed from distillation area 810. Water from distillation area 810 may be used in fermentation area 800 by transfer through 712 and 805. Co-product DDGS 705 may exit distillation area 810. Thin stillage (501, 601; as illustrated in FIGS. 6 and 7) from distillation area 810 may be transferred to evaporation area 820. Condensed water 804 from evaporation area 820 may be used in fermentation area 800, for example, in the mash cooking process or as make-up water for the fermentation vessel. Process steam 608 produced in evaporation area 820 may be transferred to fermentation area 800 or process steam 506 produced in evaporation area 820 may be transferred to distillation area 810. Steam may also be produced in powerhouse 830 to provide heat to any process area. Fuel, such as natural gas, may be fed to powerhouse 830 via stream 801 to burn in a boiler for producing steam. Steam 806 produced may exit powerhouse 830 and may be delivered to evaporation area 820 via 502 and/or 602, distillation area 810 via 802, or fermentation area 800 via 803.

FIG. 10 illustrates the production of ethanol from fermentation to recovery of the ethanol by distillation. Ethanol may be produced by fermentation of sugars in fermentation 900. The sugars may be derived from any biomass source including corn, cane, cellulosic, or lignocellulosic material. Gases 901 generated during the fermentation may be vented to a scrubber system. Fermentation broth 902 may be transferred to beer column 910. Steam 903 from an evaporation system may enter beer column 910. Ethanol and water may be vaporized within beer column 910, and vaporized stream 904 may be sent overhead to rectifier 920. Rectifier 920 may be used to concentrate the ethanol. Bottoms stream 915 of beer column 910 is whole stillage, which contains mostly solids and water. Azeotrope 905 of ethanol and water from rectifier 920 may be vaporized overhead to condensation 930. Bottoms stream 906 of rectifier 920 may be transferred to side column 970 for recovery of ethanol. Flash vapor 918 from the mash cooking process may be used to provide energy to side column 970. Vapor stream 916 from the top of side column 970 may be transferred to the bottom of rectifier 920. Bottoms 917 of side column 970 forms lutter water which may be reused in the process. Vapor stream 907 from condensation 930 may be transferred to compression 940. Compression 940 creates a vacuum for the distillation process. Outlet 909 of compression 940 is transferred to flash 960. A portion of liquid condensate from condensation 930 may be transferred to the top of rectifier 920 as reflux and another portion 908 may be transferred to molecular sieve system 950. The remaining water may be removed from ethanol 914 in molecular sieve system 950. During regeneration of molecular sieve system 950, vapor stream 911 may exit molecular sieve system 950, and may be condensed (not shown) before entering flash 960. Vapor stream 912 exiting flash 960 is primarily carbon dioxide, and liquid 913 exiting flash 960 contains ethanol and water and may be recycled to rectifier 920 for recovery of the ethanol.

FIG. 11 represents another embodiment of the processes and methods described herein. In this embodiment, the condensation for the flash may be accomplished using a spray condenser. The condensed liquids from the pre-flash and flash may be decanted to separate the aqueous and organic phases. The product alcohol-rich phase may be purified in a rectification column in distillation. A portion of the water-rich phase may be cooled for use as the condensing fluid in the spray condenser, and another portion of the water-rich phase may be sent to distillation for product alcohol removal.

Stream 1 from pre-flash 1000 may be transferred to flash 1010. Vapor stream 2 may be transferred to compression 1050 and may be compressed to above atmospheric pressure. Compression 1050 may be the source of the vacuum in pre-flash 1000. Vacuum and compression may be achieved by, for example, a vacuum pump, compressor, steam jet, or other means determined by those skilled in the art.

Flash 1010 may be used to vaporize product alcohol from the fermentation broth. The pressure of flash 1010 may be operated at a pressure lower than the pressure of pre-flash 1000. Flash 1010 may be heated by any of the methods described herein, which include hot water from the distillation area via stream 712 and/or steam from the evaporation area via stream 608 (see FIGS. 7 and 8). Vapor stream 3 from flash 1010, containing product alcohol and water may be transferred to condensation 1020. Liquid stream (or tails, not shown) from flash 1010 may be returned using a pump to the fermentation vessel.

Condensation 1020 may be accomplished, for example, with heat exchange or spray condenser. Residual non-condensed vapor stream 4 comprising carbon dioxide, product alcohol, and water may be compressed through one, two, three, or more compressor stages with interstage cooling which may induce partial condensation. Condensate stream 14 from condensation 1020 may be transferred via pumping to decantation 1070. Vapor stream 4 from condensation 1020 may enter compression 1030 and may be compressed to sub-atmospheric pressure. Compression 1030 may be the source of the vacuum in flash 1010. Vacuum and compression may be achieved, for example, by a vacuum pump, compressor, steam jet, or other means determined by those skilled in the art. Vapor stream 5 from compression 1030 may enter condensation 1040. Condensation 1040 may be accomplished with, for example, a heat exchange condenser, spray condenser, or other means. Cooling may be achieved with, for example, cooling tower water, chilled water, or a refrigeration system. Condensate stream 7 from condensation 1040 may be transferred via pumping to decantation 1070. Vapor stream 6 from condensation 1040 may be transferred to compression 1050. Vapor streams 6 and 2 may be compressed to above atmospheric pressure in compression 1050. Outlet 8 of compression 1050 may be transferred to condensation 1060. Condensation 1060 may be accomplished, for example, with a heat exchange condenser, spray condenser, or other means. Cooling may be achieved with, for example, cooling tower water, chilled water, or a refrigeration system. Liquid condensate 11 may be transferred by pumping to decantation 1070. Vapor stream 9 from condensation 1060 may be sent to a scrubber system.

Any vapors that collect in decantation 1070 may be vented to a scrubber system via stream 17. The alcohol-rich phase 15 from decantation 1070 may be sent to the distillation process area for recovery of product alcohol. Stream 15 may go directly to the rectifier column (see FIG. 8). A portion of the water-rich phase from decantation 1070 may be sent via stream 16 to the distillation process for recovery of the product alcohol and water for recycle. Stream 16 may go directly to the side stripper column (see FIG. 8). Another portion of the water-rich phase from decantation 1070 may be re-circulated via stream 12 to condensation 1020 through cooling 1080. Cooling may be achieved, for example, with cooling tower water, chilled water, or a refrigeration system.

The cooled liquid 13 from cooling 1080 may be sprayed into condensation 1020 to condense a portion of the flashed vapors. Utilizing only the water-rich phase from decantation 1070 in condensation 1020 takes advantage of the relatively high heat capacity of water to minimize the flow requirements for streams 12, 13, and 14.

In another embodiment, more than one decantation step may be utilized to separate the condensate from different condensation steps. In another embodiment, the mixed phases may be returned to condensation 1020.

The equipment used in the processes described herein may be configured a number of ways. For example, a flash tank and/or a condenser may comprise in part multiple parallel vertical cylinders fluidly connected at the top. The cylinders may have internals (e.g., spray nozzle, chevron, demister) to promote mass and heat transfer and to reduce entrainment. The cylinders may be, for example, 10, 12, or 14 feet in diameter or other diameters suitable for shop fabrication and transportation to the fermentation plant site by truck or rail or other standard means of transportation. The cylinders may be baffled for multi-pass flow configuration. Cylinders may be rated for full vacuum, and may be reinforced for vacuum ratings. The cylinders may be welded stainless steel or similar non-corroding alloy construction, and may have a dished bottom for ease of draining and cleaning.

Fermentation broth may be introduced above the middle of one or more of the cylinders, and heat in the form of steam and/or hot water may be introduced below the middle of these cylinders. Fermentation broth depleted in product alcohol may collect in the bottom of these cylinders and from there flow into pumps. Vapors may pass from the cylinders fed fermentation broth to other cylinders, which act as contact condensers. Cooled condensate may be sprayed into these other cylinders at one or more levels to condense a portion of the product alcohol and water. This condensate may collect at the bottom of these cylinders and from there flow into condensate pumps. Condensate or a portion of condensate may be decanted to separate a product alcohol-rich layer from a water-rich layer. The product alcohol-rich and water-rich phases may be pumped to a refining train for recovery of product alcohol and recycle of water substantially free of product alcohol. Condensate or a portion thereof may be cooled and pumped back to the condensing cylinders. In some embodiments, the water-rich layer or portion thereof may be cooled and pumped back to the condensing cylinders. Vapor may exit the condensing cylinders from beneath a baffle or other system for the separation of vapor from liquid with low pressure drop, or the vapor may be directed to a compressor.

After cooling, remaining vapors may be compressed and cooled through one or more compression and/or cooling stages until reaching a pressure suitable for discharge to a scrubber. Cool water may be introduced to any of the cooler stages. The ratio of product alcohol to carbon dioxide at the compressor inlet may be, for example, between about 2 and about 20, between about 3 and about 20, or between about 7 and about 20.

In some embodiments, one or more vapor streams resulting from the processing of flash and pre-flash vapors as well as vapor streams resulting from other process areas (e.g., distillation, evaporation, fermentation vent) may be further processed in a scrubber system comprising at least one scrubber. A component of the vapor streams generated in the process may be carbon dioxide that was formed during fermentation. Under ambient temperature and pressure conditions, these vapor streams may also comprise a varied amount of product alcohol and other volatile organic chemicals (VOC). It may be desirable to minimize the amount of VOC that exits the process via these vapor streams, for example, to comply with regulatory emission limitations imposed on the commercial manufacture of product alcohols. In addition, venting product alcohol to the atmosphere may result in a loss of revenue. Using the methods described herein and, for example, as illustrated in FIGS. 2B and 4, VOC content of the vapor streams may be reduced.

One means to minimize the amount of vented VOC is by absorbing a portion of the VOC from the vapor streams into water using one or more scrubbers, resulting in scrubber bottoms streams comprising water. Typically, the scrubber bottoms streams are used to replenish the water lost in an alcohol production process. For example, a significant amount of water may be lost by drying distillers grains with solubles, and scrubber bottoms streams may be used to replenish this water loss. The water entering a scrubber (e.g., scrubber water) may comprise fresh water and water that has been processed. "Fresh water" is water from an external source, that is, external to the alcohol production process. In some instances, excess scrubber bottoms streams may be generated forming a waste stream that cannot be easily processed for disposal. The flow of fresh water entering the scrubber may be limited to avoid the generation of a waste stream.

Consequently, the portion of the VOC that can be removed from the vapor streams may be limited by the amount that can be absorbed in the limited flow of fresh water entering the scrubber. In some embodiments of this invention, the absorption capacity of the scrubber water may be increased through the use of additives. These additives may, for example, be at least partially soluble in water. These additives can have the effect of lowering the vapor pressure of the VOC, lowering the volatility of the VOC, and/or increasing the solubility of the VOC. In some embodiments, an additive may be added to a scrubber system either with the scrubber water or separately. In some embodiments, the additive may be biocompatible. In another embodiment, the additive may be compatible with a fuel product. An example of an additive is glycerol. In another embodiment, the additive may be an absorption liquid as described herein and in WO 2011/100299 and U.S. Patent Application Publication No. 2012/0211348, the entire disclosures of which are incorporated in their entirety. In some embodiments, the scrubber bottoms streams may be processed for recovery of the additive or absorption liquid and any product alcohol and VOC therein.

In some embodiments, the scrubber water may be cooled, for example, using a heat exchanger, using cooling water, a refrigeration system, or by evaporative cooling in order to increase the absorption capacity of the scrubber water. In some embodiments, a portion of a scrubber bottoms stream may be cooled and/or chilled and re-circulated to a scrubber, and in some embodiments, this re-circulated portion may be combined with scrubber water and may be further cooled or chilled prior to entering the scrubber. In some embodiments, this re-circulated portion may be further processed to remove VOC and further cooled or chilled prior to entering the scrubber. For example, this re-circulated portion may be distilled in a column such as a side stripper column.

In some embodiments, the water entering a scrubber or at least a portion thereof may be provided by a portion of a water stream that is generated in another part of the process such as condensate from the evaporation train. In some embodiments, the one or more vapor streams may be compressed to a pressure higher than atmospheric and processed in a scrubber at elevated pressure to further improve the product alcohol absorption efficiency of the scrubber water.

In some embodiments, a scrubber may be externally cooled, for example, by a cooling jacket. In some embodiments, the scrubber bottoms stream of a scrubber may be introduced into another scrubber. A scrubber may provide about five, about ten, about fifteen, or more theoretical contacting stages and in some embodiments, may be counter-current.

In another embodiment of the processes and methods described herein, energy consumption may be minimized by varying the product alcohol removal rate to match the production rate in the fermentation vessel throughout the fermentation process. In addition, heat input to the flash may be varied as product alcohol production rates vary in the fermentation vessel. As product alcohol production decreases at the end of the fermentation process, the steam rate to the flash system may be decreased to conserve energy and improve the economics of the processes described herein. Also, mathematical modeling may be used to optimize various parameters of the processes and methods described herein. For example, circulation rate to the flash may be optimized by developing a mathematical model for the fermentation cycle including terms which account for the cost of energy and for the capacity of the energy supply system.

Another means to optimize energy consumption in the processes described herein is heat integration. For example, energy (e.g., heat) may be cascaded in such a way as to provide heat to operate the flash. An economic way to provide this energy is to use condensation of the overheads of one or more vacuum columns in the refining train to generate sub-atmospheric steam in a heat exchanger such as a kettle reboiler supplied with aqueous condensate. Another way to provide energy is to supply a portion of the sub-atmospheric pressure steam from the evaporator train to operate the flash. An advantage of these heating systems is that the equipment is not exposed to fermentation broth and hence does not require clean-in-place after each fermentation cycle. Another advantage is that these heat transfer devices may be shared by all fermentation vessels in the system.

In some embodiments of the processes described herein, the flash process may generate wet carbon dioxide, a corrosive acid gas; and the materials (e.g., stainless steel) used in the construction of the fermentation system equipment (e.g., fermentation vessels, pre-flash and flash tanks, scrubbers, condensers, compressors, evaporators, distillation columns, etc.) may be highly susceptible to carbon dioxide corrosion and erosion. To reduce the corrosive effects of wet carbon dioxide, a biocompatible corrosion inhibitor may be added to protect the metal surfaces of the fermentation system equipment. In addition, maintaining the velocity of the wet carbon dioxide stream at or below a specified flow rate (e.g., m/s) may minimize the corrosive effects of wet carbon dioxide. Removal of the wet carbon dioxide from the various streams prior to, for example, the pre-flash, flash, and/or recycle of the fermentation broth to the fermentation vessel may also be a means to reduce the corrosive effects of wet carbon dioxide. Other means to minimize the corrosive effects include, but are not limited to, designing the piping components (e.g., bends, tees, elbows, valves, pumps, etc.) to reduce the occurrence of turbulence which can lead to corrosion and erosion, using anti-corrosive materials in the construction of these components and/or applying a coating (e.g., epoxy, silicon, or polymer alloy coating) to these components; and surface treatment such as mechanical (e.g., polish), chemical (e.g., cauterization, passivation), and electrochemical (e.g., electropolishing).

The fermentation system equipment may also be susceptible to contamination. For example, the valves, flanges, connections, etc., of the vacuum system (e.g., pre-flash and flash tanks) may be susceptible to leakage, allowing unsterile air and thus, undesirable microorganisms to enter the fermentation system. To reduce the risk of contamination, the components of the fermentation system may be designed to eliminate joints and flanges, for example, using welded construction and/or smooth bore continuity. Barriers to air leakage may also be installed such as encasing a flange with a purge port to monitor any leakage. In addition, monoseptic conditions may be maintained during fermentation to ensure minimal contamination as well as containment if contamination occurs. Clean-In-Place (CIP) and Sterilization-In-Place (SIP) systems may also be used for automatic cleaning and disinfecting without major disassembly and assembly work. In one embodiment, the CIP system may be designed to allow one area of the plant to be shut down and cleaned while other areas continue to operate.

The processes described herein provide fermentation methods with improved production yields of product alcohol. As discussed herein, product alcohol production utilizing fermentation by microorganisms may be inefficient due to the product alcohol toxicity thresholds of the microorganism. The processes provided herein provide an effective means by which product alcohol may be removed from the fermentation process, resulting in a reduced concentration of the product alcohol in the fermentation broth. The reduced concentration of product alcohol minimizes the toxic effects of the product alcohol on the microorganism and thus, leads to improved production yields of product alcohol.

Solids present during the flashing of gases may lead to foaming and/or fouling and the entrainment of solids and/or liquids with the gases. Removal of solids from the feedstock before fermentation or before pre-flashing or flashing may reduce the solids load from the pre-flash tank or flash tank, and may reduce the chance of foaming. In some embodiments, the microorganism and/or solids may be removed prior to pre-flashing or flashing. The microorganism and/or solids may be removed using, for example, filtration, centrifugation, and any other means that may be used for separation.

Additional ways to prevent foam exiting the flash tank include, but are not limited to, mechanical means for breaking the foam such as a stove pipe exit, multi-stage flash to prevent foam from forming, the use of antifoam, spray of liquid into the top of the flash tank to break the foam, or spray of recirculated broth that has been degassed into the top of the flash tank.

Figure 12:
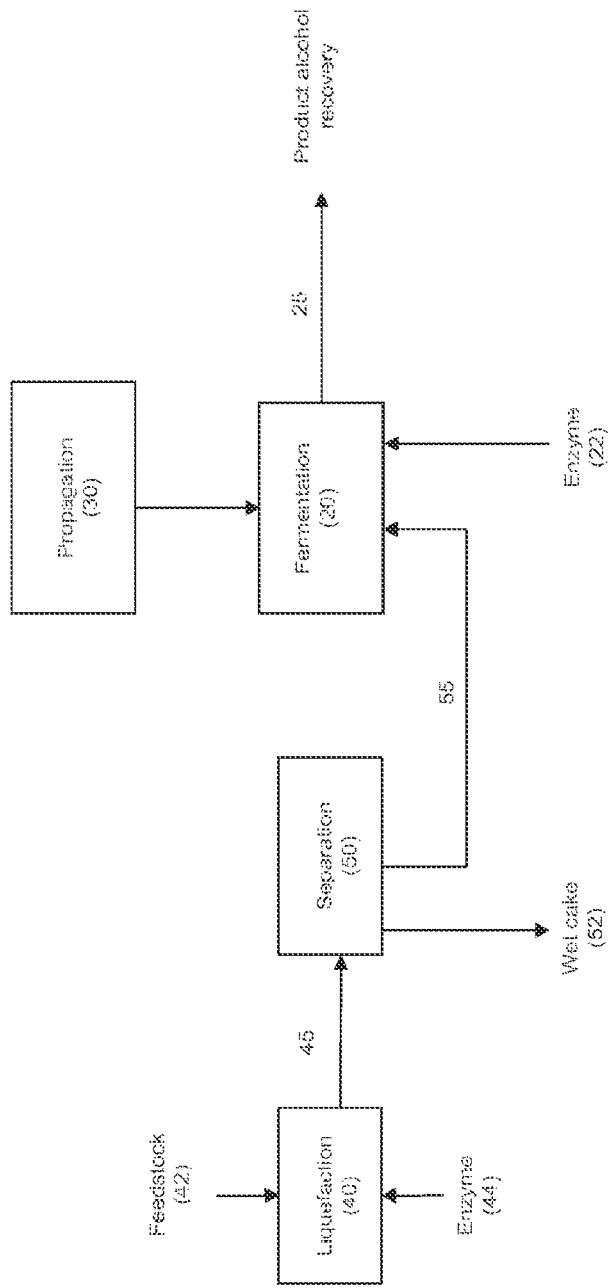
FIG. 12 schematically illustrates an exemplary method for feedstock preparation.

As an example of an embodiment of the methods described herein, fermentation may be initiated by introducing feedstock directly into a fermentation vessel. Suitable feedstocks include, but are not limited to, rye, wheat, corn, corn mash, cane, cane mash, barley, cellulosic material, lignocellulosic material, or mixtures thereof. In some embodiments, the feedstock may be dry milled or wet milled. Referring to FIG. 12, in some embodiments, prior to the introduction to fermentation 20, feedstock 42 may be liquefied to create feedstock slurry 45 which may comprise undissolved solids and sugar (e.g., a fermentable carbon source). Liquefaction of the feedstock may be accomplished by any known liquefying processes including, but not limited to, acid process, acid-enzyme process, enzyme process (e.g., alpha-amylase), or combination thereof. In some embodiments, liquefaction may take place in a liquefaction vessel. In some embodiments, enzyme 44 (e.g., alpha-amylase) may be added to liquefaction 40.

Feedstock slurry 45 may be conducted to separation 50 to separate undissolved solids feedstock slurry 45. Separation may be achieved by a number of means including, but not limited to, decanter bowl centrifugation, three-phase centrifugation (e.g., Tricanter®), disk stack centrifugation, filtering centrifugation, decanter centrifugation, filtration, vacuum filtration, beltfilter, pressure filtration, filtration using a screen, screen separation, grating, porous grating, flotation, hydroclone, filter press, screwpress, gravity settler, vortex separator, or combination thereof. For a description of methods and systems for removing undissolved solids see, for example, U.S. Patent Application Publication No. 2012/0164302, the entire contents of which are herein incorporated by reference. Separation of feedstock slurry 45 produces a liquid phase 55 and a solid phase 52 (e.g., undissolved solids). Liquid phase 55 may be added to fermentation 20, and solid phase 52 (or "wet cake") may be further processed. Wet cake 52 may include a portion of the sugar and water.

As an example of processing wet cake 52, wet cake 52 may be washed with water to recover sugar (e.g., oligosaccharides) present in the wet cake, and the recovered sugar and water may be recycled to the liquefaction 40. After washing, wet cake 52 may be further processed, for example, to form animal feed (e.g., DDGS).

In some embodiments, a microorganism may be added directly to fermentation 20, or the microorganism may be propagated in propagation 30 and then may be added to fermentation 20. In some embodiments, propagation may occur in a propagation vessel. Examples of microorganisms that may be used in these processes are described herein.

In some embodiments, feedstock 42 and/or liquid phase 55 may be added to fermentation 20 to pre-determined level. For example, feedstock 42 and/or liquid phase 55 may be added until it reaches the agitator blade of fermentation vessel 20. The agitator may then be activated and contents of propagation 30 may be added to fermentation 20. In some embodiments, feedstock 42 and/or liquid phase 55 may be fed to fermentation 20 until a steady state is reached. In some embodiments, feedstock 42 and/or liquid phase 55 may be circulated through an external cooling loop in order to maintain a temperature below, for example, 35° C. or any other control point.

In some embodiments, simultaneous saccharification and fermentation may occur in fermentation 20. Any known saccharification process normally utilized by the industry can be used including, but not limited to, the acid process, the acid-enzyme process, or the enzyme process. In some embodiments, an enzyme 22 such as glucoamylase, may be introduced to fermentation 20 in order to break down sugars in the form of oligosaccharides present in feedstock 42 or liquid phase 55 into monosaccharides. In some embodiments, saccharification may occur in a separate saccharification vessel. In some embodiments, saccharification may occur prior to separation 50 of the feedstock slurry 45 or after separation 50 of the feedstock slurry.

In some embodiments, stream 25 (e.g., fermentation broth) may be discharged from fermentation 20 and transferred to a pre-flash tank or flash tank for recovery of product alcohol. Discharged stream 25 may include microorganism and solids which may be separated from stream 25, for example, by centrifugation or filtration. The microorganism may then be recycled to fermentation 20 which over time may increase the production rate of product alcohol, thereby resulting in an increase in the efficiency of the product alcohol production. In addition, removal of the microorganism prior to transfer of the stream 25 to a pre-flash tank or flash tank may minimize the effects of the flash conditions (e.g., pressure and temperature) on the microorganism, resulting in improved viability. The microorganism may be returned to the fermentation vessel for another fermentation cycle.

In further embodiments of the processes described herein, cell recycling may be employed in flash fermentations as a means to achieve improved cell densities and improved fermentation rates. In the processes described herein, the microorganism may be removed from the fermentation broth prior to transfer of the fermentation broth to the pre-flash tank or flash tank and returned to the fermentation vessel for a another fermentation cycle. The microorganism may be recycled by separation from other fermentation components, for example, by centrifugation or membrane filtration. In some embodiments, the microorganism may be treated with acid to condition the microorganism for another fermentation cycle. This acid wash may be done in a separate tank (e.g., recycle tank). Alternatively, the microorganism (e.g., yeast) may be separated from other fermentation components, dried, and sold as a co-product.

The various streams generated by the processes described herein for production of a product alcohol via a fermentation process may be combined in many ways to generate a number of co-products. For example, the various streams may be combined and processed in such a way to create a customized feed product for a certain animal species (e.g., dairy cows). As described herein, distillers grains solids may be combined with syrup to produce dried distillers grains with solubles (DDGS).

The alcohol products produced by the methods of the present invention have a number of applications, for example, as reagents, solvents, and fuel. Butanol produced by the claimed methods may be used directly as a fuel (e.g., biofuel), a fuel additive, an alcohol used for the production of esters that can be used as diesel or biodiesel fuel, a feedstock chemical in the plastics industry, an ingredient in formulated products such as cosmetics, and a chemical intermediate. Butanol may also be used as a solvent for paints, coatings, varnishes, resins, gums, dyes, fats, waxes, resins, shellac, rubbers, and alkaloids. Thus, the present invention provides alternative methods to produce alcohols including butanol, which can support the high demand for these industrial chemicals.

Recombinant Microorganisms and Biosynthetic Pathways

While not wishing to be bound by theory, it is believed that the processes described herein are useful in conjunction with any alcohol-producing microorganism, particularly recombinant microorganisms which produce alcohol at titers above their tolerance levels.

Alcohol-producing microorganisms are known in the art. For example, fermentative oxidation of methane by methanotrophic bacteria (e.g., *Methylosinus trichosporium*) produces methanol, and contacting methanol (a $C_1$ alkyl alcohol) with a carboxylic acid and a catalyst capable of esterifying the carboxylic acid with methanol forms a methanol ester of the carboxylic acid. The yeast strain CEN.PK113-7D (CBS 8340, the Centraal Buro voor Schimmelculture; van Dijken, et al., Enzyme Microb. Techno. 26:706-714, 2000) can produce ethanol, and contacting ethanol with a carboxylic acid and a catalyst capable of esterifying the carboxylic acid with the ethanol forms ethyl ester.

Recombinant microorganisms which produce alcohol are also known in the art (e.g., Ohta, et al., Appl. Environ. Microbiol. 57:893-900, 1991; Underwood, et al., Appl. Environ. Microbiol. 68:1071-1081, 2002; Shen and Liao, Metab. Eng. 10:312-320, 2008; Hahnai, et al., Appl. Environ. Microbiol. 73:7814-7818, 2007; U.S. Pat. No. 5,514,583; U.S. Pat. No. 5,712,133; PCT Application Publication No. WO 1995/028476; Feldmann, et al., Appl. Microbiol. Biotechnol. 38: 354-361, 1992; Zhang, et al., Science 267: 240-243, 1995; U.S. Patent Application Publication No. 2007/0031918 A1; U.S. Pat. No. 7,223,575; U.S. Pat. No. 7,741,119; U.S. Pat. No. 7,851,188; U.S. Patent Application Publication No. 2009/0203099 A1; U.S. Patent Application Publication No. 2009/0246846 A1; and PCT Application Publication No. WO 2010/075241, which are all herein incorporated by reference).

Suitable recombinant microorganisms capable of producing product alcohols such as ethanol and butanol are known in the art, and certain suitable microorganisms capable of producing product alcohols are described herein. In some embodiments, the microorganism may be bacteria, cyanobacteria, filamentous fungi, or yeasts. Suitable microorganisms capable of producing product alcohol via a biosynthetic pathway include a member of the genera *Clostridium, Zymomonas, Escherichia, Salmonella, Serratia, Enrwinia, Klebsiella, Shigella, Rhodococcus, Pseudomonas, Bacillus, Lactobacillus, Enterococcus, Alcaligenes, Klebsiella, Paenibacillus, Arthrobacter, Corvnebacterium, Brevibacterium, Schizosaccharomyces, Kluvveromyces, Yarrowia, Pichia, Zygosaccharomyvces, Debaryomvces, Candida, Brettanomyces, Pachvsolen, Hansenula, Issatchenkia, Trichosporon, Yamadazyma*, or *Saccharomyces*. In some embodiments, recombinant microorganisms may be selected from the group consisting of *Escherichia coli, Alcaligenes eutrophus, Bacillus lichenifonnis, Paenibacillus macerans, Rhodococcus erythropolis, Pseudomonas putida, Lactobacillus plantarum, Enterococcus faecium, Enterococcus gallinarium, Enterococcus faecalis, Bacillus subtilis, Candida sonorensis, Candida methanosorbosa, Kluvveromyces lactis, Kluveromyces marxianus, Kluvveromyces thermotolerans, Issatchenkia orientalis, Debarvomyces hansenii*, and *Saccharomyces cerevisiae*. In some embodiments, the recombinant microorganism is yeast. In some embodiments, the recombinant microorganism is crabtree-positive yeast selected from *Saccharomyces, Zygosaccharomyces, Schizosaccharomyces, Dekkera, Torulopsis, Brettanomyces*, and some species of *Candida*. Species of crabtree-positive yeast include, but are not limited to, *Saccharomyces cerevisiae, Saccharomyces kluyveri, Schizosaccharomyces pombe, Saccharomyces bavanus, Saccharomyces mikitae, Saccharomyces paradoxus, Saccharomyces uvarum, Saccharomyces castelli, Saccharomyces kluvveri, Zygosaccharomyces rouxii, Zygosaccharomyces bailli*, and *Candida glabrata*. In addition, product alcohol-tolerant microorganisms identified by the methods described herein may also be suitable for genetic modification to produce product alcohol.

In some embodiments, the host cell is *Saccharomyces cerevisiae*. *Saccharomyces cerevisiae* are known in the art and are available from a variety of sources including, but not limited to, American Type Culture Collection (Rockville, Md.), Centraalbureau voor Schimmelcultures (CBS) Fungal Biodiversity Centre, LeSaffre, Gert Strand AB, Ferm Solutions, North American Bioproducts, Martrex, and Lallemand. *S. cerevisiae* include, but are not limited to, BY4741, CEN.PK 113-7D, Ethanol Red® yeast, Ferm Pro™ yeast, Bio-Ferm, XR yeast, Gert Strand Prestige Batch Turbo alcohol yeast, Gert Strand Pot Distillers yeast, Gert Strand Distillers Turbo yeast, FerMax™ Green yeast, FerMax™ Gold yeast, Thermosacc® yeast, BG-1, PE-2, CAT-1, CBS7959, CBS7960, and CBS7961.

In some embodiments, the microorganism may be immobilized or encapsulated. For example, the microorganism may be immobilized or encapsulated using alginate, calciumalginate, or polyacrylamide gels, or through the induction of biofilm formation onto a variety of high surface area support matrices such as diatomite, celite, diatomaceous earth, silica gels, plastics, or resins. In some embodiments, ISPR may be used in combination with immobilized or encapsulated microorganisms. This combination may improve productivity such as specific volumetric productivity, metabolic rate, product alcohol yields, tolerance to product alcohol. In addition, immobilization and encapsulation may minimize the effects of the process conditions such as shearing on the microorganisms.

The production of butanol utilizing fermentation with a microorganism, as well as microorganisms which produce butanol, is disclosed, for example, in U.S. Pat. No. 7,851, 188, and U.S. Patent Application Publication Nos. 2007/0092957; 2007/0259410; 2007/0292927; 2008/0182308; 2008/0274525; 2009/0155870; 2009/0305363; and 2009/0305370, the entire contents of each are herein incorporated by reference. In some embodiments, the microorganism is engineered to contain a biosynthetic pathway. In some embodiments, the biosynthetic pathway is an engineered butanol biosynthetic pathway. In some embodiments, the biosynthetic pathway converts pyruvate to a fermentative product. In some embodiments, the biosynthetic pathway converts pyruvate as well as amino acids to a fermentative product. In some embodiments, at least one, at least two, at least three, or at least four polypeptides catalyzing substrate to product conversions of a pathway are encoded by heterologous polynucleotides in the microorganism. In some embodiments, all polypeptides catalyzing substrate to product conversions of a pathway are encoded by heterologous polynucleotides in the microorganism. In some embodiments, the polypeptide catalyzing the substrate to product conversions of acetolactate to 2,3-dihydroxyisovalerate and/or the polypeptide catalyzing the substrate to product conversion of isobutyraldehyde to isobutanol are capable of utilizing reduced nicotinamide adenine dinucleotide (NADH) as a cofactor.

Biosynthetic Pathways

Biosynthetic pathways for the production of isobutanol that may be used include those described in U.S. Pat. No. 7,851,188, which is incorporated herein by reference. In one embodiment, the isobutanol biosynthetic pathway comprises the following substrate to product conversions:

a) pyruvate to acetolactate, which may be catalyzed, for example, by acetolactate synthase;
b) acetolactate to 2,3-dihydroxyisovalerate, which may be catalyzed, for example, by acetohydroxy acid reductoisomerase;
c) 2,3-dihydroxyisovalerate to α-ketoisovalerate, which may be catalyzed, for example, by acetohydroxy acid dehydratase;
d) α-ketoisovalerate to isobutyraldehyde, which may be catalyzed, for example, by a branched-chain α-keto acid decarboxylase; and,
e) isobutyraldehyde to isobutanol, which may be catalyzed, for example, by a branched-chain alcohol dehydrogenase.

In another embodiment, the isobutanol biosynthetic pathway comprises the following substrate to product conversions:

a) pyruvate to acetolactate, which may be catalyzed, for example, by acetolactate synthase;
b) acetolactate to 2,3-dihydroxyisovalerate, which may be catalyzed, for example, by ketol-acid reductoisomerase;
c) 2,3-dihydroxyisovalerate to α-ketoisovalerate, which may be catalyzed, for example, by dihydroxyacid dehydratase;
d) α-ketoisovalerate to valine, which may be catalyzed, for example, by transaminase or valine dehydrogenase;
e) valine to isobutylamine, which may be catalyzed, for example, by valine decarboxylase;
f) isobutylamine to isobutyraldehyde, which may be catalyzed by, for example, omega transaminase; and,
g) isobutyraldehyde to isobutanol, which may be catalyzed, for example, by a branched-chain alcohol dehydrogenase.

In another embodiment, the isobutanol biosynthetic pathway comprises the following substrate to product conversions:

a) pyruvate to acetolactate, which may be catalyzed, for example, by acetolactate synthase;
b) acetolactate to 2,3-dihydroxyisovalerate, which may be catalyzed, for example, by acetohydroxy acid reductoisomerase;
c) 2,3-dihydroxyisovalerate to α-ketoisovalerate, which may be catalyzed, for example, by acetohydroxy acid dehydratase;
d) α-ketoisovalerate to isobutyryl-CoA, which may be catalyzed, for example, by branched-chain keto acid dehydrogenase;
e) isobutyryl-CoA to isobutyraldehyde, which may be catalyzed, for example, by acylating aldehyde dehydrogenase; and,
f) isobutyraldehyde to isobutanol, which may be catalyzed, for example, by a branched-chain alcohol dehydrogenase.

Biosynthetic pathways for the production of 1-butanol that may be used include those described in U.S. Patent Application Publication No. 2008/0182308, which is incorporated herein by reference. In one embodiment, the 1-butanol biosynthetic pathway comprises the following substrate to product conversions:

a) acetyl-CoA to acetoacetyl-CoA, which may be catalyzed, for example, by acetyl-CoA acetyltransferase;
b) acetoacetyl-CoA to 3-hydroxybutyryl-CoA, which may be catalyzed, for example, by 3-hydroxybutyryl-CoA dehydrogenase;
c) 3-hydroxybutyryl-CoA to crotonyl-CoA, which may be catalyzed, for example, by crotonase;
d) crotonyl-CoA to butyryl-CoA, which may be catalyzed, for example, by butyryl-CoA dehydrogenase;
e) butyryl-CoA to butyraldehyde, which may be catalyzed, for example, by butyraldehyde dehydrogenase; and, f) butyraldehyde to 1-butanol, which may be catalyzed, for example, by butanol dehydrogenase.

Biosynthetic pathways for the production of 2-butanol that may be used include those described in U.S. Patent Application Publication No. 2007/0259410 and U.S. Patent Application Publication No. 2009/0155870, which are incorporated herein by reference. In one embodiment, the 2-butanol biosynthetic pathway comprises the following substrate to product conversions:
  a) pyruvate to alpha-acetolactate, which may be catalyzed, for example, by acetolactate synthase;
  b) alpha-acetolactate to acetoin, which may be catalyzed, for example, by acetolactate decarboxylase;
  c) acetoin to 3-amino-2-butanol, which may be catalyzed, for example, acetonin aminase;
  d) 3-amino-2-butanol to 3-amino-2-butanol phosphate, which may be catalyzed, for example, by aminobutanol kinase;
  e) 3-amino-2-butanol phosphate to 2-butanone, which may be catalyzed, for example, by aminobutanol phosphate phosphorylase; and,
  f) 2-butanone to 2-butanol, which may be catalyzed, for example, by butanol dehydrogenase.

In another embodiment, the 2-butanol biosynthetic pathway comprises the following substrate to product conversions:
  a) pyruvate to alpha-acetolactate, which may be catalyzed, for example, by acetolactate synthase;
  b) alpha-acetolactate to acetoin, which may be catalyzed, for example, by acetolactate decarboxylase;
  c) acetoin to 2,3-butanediol, which may be catalyzed, for example, by butanediol dehydrogenase;
  d) 2,3-butanediol to 2-butanone, which may be catalyzed, for example, by dial dehydratase; and,
  e) 2-butanone to 2-butanol, which may be catalyzed, for example, by butanol dehydrogenase.

Biosynthetic pathways for the production of 2-butanone that may be used include those described in U.S. Patent Application Publication No. 2007/0259410 and U.S. Patent Application Publication No. 2009/0155870, which are incorporated herein by reference. In one embodiment, the 2-butanone biosynthetic pathway comprises the following substrate to product conversions:
  a) pyruvate to alpha-acetolactate, which may be catalyzed, for example, by acetolactate synthase;
  b) alpha-acetolactate to acetoin, which may be catalyzed, for example, by acetolactate decarboxylase;
  c) acetoin to 3-amino-2-butanol, which may be catalyzed, for example, acetonin aminase;
  d) 3-amino-2-butanol to 3-amino-2-butanol phosphate, which may be catalyzed, for example, by aminobutanol kinase; and,
  e) 3-amino-2-butanol phosphate to 2-butanone, which may be catalyzed, for example, by aminobutanol phosphate phosphorylase.

In another embodiment, the 2-butanone biosynthetic pathway comprises the following substrate to product conversions:
  a) pyruvate to alpha-acetolactate, which may be catalyzed, for example, by acetolactate synthase;
  b) alpha-acetolactate to acetoin which may be catalyzed, for example, by acetolactate decarboxylase;
  c) acetoin to 2,3-butanediol, which may be catalyzed, for example, by butanediol dehydrogenase;
  d) 2,3-butanediol to 2-butanone, which may be catalyzed, for example, by diol dehydratase.

The terms "acetohydroxyacid synthase," "acetolactate synthase," and "acetolactate synthetase" (abbreviated "ALS") are used interchangeably herein to refer to an enzyme that catalyzes the conversion of pyruvate to acetolactate and carbon dioxide. Example acetolactate synthases are known by the EC number 2.2.1.6 (Enzyme Nomenclature 1992, Academic Press, San Diego). These unmodified enzymes are available from a number of sources, including, but not limited to, *Bacillus subtilis* (GenBank Nos: CAB15618, Z99122, NCBI (National Center for Biotechnology Information) amino acid sequence, NCBI nucleotide sequence, respectively), *Klebsiella pneumoniae* (GenBank Nos: AAA25079, M73842), and *Lactococcus lactis* (GenBank Nos: AAA25161, L16975).

The terms "ketol-acid reductoisomerase" ("KARI"), "acetohydroxy acid isomeroreductase," and "acetohydroxy acid reductoisomerase" are used interchangeably and refer to enzymes capable of catalyzing the reaction of (S)-acetolactate to 2,3-dihydroxyisovalerate. Example KARI enzymes may be classified as EC number EC 1.1.1.86 (Enzyme Nomenclature 1992, Academic Press, San Diego), and are available from a vast array of microorganisms, including, but not limited to, *Escherichia coli* (GenBank Nos: NP_418222, NC_000913), *Saccharomyces cerevisiae* (GenBank Nos: NP_013459, NC_001144). *Methanococcus maripaludis* (GenBank Nos: CAF30210, BX957220), and *Bacillus subtilis* (GenBank Nos: CAB 14789, Z99118). KARIs include *Anaerostipes caccae* KARI variants "K9G9" and "K9D3" (see U.S. Patent Application Publication No. 2012/0149080, which is incorporated herein by reference). Ketol-acid reductoisomerase enzymes are described in U.S. Patent Application Publication Nos. 2008/0261230, 2009/0163376, and 2010/0197519, and PCT Application Publication No. WO 2011/041415, which are incorporated herein by reference. Examples of KARIs disclosed therein are those from *Lactococcus lactis, Vibrio cholera, Pseudomonas aeruginosa* PAO1, and *Pseudomonas fluorescens* PF5 mutants. In some embodiments, KARI utilizes NADH. In some embodiments, KARI utilizes reduced nicotinamide adenine dinucleotide phosphate (NADPH).

The terms "acetohydroxy acid dehydratase" and "dihydroxyacid dehydratase" ("DHAD") refers to an enzyme that catalyzes the conversion of 2,3-dihydroxyisovalerate to α-ketoisovalerate. Example acetohydroxy acid dehydratases are known by the EC number 4.2.1.9. Such enzymes are available from a vast array of microorganisms, including, but not limited to, *E. coli* (GenBank Nos: YP_026248, NC000913), *Saccharomyces cerevisiae* (GenBank Nos: NP_012550, NC 001142, *M. maripaludis* (GenBank Nos: CAF29874, BX957219), *B. subtilis* (GenBank Nos: CAB14105. Z99115). *L. lactis*, and *N. crassa*. U.S. Patent Application Publication No. 2010/0081154, and U.S. Pat. No. 7,851,188, which are incorporated herein by reference, describe dihydroxyacid dehydratases (DHADs), including a DHAD from *Streptococcus mutans*.

The terms "branched-chain α-keto acid decarboxylase," "α-ketoacid decarboxylase," "α-ketoisovalerate decarboxylase," or "2-ketoisovalerate decarboxylase" ("KIVD") refers to an enzyme that catalyzes the conversion of α-ketoisovalerate to isobutyraldehyde and carbon dioxide. Example branched-chain α-keto acid decarboxylases are known by the EC number 4.1.1.72 and are available from a number of sources, including, but not limited to, *Lactococcus lactis* (GenBank Nos: AAS49166, AY548760; CAG34226, AJ746364, *Salmonella typhimurium* (GenBank Nos:

NP_461346, NC_003197), *Clostridium acetobutylicum* (GenBank Nos: NP_149189, NC_001988), *M. caseolyticus*, and *L. grayis*.

The term "branched-chain alcohol dehydrogenase" ("ADH") refers to an enzyme that catalyzes the conversion of isobutyraldehyde to isobutanol. Example branched-chain alcohol dehydrogenases are known by the EC number 1.1.1.265, but may also be classified under other alcohol dehydrogenases (specifically, EC 1.1.1.1 or 1.1.1.2). Alcohol dehydrogenases may be NADPH-dependent or NADH-dependent. Such enzymes are available from a number of sources, including, but not limited to, *S. cerevisiae* (GenBank Nos: NP_010656, NC_001136, NP_014051, NC_001145), *E. coli* (GenBank Nos: NP_417484, NC_000913), *C. acetobutylicum* (GenBank Nos: NP_349892, NC_003030; NP_349891, NC_003030). U.S. Patent Application Publication No. 2009/0269823, which is incorporated herein by reference, describes SadB, an alcohol dehydrogenase (ADH) from *Achromobacter xylosoxidans*. Alcohol dehydrogenases also include horse liver ADH and Beijerinkia indica ADH (as described by U.S. Patent Application Publication No. 2011/0269199, which is incorporated herein by reference).

The term "butanol dehydrogenase" refers to a polypeptide (or polypeptides) having an enzyme activity that catalyzes the conversion of isobutyraldehyde to isobutanol or the conversion of 2-butanone and 2-butanol. Butanol dehydrogenases are a subset of a broad family of alcohol dehydrogenases. Butanol dehydrogenase may be NAD- (nicotinamide adenine dinucleotide) or NADP-dependent. The NAD-dependent enzymes are known as EC 1.1.1.1 and are available, for example, from *Rhodococcus ruber* (GenBank Nos: CAD36475, AJ491307). The NADP-dependent enzymes are known as EC 1.1.1.2 and are available, for example, from *Pyrococcus furiosus* (GenBank Nos: AAC25556, AF013169). Additionally, a butanol dehydrogenase is available from *Escherichia coli* (GenBank Nos: NP 417484, NC_000913) and a cyclohexanol dehydrogenase is available from *Acinetobacter* sp. (GenBank Nos: AAG10026, AF282240). The term "butanol dehydrogenase" also refers to an enzyme that catalyzes the conversion of butyraldehyde to 1-butanol, using either NADH or NADPH as cofactor. Butanol dehydrogenases are available from, for example, *C. acetobutylicum* (GenBank NOs: NP_149325, NC_001988; note: this enzyme possesses both aldehyde and alcohol dehydrogenase activity); NP_349891, NC_003030; and NP_349892, NC_003030) and *E. coli* (GenBank NOs: NP_417-484, NC_000913).

The term "branched-chain keto acid dehydrogenase" refers to an enzyme that catalyzes the conversion of α-ketoisovalerate to isobutyryl-CoA (isobutyryl-coenzyme A), typically using $NAD^+$ as an electron acceptor. Example branched-chain keto acid dehydrogenases are known by the EC number 1.2.4.4. Such branched-chain keto acid dehydrogenases are comprised of four subunits and sequences from all subunits are available from a vast array of microorganisms, including, but not limited to, *B. subtilis* (GenBank Nos: CAB14336, Z99116; CAB14335, Z99116; CAB14334, Z99116; and CAB14337, Z99116) and *Pseudomonas putida* (GenBank Nos: AAA65614, M57613; AAA65615, M57613; AAA65617, M57613; and AAA65618, M57613).

The term "acylating aldehyde dehydrogenase" refers to an enzyme that catalyzes the conversion of isobutyryl-CoA to isobutyraldehyde, typically using either NADH or NADPH as an electron donor. Example acylating aldehyde dehydrogenases are known by the EC numbers 1.2.1.10 and 1.2.1.57. Such enzymes are available from multiple sources, including, but not limited to, *Clostridium beijerinckii* (GenBank Nos: AAD31841, AF157306), *C. acetobutylicum* (GenBank Nos: NP_149325, NC_001988; NP_149199, NC_001988), *P. putida* (GenBank Nos: AAA89106, U13232), and *Thermus thermophilus* (GenBank Nos: YP_145486, NC_006461).

The term "transaminase" refers to an enzyme that catalyzes the conversion of α-ketoisovalerate to L-valine, using either alanine or glutamate as an amine donor. Example transaminases are known by the EC numbers 2.6.1.42 and 2.6.1.66. Such enzymes are available from a number of sources. Examples of sources for alanine-dependent enzymes include, but are not limited to, *E. coli* (GenBank Nos: YP_026231, NC_000913) and *Bacillus licheniformis* (GenBank Nos: YP_093743, NC_006322). Examples of sources for glutamate-dependent enzymes include, but are not limited to, *E. coli* (GenBank Nos: YP_026247, NC_000913), *Saccharomyces cerevisiae* (GenBank Nos: NP_012682, NC_001142) and *Methanobacterium thermoautotrophicum* (GenBank Nos: NP_276546, NC_000916).

The term "valine dehydrogenase" refers to an enzyme that catalyzes the conversion of α-ketoisovalerate to L-valine, typically using NAD(P)H as an electron donor and ammonia as an amine donor. Example valine dehydrogenases are known by the EC numbers 1.4.1.8 and 1.4.1.9 and such enzymes are available from a number of sources, including, but not limited to, *Streptomyces coelicolor* (GenBank Nos: NP_628270, NC_003888) and *B. subtilis* (GenBank Nos: CAB14339, Z99116).

The term "valine decarboxylase" refers to an enzyme that catalyzes the conversion of L-valine to isobutylamine and carbon dioxide. Example valine decarboxylases are known by the EC number 4.1.1.14. Such enzymes are found in *Streptomyces*, such as for example, *Streptomyces viridifaciens* (GenBank Nos: AAN10242, AY116644).

The term "omega transaminase" refers to an enzyme that catalyzes the conversion of isobutylamine to isobutyraldehyde using a suitable amino acid as an amine donor. Example omega transaminases are known by the EC number 2.6.1.18 and are available from a number of sources, including, but not limited to, *Alcaligenes denitrificans* (AAP92672, AY330220), *Ralsionia eutropha* (GenBank Nos: YP_294474, NC_007347), *Shewanella oneidensis* (GenBank Nos: NP_719046, NC_004347), and *P. putida* (GenBank Nos: AAN66223, AE016776).

The term "acetyl-CoA acetyltransferase" refers to an enzyme that catalyzes the conversion of two molecules of acetyl-CoA to acetoacetyl-CoA and coenzyme A (CoA). Example acetyl-CoA acetyltransferases are acetyl-CoA acetyltransferases with substrate preferences (reaction in the forward direction) for a short chain acyl-CoA and acetyl-CoA and are classified as E.C. 2.3.1.9 [Enzyme Nomenclature 1992. Academic Press, San Diego]; although, enzymes with a broader substrate range (E.C. 2.3.1.16) will be functional as well. Acetyl-CoA acetyltransferases are available from a number of sources, for example, *Escherichia coli* (GenBank Nos: NP_416728, NC_000913; NCBI amino acid sequence, NCBI nucleotide sequence), *Clostridium acetobutylicum* (GenBank Nos: NP_349476.1, NC_003030; NP_149242, NC_001988, *Bacillus subtilis* (GenBank Nos: NP_390297, NC_000964), and *Saccharomyces cerevisiae* (GenBank Nos: NP_015297, NC_001148).

The term "3-hydroxybutyryl-CoA dehydrogenase" refers to an enzyme that catalyzes the conversion of acetoacetyl-CoA to 3-hydroxybutyryl-CoA. 3-Hydroxybutyryl-CoA dehydrogenases may be NADH-dependent, with a substrate preference for (S)-3-hydroxybutyryl-CoA or (R)-3-hydroxybutyryl-CoA. Examples may be classified as E.C. 1.1.1.35 and E.C. 1.1.1.30, respectively. Additionally, 3-hydroxybutyryl-CoA dehydrogenases may be NADPH-dependent, with a substrate preference for (S)-3-hydroxybutyryl-CoA or (R)-3-hydroxybutyryl-CoA and are classified as E.C. 1.1.1.157 and E.C. 1.1.1.36, respectively. 3-Hydroxybutyryl-CoA dehydrogenases are available from a number of sources, for example, *C. acetobutylicum* (GenBank NOs: NP_349314, NC_003030), *B. subtilis* (GenBank NOs: AAB09614, U29084), *Ralstonia eutropha* (GenBank NOs: YP_294481, NC_007347), and *Alcaligenes eutrophus* (GenBank NOs: AAA21973, J04987).

The term "crotonase" refers to an enzyme that catalyzes the conversion of 3-hydroxybutyryl-CoA to crotonyl-CoA and $H_2O$. Example crotonases may have a substrate preference for (S)-3-hydroxybutyryl-CoA or (R)-3-hydroxybutyryl-CoA and may be classified as E.C. 4.2.1.17 and E.C. 4.2.1.55, respectively. Crotonases are available from a number of sources, for example, *E. coli* (GenBank NOs: NP_415911, NC_000913), *C. acetobutylicum* (GenBank NOs: NP_349318, NC_003030), *B. subtilis* (GenBank NOs: CAB13705, Z99113), and *Aeromonas caviae* (GenBank NOs: BAA21816, D88825).

The term "butyryl-CoA dehydrogenase" refers to an enzyme that catalyzes the conversion of crotonyl-CoA to butyryl-CoA. Example butyryl-CoA dehydrogenases may be NADH-dependent, NADPH-dependent, or flavin-dependent and may be classified as E.C. 1.3.1.44, E.C. 1.3.1.38, and E.C. 1.3.99.2, respectively. Butyryl-CoA dehydrogenases are available from a number of sources, for example, *C. acetobutylicum* (GenBank NOs: NP_347102, NC_003030), *Euglena gracilis* (GenBank NOs: Q5EU90), AY741582), *Streptomyces collinus* (GenBank NOs: AAA92890, U37135), and *Streptomyces coelicolor* (GenBank NOs: CAA22721, AL939127).

The term "butyraldehyde dehydrogenase" refers to an enzyme that catalyzes the conversion of butyryl-CoA to butyraldehyde, using NADH or NADPH as cofactor. Butyraldehyde dehydrogenases with a preference for NADH are known as E.C. 1.2.1.57 and are available from, for example, *Clostridium beijerinckii* (GenBank NOs: AAD31841, AF157306) and *C. acetobutylicum* (GenBank NOs: NP.sub.-149325, NC.sub.-001988).

The term "isobutyryl-CoA mutase" refers to an enzyme that catalyzes the conversion of butyryl-CoA to isobutyryl-CoA. This enzyme uses coenzyme $B_{12}$ as cofactor. Example isobutyryl-CoA mutases are known by the EC number 5.4.99.13. These enzymes are found in a number of *Streptomyces*, including, but not limited to, *Streptomyces cinnamonensis* (GenBank Nos: AAC08713, U67612; CAB59633, AJ246005), *S. coelicolor* (GenBank Nos: CAB70645, AL939123; CAB92663, AL939121), and *Streptomyces avermitilis* (GenBank Nos: NP_824008, NC_003155; NP_824637, NC_003155).

The term "acetolactate decarboxylase" refers to a polypeptide (or polypeptides) having an enzyme activity that catalyzes the conversion of alpha-acetolactate to acetoin. Example acetolactate decarboxylases are known as EC 4.1.1.5 and are available, for example, from *Bacillus subtilis* (GenBank Nos: AAA22223, L04470), *Klebsiella terrigena* (GenBank Nos: AAA25054, L04507) and *Klebsiella pneumoniae* (GenBank Nos: AAU43774, AY722056).

The term "acetoin aminase" or "acetoin transaminase" refers to a polypeptide (or polypeptides) having an enzyme activity that catalyzes the conversion of acetoin to 3-amino-2-butanol. Acetoin aminase may utilize the cofactor pyridoxal 5'-phosphate or NADH or NADPH. The resulting product may have (R) or (S) stereochemistry at the 3-position. The pyridoxal phosphate-dependent enzyme may use an amino acid such as alanine or glutamate as the amino donor. The NADH- and NADPH-dependent enzymes may use ammonia as a second substrate. A suitable example of an NADH-dependent acetoin aminase, also known as amino alcohol dehydrogenase, is described by Ito, et al. (see, e.g., U.S. Pat. No. 6,432,688). An example of a pyridoxal-dependent acetoin aminase is the amine:pyruvate aminotransferase (also called amine:pyruvate transaminase) described by Shin and Kim (J. Org. Chem. 67:2848-2853, 2002).

The term "acetoin kinase" refers to a polypeptide (or polypeptides) having an enzyme activity that catalyzes the conversion of acetoin to phosphoacetoin. Acetoin kinase may utilize ATP (adenosine triphosphate) or phosphoenolpyruvate as the phosphate donor in the reaction. Enzymes that catalyze the analogous reaction on the similar substrate dihydroxyacetone, for example, include enzymes known as EC 2.7.1.29 (see, e.g., Garcia-Alles, et al., Biochemistry 43:13037-13046, 2004).

The term "acetoin phosphate aminase" refers to a polypeptide (or polypeptides) having an enzyme activity that catalyzes the conversion of phosphoacetoin to 3-amino-2-butanol O-phosphate. Acetoin phosphate aminase may use the cofactor pyridoxal 5'-phosphate, NADH or NADPH. The resulting product may have (R) or (S) stereochemistry at the 3-position. The pyridoxal phosphate-dependent enzyme may use an amino acid such as alanine or glutamate. The NADH- and NADPH-dependent enzymes may use ammonia as a second substrate. Although there are no reports of enzymes catalyzing this reaction on phosphoacetoin, there is a pyridoxal phosphate-dependent enzyme that is proposed to carry out the analogous reaction on the similar substrate serinol phosphate (see, e.g. Yasuta, et al., Appl. Environ. Microbial. 67:4999-5009, 2001).

The term "aminobutanol phosphate phospholyase," also called "amino alcohol O-phosphate lyase," refers to a polypeptide (or polypeptides) having an enzyme activity that catalyzes the conversion of 3-amino-2-butanol O-phosphate to 2-butanone. Amino butanol phosphate phospho-lyase may utilize the cofactor pyridoxal 5'-phosphate. There are reports of enzymes that catalyze the analogous reaction on the similar substrate 1-amino-2-propanol phosphate (see, e.g., Jones, et al., Biochem J. 134:167-182, 1973). U.S. Patent Application Publication No. 2007/0259410 describes an aminobutanol phosphate phospho-lyase from the organism *Erwinia carotovora*.

The term "aminobutanol kinase" refers to a polypeptide (or polypeptides) having an enzyme activity that catalyzes the conversion of 3-amino-2-butanol to 3-amino-2butanol O-phosphate. Amino butanol kinase may utilize ATP as the phosphate donor. Although there are no reports of enzymes catalyzing this reaction on 3-amino-2-butanol, there are reports of enzymes that catalyze the analogous reaction on the similar substrates ethanolamine and 1-amino-2-propanol (Jones, et al., supra). U.S. Patent Application Publication No. 2009/0155870 describes, in Example 14, an amino alcohol kinase of *Erwinia carotovora* subsp. *Atroseptica*.

The term "butanediol dehydrogenase" also known as "acetoin reductase" refers to a polypeptide (or polypeptides) having an enzyme activity that catalyzes the conversion of acetoin to 2,3-butanediol. Butanedial dehydrogenases are a subset of the broad family of alcohol dehydrogenases. Butanediol dehydrogenase enzymes may have specificity for production of (R)- or (S)-stereochemistry in the alcohol product. (S)-specific butanediol dehydrogenases are known as EC 1.1.1.76 and are available, for example, from *Klebsiella pneumoniae* (GenBank Nos: BBA13085, D86412). (R)-specific butanediol dehydrogenases are known as EC 1.1.1.4 and are available, for example, from *Bacillus cereus* (GenBank Nos. NP 830481, NC_004722; AAP07682, AE017000), and *Lactococcus lactis* (GenBank Nos. AAK04995, AE006323).

The term "butanediol dehydratase," also known as "dial dehydratase" or "propanediol dehydratase" refers to a polypeptide (or polypeptides) having an enzyme activity that catalyzes the conversion of 2,3-butanediol to 2-butanone. Butanediol dehydratase may utilize the cofactor adenosyl cobalamin (also known as coenzyme Bw or vitamin B12; although vitamin B12 may refer also to other forms of cobalamin that are not coenzyme B12). Adenosyl cobalamin-dependent enzymes are known as EC 4.2.1.28 and are available, for example, from *Klebsiella oxytoca* (GenBank Nos: AA08099 (alpha subunit), D45071; BAA08100 (beta subunit), D45071; and BBA08101 (gamma subunit), D45071 (all three subunits are required for activity), and *Klebsiella pneumonia* (GenBank Nos: AAC98384 (alpha subunit), AF102064; GenBank Nos: AAC98385 (beta subunit), AF102064, GenBank Nos: AAC98386 (gamma subunit), AF102064). Other suitable dial dehydratases include, but are not limited to, B12-dependent dial dehydratases available from *Salmonella typhimurium* (GenBank Nos: AAB84102 (large subunit), AF026270; GenBank Nos: AAB84103 (medium subunit), AF026270; GenBank Nos: AAB84104 (small subunit). AF026270); and *Lactobacillus collinoides* (GenBank Nos: CAC82541 (large subunit), AJ297723; GenBank Nos: CAC82542 (medium subunit); AJ297723; GenBank Nos: CAD01091 (small subunit), AJ297723); and enzymes from *Lactobacillus* brevis (particularly strains CNRZ 734 and CNRZ 735; see, e.g., Speranza, et al., J. Agric. Food Chem. 45:3476-3480, 1997), and nucleotide sequences that encode the corresponding enzymes. Methods of dial dehydratase gene isolation are well known in the art (e.g., U.S. Pat. No. 5,686,276).

The term "pyruvate decarboxylase" refers to an enzyme that catalyzes the decarboxylation of pyruvic acid to acetaldehyde and carbon dioxide. Pyruvate dehydrogenases are known by the EC number 4.1.1.1. These enzymes are found in a number of yeast, including *Saccharomyces cerevisiae* (GenBank Nos: CAA97575, CAA97705, CAA97091).

It will be appreciated that host cells comprising an isobutanol biosynthetic pathway as provided herein may further comprise one or more additional modifications. U.S. Patent Application Publication No. 2009/0305363 (incorporated by reference) discloses increased conversion of pyruvate to acetolactate by engineering yeast for expression of a cytosol-localized acetolactate synthase and substantial elimination of pyruvate decarboxylase activity. In some embodiments, the host cells comprise modifications to reduce glycerol-3-phosphate dehydrogenase activity and/or disruption in at least one gene encoding a polypeptide having pyruvate decarboxylase activity or a disruption in at least one gene encoding a regulatory element controlling pyruvate decarboxylase gene expression as described in U.S. Patent Application Publication No. 2009/0305363 (incorporated herein by reference), modifications to a host cell that provide for increased carbon flux through an Entner-Doudoroff Pathway or reducing equivalents balance as described in U.S. Patent Application Publication No. 2010/0120105 (incorporated herein by reference). Other modifications include integration of at least one polynucleotide encoding a polypeptide that catalyzes a step in a pyruvate-utilizing biosynthetic pathway. Other modifications include at least one deletion, mutation, and/or substitution in an endogenous polynucleotide encoding a polypeptide having acetolactate reductase activity. In embodiments, the polypeptide having acetolactate reductase activity is YMR226C (GenBank No. EJS44181) of *Saccharomyces cerevisiae* or a homolog thereof. Additional modifications include a deletion, mutation, and/or substitution in an endogenous polynucleotide encoding a polypeptide having aldehyde dehydrogenase and/or aldehyde oxidase activity. In some embodiments, the polypeptide having aldehyde dehydrogenase activity is ALD6 from *Saccharomyces cerevisiae* or a homolog thereof. A genetic modification which has the effect of reducing glucose repression wherein the yeast production host cell is pdc- is described in U.S. Patent Application Publication No. 2011/0124060, incorporated herein by reference. In some embodiments, the pyruvate decarboxylase that is deleted or down-regulated is selected from the group consisting of: PDC1, PDC5, PDC6, and combinations thereof. Examples of pyruvate decarboxylase include, but are not limited to, Pdc1 (GenBank No. CAA97575), Pdc5 (GenBank No. CAA97705), and Pdc6 (GenBank No. CAA97091) from *Saccharomyces cerevisiae*; pyruvate decarboxylase from *Candida glabrata* (GenBank No. CAG62667); Pdc1 (GenBank No. AAC03164) and Pdc2 (GenBank No. EAZ63682) from *Pichia stipites*; pyruvate decarboxylase from *Kluyveromyces lactis* (GenBank No. CAA59953); pyruvate decarboxylase from *Yarrowia lipolytica* (GenBank No. CAG80835); pyruvate decarboxylase from *Schizosaccharomyces pombe* (GenBank No. CAA90807); and pyruvate decarboxylase from *Zygosaccharomyces rouxii* (GenBank No. CAR28333). In some embodiments, host cells contain a deletion or down-regulation of a polynucleotide encoding a polypeptide that catalyzes the conversion of glyceraldehyde-3-phosphate to glycerate 1,3, bisphosphate. In some embodiments, the enzyme that catalyzes this reaction is glyceraldehyde-3-phosphate dehydrogenase.

In some embodiments, any particular nucleic acid molecule or polypeptide may be at least 80%, 85%, 90%, 95%, 96%, 97%, 98%, or 99% identical to a nucleotide sequence or polypeptide sequence described herein. The term "percent identity" as known in the art, is a relationship between two or more polypeptide sequences or two or more polynucleotide sequences, as determined by comparing the sequences. In the art, "identity" also means the degree of sequence relatedness between polypeptide or polynucleotide sequences, as the case may be, as determined by the match between strings of such sequences. "Identity" and "similarity" can be readily calculated by known methods, including but not limited to those disclosed in: 1.) *Computational Molecular Biology* (Lesk, A. M., Ed.) Oxford University: NY (1988); 2.) *Biocomputing: Informatics and Genome Projects* (Smith, D. W., Ed.) Academic: NY (1993); 3.) *Computer Analysis of Sequence Data, Part I* (Griffin, A. M., and Griffin, H. G., Eds.) Humania: NJ (1994); 4.) *Sequence Analyvsis in Molecular Biology* (von Heinje, G., Ed.) Academic (1987): and 5.) *Sequence Analysis Primer* (Gribskov, M. and Devereux, J., Eds.) Stockton: NY (1991).

Methods to determine identity are designed to give the best match between the sequences tested. Methods to determine identity and similarity are codified in publicly available computer programs. Sequence alignments and percent identity calculations may be performed using the MegAlign™ program of the LASERGENE bioinformatics computing suite (DNASTAR Inc., Madison, Wis.). Multiple alignment of the sequences is performed using the "Clustal method of alignment" which encompasses several varieties of the algorithm including the "Clustal V method of alignment" corresponding to the alignment method labeled Clustal V (disclosed by Higgins and Sharp, CABIOS. 5:151-153, 1989; Higgins, et al., Comput. Appl. Biosci. 8:189-191, 1992) and found in the MegAlign™ program of the LASERGENE bioinformatics computing suite (DNASTAR Inc.). For multiple alignments, the default values correspond to GAP PENALTY=10 and GAP LENGTH PENALTY=10. Default parameters for pairwise alignments and calculation of percent identity of protein sequences using the Clustal method are KTUPLE=1, GAP PENALTY=3, WINDOW=5 and DIAGONALS SAVED=5. For nucleic acids these parameters are KTUPLE=2, GAP PENALTY=5, WINDOW=4 and DIAGONALS SAVED=4. After alignment of the sequences using the Clustal V program, it is possible to obtain a "percent identity" by viewing the "sequence distances" table in the same program. Additionally the "Clustal W method of alignment" is available and corresponds to the alignment method labeled Clustal W (described by Higgins and Sharp, CABIOS. 5:151-153, 1989; Higgins, et al., Comput. Appl. Biosci. 8:189-191, 1992) and found in the MegAlign™ v6.1 program of the LASERGENE bioinformatics computing suite (DNASTAR Inc.). Default parameters for multiple alignment (GAP PENALTY=10, GAP LENGTH PENALTY=0.2, Delay Divergen Seqs (%)=30, DNA Transition Weight=0.5, Protein Weight Matrix=Gonnet Series, DNA Weight Matrix=IUB). After alignment of the sequences using the Clustal W program, it is possible to obtain a "percent identity" by viewing the "sequence distances" table in the same program.

Standard recombinant DNA and molecular cloning techniques are well known in the art and are described by Sambrook, et al. (Sambrook, J., Fritsch, E. F. and Maniatis, T. (Molecular Cloning: A Laboratory Manual; Cold Spring Harbor Laboratory Press, Cold Spring Harbor, 1989, here in referred to as Maniatis) and by Ausubel, et al. (Ausubel, et al., Current Protocols in Molecular Biology, pub. by Greene Publishing Assoc. and Wiley-Interscience, 1987). Examples of methods to construct microorganisms that comprise a butanol biosynthetic pathway are disclosed, for example, in U.S. Pat. No. 7,851,188, and U.S. Patent Application Publication Nos. 2007/0092957; 2007/0259410; 2007/0292927; 2008/0182308; 2008/0274525; 2009/0155870; 2009/0305363; and 2009/0305370, the entire contents of each are herein incorporated by reference.

While various embodiments of the present invention have been described herein, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the claims and their equivalents.

All publications, patents, and patent applications mentioned in this specification are indicative of the level of skill of those skilled in the art to which this invention pertains, and are herein incorporated by reference to the same extent as if each individual publication, patent, or patent application was specifically and individually indicated to be incorporated by reference.

EXAMPLES

The following non-limiting examples will further illustrate the invention. It should be understood that, while the following examples involve corn as feedstock, other biomass sources such as cane may be used for feedstock without departing from the present invention. Moreover, while the following examples involve ethanol and butanol, other alcohols may be produced without departing from the present invention.

The assays and methods described in Examples 1-5 may be used to determine the effects of certain fermentation conditions and process conditions (e.g., pressure, temperature, pH, etc.) on cell viability.

Example 1. Effect of Vacuum on Cell Viability

A *Saccharomyces cerevisiae* strain that was engineered to produce a product alcohol from a carbohydrate source was grown to 0.55-1.1 g/L dcw in seed flasks from a frozen culture. The culture was grown at 23-26° C. in an incubator rotating at 300 rpm. The frozen culture was previously stored at −80° C.

A series of comparative examples were conducted testing the effect of vacuum on the viability of the microorganism. Glucose utilization, optical density (OD), and cell count were used to determine the health of the microorganism.

Glucose concentrations were measured using a YSI Life Sciences 2700 Select™ Biochemistry Analyzer. Fermentation samples were centrifuged at 13,200 rpm for 2 minutes in a 1.7 mL microcentrifuge tube and the aqueous supernatant analyzed for glucose concentration.

Optical density was measured using a Thermo Electron Corporation Helios Alpha spectrophotometer. Measurements were typically made at a wavelength of 600 nanometers.

Cell counts were made with a Bright-Line™ hemacytometer in conjunction with a Zeiss Axioskop 40 microscope at 40× magnification. Viability was determined by staining cells with a 0.08% trypan blue NaCl solution which stains dead cells.

The primary culture was prepared by incubating frozen glycerol seed stock of the microorganism in 2×500 mL of YPD (50 g/L) per 2 L baffled flasks at 30° C. and 250 rpm for 16 hours in an incubator shaker (Innova 4200, New Brunswick Scientific, Edison, N.J.). The OD was measured and cell counts performed to check viability of the primary culture prior to vacuum exposure.

Once initial measurements were made, the culture was transferred aseptically to a sterile round bottom reactor in which a slow vacuum was pulled over approximately 5 minutes ("Slow Vacuum") until it reached 52-53 mmHg where it was held for minutes. The reactor was then returned to atmospheric pressure. A sample was collected for cell count and to inoculate a new culture (0.25 mL into 250 mL of fresh YPD) to determine cell viability by monitoring growth (OD) and glucose consumption over 24 hours. Results are shown in Tables 1 and 2.

Another primary culture broth was exposed to a second faster vacuum, about seconds ("Fast Vacuum") to reach 54 mmHg, then returned to atmospheric pressure. A sample was collected for cell count as well as inoculation of a new flask to determine cell viability by monitoring growth (OD) and glucose consumption over 24 hours. Results are shown in Tables 1 and 2. Cell viability was determined by cell count using trypan blue to identify dead cells. A final sample was examined under microscope for culture purity.

TABLE 1

| Culture Description | Vacuum (mmHg) | OD (600 mn) | Cell Counts | Microscope Observations |
|---|---|---|---|---|
| Initial Culture | NA | 9.8 | $3.00 \times 10^8$ | No signs of cell death |
| Exposure to Slow Vacuum | 52-53 | NA | $2.85 \times 10^8$ | No signs of cell death |
| Exposure to Fast Vacuum | 54 | NA | $2.95 \times 10^8$ | No signs of cell death |

TABLE 2

| Secondary Cultures | Vacuum (mmHg) | OD/Glucose 5 hrs | OD/Glucose 22 hrs | Microscope Observations |
|---|---|---|---|---|
| Slow Vacuum | 52-53 | 0.09/17.0 | 14.7/0 | No sign of contamination |
| Fast Vauum | 54 | 0.09/17.3 | 15.9/0 | No sign of contamination |

Example 2. Effect of Temperature on Cell Viability

A study was conducted to determine the effect of temperature on the viability of a Saccharomyces cerevisiae strain (NGCI-070). The construction of this Saccharomyces cerevisiae strain is described in U.S. Patent Application Publication No. 2011/0244536, which is incorporated in its entirety herein.

The primary culture was prepared by incubating seed stock of NGCI-070 in 10 mL media tubes at 30° C. for 32 hours in an incubator shaker (Innova 4200, New Brunswick Scientific, Edison, N.J.). Klett flasks containing 50 mL broth were then inoculated with the aliquots of primary culture, and the flasks were incubated at 30° C. in an incubator shaker. The cells were grown until the Klett readings reached about 220-250, and then 15 mL aliquots were added to 50 mL centrifuge tubes.

Broth (3.6 mL) was added to sterile test tubes and the test tubes were pre-heated in a 50° C. water bath for 10 minutes. Cells (0.4 mL) were added to the test tubes and then the cells were incubated at 50° C. for various time points (e.g., 0, 3, 6, 9, and 12 minutes). Following incubation, 0.1 mL of cells was plated onto a YPD (Yeast extract-Peptone-Dextrose) II plate (3 g/L glucose and 3 g/L ethanol) and another 0.1 mL of cells was added to 9.9 mL medium for further dilutions. These dilutions were also plated onto YPD II plates. The YPD plates were incubated for 5 days at 30° C. and then counted. Results are shown in Table 3.

Cell viability was also assessed at 60° C. and 70° C. using similar protocols. Cells were incubated at 60° C. for 0, 1, 2, 3, and 4 minutes and at 70° C. for 0, 15, 30, 45, and 60 seconds). Results are shown in Table 3.

TABLE 3

| Temperature | Time (minutes) | | | | |
|---|---|---|---|---|---|
| | 0 | 3 | 6 | 9 | 12 |
| 50° C. | $3.6 \times 10^6$ | $3.5 \times 10^6$ | $2.9 \times 10^6$ | $2.9 \times 10^6$ | $2.1 \times 10^6$ |
| | Time (minutes) | | | | |
| | 0 | 1 | 2 | 3 | 4 |
| 60° C. | $4.3 \times 10^6$ | $3.9 \times 10^2$ | <100 | <100 | <100 |
| | Time (seconds) | | | | |
| | 0 | 15 | 30 | 45 | 60 |
| 70° C. | $4.2 \times 10^6$ | <10 | <10 | <10 | <10 |

Example 3. Effect of pH on Cell Viability

A study was conducted to determine the effect of pH on the viability of a yeast strain, Saccharomyces cerevisiae.

The primary culture was prepared by incubating seed stock of the yeast in 10 mL tubes containing YPS (Yeast extract-Peptone-Sucrose) media at 30° C. for 24 hours in an incubator shaker (Innova 4200, New Brunswick Scientific, Edison, N.J.). Klett flasks containing 100 mL broth were then inoculated with the aliquots of primary culture, and the flasks were incubated at 30° C. in an incubator shaker. The cells were grown until the Klett readings reached about 250.

Cells (25 mL) were removed from the Klett flask and added to a sterile beaker with a sterile stir bar. The pH was adjusted with 6 N NaOH until the desired pH was attained (e.g., about pH 11, 12, or 13). The cells were then maintained at this pH for various time points (e.g., 0, 10, 20, 30 minutes). Cells were plated onto YPS agar plates and were incubated for 2 days at 30° C. and then counted. Results are shown in Table 4.

TABLE 4

| pH | Time (minutes) | | | | |
|---|---|---|---|---|---|
| | 0 | 1 | 10 | 20 | 30 |
| 11 | $1.8 \times 10^7$ | $1.2 \times 10^7$ | $1.7 \times 10^7$ | $3.9 \times 10^7$ | $8.5 \times 10^6$ |
| 12 | $1.3 \times 10^7$ | $2.0 \times 10^7$ | $1.2 \times 10^7$ | $7.5 \times 10^6$ | $6.4 \times 10^6$ |
| 13 | $2.8 \times 10^7$ | <10 | <10 | <10 | <10 |

Example 4. Effect of Temperature and pH on Cell Viability

A study was conducted to determine the effect of temperature and pH on the viability of a yeast strain, Saccharomyces cerevisiae.

The primary culture was prepared by incubating seed stock of the yeast in 10 mL tubes containing YPS media at 30° C. for 24 hours in an incubator shaker (Innova 4200, New Brunswick Scientific, Edison, N.J.). Klett flasks containing 50 mL broth were then inoculated with the aliquots of primary culture, and the flasks were incubated at 30° C. in an incubator shaker. The cells were grown until the Klett readings reached about 250.

Aliquots (100 mL) of YPS media were added to a beaker and the pH was adjusted with 6 N NaOH until the desired pH was attained (e.g., about pH 9, 10, or 11). The media was filter sterilized using a 0.2µ filter, and then aliquots (9 mL) were added to sterile tubes. The tubes were preheated by incubating in a 40° C. water bath, and then cells (1 mL) were added to each tube. The cells were incubated at 40° C. for various time points (e.g., 0, 2.5, 5, and 10 minutes). Cells were also incubated for various time points (e.g., 0, 2.5, 5, and 10 minutes) at ambient temperature. Cells were plated onto YPS plates and were incubated for 2 days at 30° C. and then counted. Results are shown in Table 5.

TABLE 5

| pH | Time (minutes) | | | |
|---|---|---|---|---|
| | 0 | 2.5 | 5 | 10 |
| Temperature (Ambient) | | | | |
| 9 | $1.9 \times 10^6$ | $1.4 \times 10^6$ | $2.3 \times 10^6$ | $1.7 \times 10^6$ |
| 10 | $2.4 \times 10^6$ | $2.7 \times 10^6$ | $2.0 \times 10^6$ | $1.7 \times 10^6$ |
| 11 | $1.4 \times 10^6$ | $2.5 \times 10^6$ | $1.8 \times 10^6$ | $2.1 \times 10^6$ |
| Temperature (40° C.) | | | | |
| 9 | $2.5 \times 10^6$ | $1.3 \times 10^6$ | $2.8 \times 10^6$ | $2.5 \times 10^6$ |
| 10 | $2.2 \times 10^6$ | $1.4 \times 10^6$ | $1.8 \times 10^6$ | $1.8 \times 10^6$ |
| 11 | $2.9 \times 10^6$ | $1.3 \times 10^6$ | $1.8 \times 10^6$ | $7.0 \times 10^5$ |

A similar experiment was performed using a higher temperature and higher pH. Cells (10 mL) were added to 90 mL YPS media in a sterile flask with a sterile stir bar. The pH was adjusted with 6 N NaOH until the desired pH was attained (e.g., about pH 10, 11, or 12). The cells were then incubated at 50° C. for various time points (e.g., 0, 2.5, 7.5, and 15 minutes). Cells were also incubated for various time points (e.g., 0, 5, 10, and 20 minutes) at ambient temperature. Following incubation, cells were plated onto YPS plates and were incubated for 2 days at 30° C. and then counted. Results are shown in Table 6.

TABLE 6

| Temperature (Ambient) | | | | |
|---|---|---|---|---|
| | Time (minutes) | | | |
| pH | 0 | 5 | 10 | 20 |
| 10 | $2.0 \times 10^6$ | $2.7 \times 10^6$ | $1.7 \times 10^6$ | $1.6 \times 10^6$ |
| 11 | $1.2 \times 10^6$ | $1.4 \times 10^6$ | $2.4 \times 10^6$ | $1.7 \times 10^6$ |
| 12 | $1.5 \times 10^6$ | $1.7 \times 10^6$ | $1.2 \times 10^6$ | $8.0 \times 10^5$ |
| Temperature (50° C.) | | | | |
| | Time (minutes) | | | |
| | 0 | 2.5 | 7.5 | 15 |
| 10 | $2.0 \times 10^6$ | $1.1 \times 10^4$ | <10 | <10 |
| 11 | $1.2 \times 10^6$ | $1.1 \times 10^3$ | 10 | <10 |
| 12 | $1.5 \times 10^6$ | $2.0 \times 10^2$ | <10 | <10 |

Example 5. Effect of Disinfectant on Cell Viability

A study was conducted to determine the effect of disinfectant on the viability of a yeast strain, Saccharomyces cerevisiae.

The primary culture was prepared by incubating seed stock of the yeast in 10 mL tubes containing YPS media at 30° C. for 24 hours in an incubator shaker (Innova 4200, New Brunswick Scientific, Edison, N.J.). Klett flasks containing 50 mL broth were then inoculated with the aliquots of primary culture, and the flasks were incubated at 30° C. in an incubator shaker. The cells were grown until the Klett readings reached about 220.

Dey-Engley neutralizing broth (DE broth) (Sigma-Aldrich Corp., St. Louis, Mo.) was used as the neutralizing dilution agent. The DE broth (1 L) was prepared with 15 g/L agar and sterilized for 15 minutes at 121° C. The DE broth/agar was cooled to 45° C. and aliquots (10 mL) were added to sterile test tubes which were maintained in a water bath. Thin plates were also prepared with the DE broth/agar.

Solutions of several disinfectants were prepared as follows:
a) Wescodyne®, an iodophor based detergent (Steris Corporation, Mentor, Ohio): 0.938 mL of Wescodyne® was added to a final volume of 100 mL Milli-Q® water (0.94%) (Millipore, Billerica, Mass.);
b) Virkon® S, a blend of peroxygen compounds, surfactant, and organic acids (E.I. duPont deNemours and Company, Wilmington, Del.): 1 g of Virkon® S was added to a final volume of 100 mL Milli-Q® water (1%);
c) 70% alcohol solution: 70 mL of ethanol was added to a final volume of 100 mL Milli-Q® water;
d) Lysol® Quaternary Disinfectant, didecyldimonium chloride and benzalkonium chloride, octyl dimethyl amine oxide (Reckitt Benckiser North America, Parsippany, N.J.): 0.781 mL of Lysol® Quaternary Disinfectant was added to a final volume of 100 mL Milli-Q® water (0.78%); and
e) Sporocidin®, buffered phenol and sodium phenate (Contec, Inc., Spartanburg, S.C.): used directly.

Figure 13:
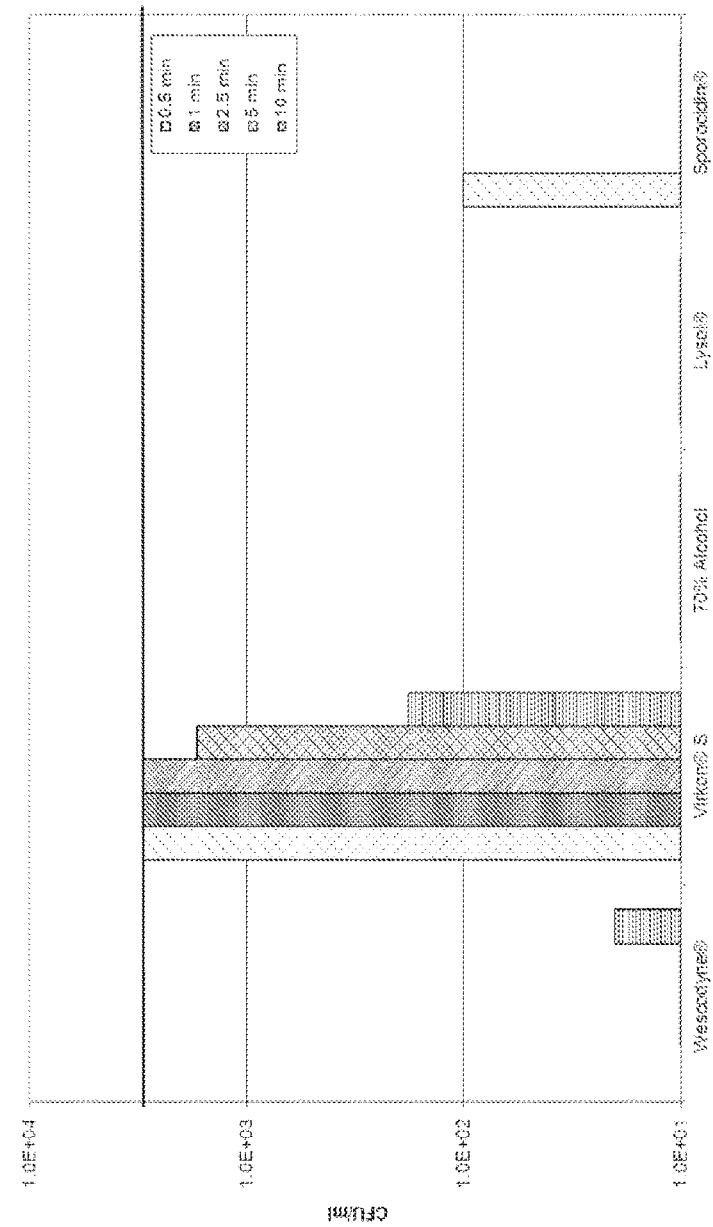
FIG. 13 shows the effect of disinfectant on cell viability.

Cells (5 mL) were mixed with 5 mL sterile PBS or 5 mL of the disinfectant solutions, and incubated for various time points (0.5, 1, 2.5, 5, or 10 minutes). Then, 0.1 mL of the cell mixture was added to the 10 mL DE broth/agar in the test tubes, mixed, and this mixture was poured on to the DE broth/agar plates. After drying, the plates were inverted and incubated at 30° C. Results are shown in Table 7 and in FIG. 13. The black bar denotes the maximum detection limit of this test.

TABLE 7

| Test Substance | Time (minutes) | | | | |
|---|---|---|---|---|---|
| | 0.5 | 1 | 2.5 | 5 | 10 |
| PBS | $>3.0 \times 10^3$ | ND* | ND | ND | $>3.0 \times 10^3$ |
| Wescodyne ® | 10 | <10 | <10 | <10 | <10 |
| Virkon ® S | $>3.0 \times 10^3$ | $>3.0 \times 10^3$ | $>3.0 \times 10^3$ | $1.7 \times 10^3$ | $1.8 \times 10^2$ |
| 70% alcohol | <10 | <10 | <10 | <10 | <10 |
| Lysol ® | <10 | <10 | <10 | <10 | <10 |
| Sporocidin ® | $1.0 \times 10^2$ | <10 | <10 | <10 | <10 |

*ND: not determined

The processes described herein may be demonstrated using computational modeling such as Aspen modeling (see, e.g., U.S. Pat. No. 7,666,282). For example, the commercial modeling software Aspen Plus® (Aspen Technology, Inc., Burlington, Mass.) may be used in conjunction with physical property databases such as DIPPR, available from American Institute of Chemical Engineers, Inc. (New York, N.Y.) to develop an Aspen model for an integrated product alcohol (e.g., ethanol, butanol) fermentation, purification, and water management process. This process modeling can perform many fundamental engineering calculations, for example, mass and energy balances, vapor/liquid equilibrium, and reaction rate computations. In order to generate an Aspen model, information input may include, for example, experimental data, water content and composition of feedstock, temperature for mash cooking and flashing, saccharification conditions (e.g., enzyme feed, starch conversion, temperature, pressure), fermentation conditions (e.g., microorganism feed, glucose conversion, temperature, pressure), degassing conditions, solvent columns, pre-flash columns, condensers, evaporators, centrifuges, etc. Batch fermentation was modeled as a steady state, continuous process using average compositions and flow rates. Examples 6 to 10 represent Aspen models of the processes described herein.

Example 6. Ethanol Flowsheet

An Aspen model was developed in which corn as feedstock (53400 kg/h) was fermented to produce ethanol with a rigorous material and energy balance. This model included an approximation of sequenced batch fermentations as continuous processes. An example of the fermentation and distillation process is illustrated in FIG. 10 and an example of the evaporation train is illustrated in FIG. 6.

Vapor 901 was vented at atmospheric pressure from fermentation 900 with an average continuous molar composition of 93.6% carbon dioxide, 4.5% water, and 1.9% ethanol, and containing 361 kg/h ethanol. Beer 902 was discharged at 32° C. and 2 atm from the bottom of fermentation vessel 900 with a continuous ethanol concentration of 129 g/L and containing 0.33 wt % dissolved carbon dioxide. The evaporation train generated 28027 kg/hr of water vapor 506 at 94.6° C. and 0.8 atm which provided stripping vapor 903 in beer column 910. Water vapor 918 with flow of 6045 kg/hr at 87° C. and 0.6 atm was flashed from the liquefied mash and injected into side column 970 to provide additional energy for recovering ethanol. An atmospheric pressure gas stream 912 was vented from the distillation process with molar composition 88.5% carbon dioxide, 4.8% water, and 6.7% ethanol, and containing 36 kg/h ethanol. A scrubber was used to process both vapors 901 and 912 with a total alcohol loading of 397 kg/h ethanol. A final ethanol product 914 with a moisture content of 0.08 wt % water was produced at 17939 kg/h.

Example 7. Vacuum Butanol Flash without Heat or Water Addition

An ASPEN model was developed in which corn as feedstock (53400 kg/h) was fermented to produce isobutanol with rigorous material and energy balances. This model included an approximation of sequenced batch fermentations as continuous processes. An example of this fermentation process is illustrated in FIG. 2, an example of the evaporation train is illustrated in FIG. 6, and an example of the distillation process is illustrated in FIG. 8.

Vapor 102 was vented at atmospheric pressure from fermentation 100 with an average continuous molar composition of 94.5% carbon dioxide, 4.7% water and 0.8% isobutanol, and containing 129 kg/h isobutanol. A stream 104 of 3666 tonnes/h combined average flow was removed from the bottom of the fermentation vessel 100 at a constant 32° C. and 2 atm with an average isobutanol concentration of 33.4 g/L and containing 0.26 wt % dissolved carbon dioxide. The pressure of this stream was reduced adiabatically to 0.3 atm (about 4 psia) in pre-flash 110 to produce stream 105 containing 0.03 wt % dissolved carbon dioxide. The pressure of this stream was further reduced adiabatically to 0.0492 atm (about 0.7 psia) in flash 120 at 29.7° C. to result in a stream 103 with an average isobutanol concentration of 31.7 g/L. No liquid water (stream 712) or vapor water (stream 608) were added to the flash 120. The vapors from the pre-flash and flash were processed through a configuration that included one refrigerated contact condenser 130 removing 20.4 GJ/h chilling duty, two centrifugal compressors 140 and 160 drawing 650 kW combined power, and two water coolers 150 and 170 totaling 9.3 GJ/h duty. This processing resulted in a combined liquid condensate stream 117 containing 6516 kg/h isobutanol at a concentration of 40.7 wt % and a vapor stream 115 that was vented at atmospheric pressure with an average continuous molar composition of 92.4% carbon dioxide, 5.5% water, and 2.1% isobutanol, and containing 334 kg/h isobutanol. The mass balance of the flash system is shown in Table 8.

TABLE 8

| | Stream | | | | | | |
|---|---|---|---|---|---|---|---|
| | 104 | 106 | 105 | 712 | 608 | 107 | 103 |
| Temperature, ° C. | 32 | 31.6 | 31.6 | — | — | 29.7 | 29.7 |
| Pressure, atm | 2 | 0.3 | 0.3 | — | — | 0.0492 | 0.0492 |
| Carbon dioxide, kg/hr | 8763 | 7634 | 1129 | — | — | 1120 | 9 |
| Water, kg/hr | 2890370 | 574 | 2889796 | — | — | 9118 | 2880678 |
| Isobutanol, kg/hr | 111994 | 431 | 111563 | — | — | 6418 | 105145 |

Beer 101 was discharged at 32° C. and 2 atm from the bottom of the fermentation vessel 100 containing 7472 kg/h isobutanol at a concentration of 62.5 g/L and containing 0.31 wt % dissolved carbon dioxide. The evaporation train generated 23124 kg/hr of water vapor 506 at 94.8° C. and 0.8 atm which provided stripping vapor 702 in beer column 700. Water vapor 707 with flow of 5947 kg/hr at 87° C. and 0.6 atm was flashed from the liquefied mash and injected into side column 730 to provide additional energy for recovering isobutanol. A gas stream 721 was vented from the distillation process via a vacuum pump with molar composition 78.4% carbon dioxide, 15.7% water, and 5.9% isobutanol, and containing 49 kg/h isobutanol. A scrubber was used to process vapors 102, 115, and 721 with a total alcohol loading of 512 kg/h isobutanol. A final isobutanol product 718 with a moisture content of 0.6 wt % water was produced at 14487 kg/h.

In this example, about 45% of the isobutanol produced in fermentation 100 was removed via stream 117, with most of the remaining production leaving with the beer 101. Without water or steam addition to the flash 120, the maximum isobutanol concentration in fermentation 100 was above 60 g/L. About 87% of the carbon dioxide dissolved in stream 104 was released in pre-flash 110. A nearly 30% higher alcohol loading was imposed on the scrubber of this example than Example 6 where ethanol was produced.

Example 8. Butanol Flash with Hot Water and No Addition of Steam

An ASPEN model was developed in which corn as feedstock (53400 kg/h) was fermented to produce isobutanol with a rigorous material and energy balance. This model included an approximation of sequenced batch fermentations as continuous processes. An example of this fermentation process is illustrated in FIG. 2, an example of the evaporation train is illustrated in FIG. 6, and an example of the distillation process is illustrated in FIG. 8.

Vapor 102 was vented at atmospheric pressure from fermentation 100 with an average continuous molar composition of 94.5% carbon dioxide, 4.7% water, and 0.8% isobutanol, and containing 113 kg/h isobutanol. A stream 104 of 3904 tonnes/h combined average flow was removed from the bottom of the fermentation vessel 100 at a constant 32° C. and 2 atm with an average isobutanol concentration of 30.8 g/L and containing 0.26 wt % dissolved carbon dioxide. The pressure of this stream was reduced adiabatically to 0.3 atm (about 4 psia) in pre-flash 110 to produce stream 105 containing 0.03 wt % dissolved carbon dioxide. The pressure of this stream was further reduced adiabatically to 0.0492 atm (about 0.7 psia) in flash 120 at 29.8° C. to result in a stream 103 with an average isobutanol concentration of 29.2 g/L. Liquid water 712 (9016 kg/h) at 78.8° C. was added to the flash 120. The vapors from the pre-flash and flash were processed through a configuration that included one refrigerated contact condenser 130 removing 21.8 GJ/h chilling duty, two centrifugal compressors 140 and 160 drawing 691 kW combined power, and two water coolers 150 and 170 totaling 9.9 GJ/h duty. This processing resulted in a combined liquid condensate stream 117 comprising 6587 kg/h isobutanol at a concentration of 39.2 wt % and a vapor stream 115 that was vented at atmospheric pressure with an average continuous molar composition of 92.4% carbon dioxide, 5.5% water, and 2.1% isobutanol, and containing 354 kg/h isobutanol. The mass balance of the flash system is shown in Table 9.

the remaining production leaving with the beer 101. Hot water was added to the flash tank to reduce the decline in the fermentation liquid level but without steam addition to the flash 120, the maximum isobutanol concentration in fermentation 100 was still near 60 g/L. About 87% of the carbon dioxide dissolved in stream 104 was released in pre-flash 110. A 31% higher alcohol loading was imposed on the scrubber of this example than Example 6 where ethanol was produced. The mole ratio of isobutanol to carbon dioxide in stream 107 at the inlet to flash condenser 130 is 3.2.

Example 9. Butanol Flash with Hot Water and Addition of Steam

An ASPEN model was developed in which corn as feedstock (53400 kg/h) was fermented to produce isobutanol with a rigorous material and energy balance. This model included an approximation of sequenced batch fermentations as continuous processes. An example of this fermentation process is illustrated in FIG. 2, an example of the evaporation train is illustrated in FIG. 7, and an example of the distillation process is illustrated in FIG. 8.

Vapor 102 was vented at atmospheric pressure from fermentation 100 with an average continuous molar composition of 94.8% carbon dioxide, 4.7% water, and 0.5% isobutanol, and containing 76 kg/h isobutanol. A stream 104 of 3677 tonnes/h combined average flow was removed from the bottom of the fermentation vessel 100 at a constant 32° C. and 2 atm with an average isobutanol concentration of 17.4 g/L and containing 0.26 wt % dissolved carbon dioxide. The pressure of this stream was reduced adiabatically to 0.3 atm (about 4 psia) in pre-flash 110 to produce stream 105

TABLE 9

| | Stream | | | | | | |
|---|---|---|---|---|---|---|---|
| | 104 | 106 | 105 | 712 | 608 | 107 | 103 |
| Temperature, ° C. | 32 | 31.6 | 31.6 | 78.8 | — | 29.8 | 29.8 |
| Pressure, atm | 2 | 0.3 | 0.3 | 1 | — | 0.0492 | 0.0492 |
| Carbon dioxide, kg/hr | 9306 | 8105 | 1201 | 0 | — | 1191 | 10 |
| Water, kg/hr | 3118270 | 609 | 3117661 | 9005 | — | 9843 | 3116823 |
| Isobutanol, kg/hr | 110638 | 432 | 110206 | 11 | — | 6510 | 103707 |

Beer 101 was discharged at 32° C. and 2 atm from the bottom of the fermentation vessel 100 containing 7425 kg/h isobutanol at a concentration of 58 g/L and containing 0.31 wt % dissolved carbon dioxide. The evaporation train generated 23128 kg/hr of water vapor 506 at 94.7° C. and 0.8 atm which provided stripping vapor 702 in beer column 700. Water vapor 707 with flow of 5978 kg/hr at 87° C. and 0.6 atm was flashed from the liquefied mash and injected into side column 730 to provide additional energy for recovering isobutanol. A gas stream 721 was vented from the distillation process via a vacuum pump with molar composition 78.4% carbon dioxide, 15.7% water, and 5.9% isobutanol, and containing 52 kg/h isobutanol. A scrubber was used to process vapors 102, 115, and 721 with a total alcohol loading of 519 kg/h isobutanol. A final isobutanol product 718 with a moisture content of less than 0.1 wt % water was produced at 14432 kg/h.

In this example, about 45% of the isobutanol produced in fermentation 100 was removed via stream 117, with most of comprising 0.03 wt % dissolved carbon dioxide. The pressure of this stream was further reduced adiabatically to 0.0452 atm (about 0.7 psia) in flash 120 at 29.7° C. to result in a stream 103 with an average isobutanol concentration of 14.4 g/L. Liquid water 712 (9008 kg/h) at 84.1° C. and 19319 kg/h of water vapor 608 at 77.2° C. were added to the flash 120. The vapors from the pre-flash and flash were processed through a configuration that included one refrigerated contact condenser 130 removing 63.8 GJ/h chilling duty, two centrifugal compressors 140 and 160 drawing 1030 kW combined power, and two water coolers 150 and 170 totaling 18.1 GJ/h duty. This processing resulted in a combined liquid condensate stream 117 containing 10531 kg/h isobutanol at a concentration of 26.5 wt % and a vapor stream 115 that was vented at atmospheric pressure with an average continuous molar composition of 92.4% carbon dioxide, 5.5% water, and 2.1% isobutanol, and containing 339 kg/h isobutanol. The mass balance of the flash system is shown in Table 10.

TABLE 10

| | Stream | | | | | | |
|---|---|---|---|---|---|---|---|
| | 104 | 106 | 105 | 712 | 608 | 107 | 103 |
| Temperature, °C. | 32 | 31.7 | 31.7 | 84.1 | 77.2 | 29.8 | 29.8 |
| Pressure, atm | 2 | 0.3 | 0.3 | 1 | 0.4 | 0.0492 | 0.0492 |
| Carbon dioxide, kg/hr | 8914 | 7752 | 1162 | 0 | 0 | 1159 | 3 |
| Water, kg/hr | 3117680 | 582 | 3117098 | 9008 | 19319 | 28836 | 3116589 |
| Isobutanol, kg/hr | 58949 | 261 | 58688 | 0 | 0 | 10609 | 48079 |

Beer 101 was discharged at 32° C. and 2 atm from the bottom of the fermentation vessel 100 containing 3500 kg/h isobutanol at a concentration of 28.7 g/L and comprising 0.29 wt % dissolved carbon dioxide. The evaporation train generated 19319 kg/hr of water vapor 608 at 77.2° C. and 0.4 atm which provided vaporization energy to flash 120. Low pressure steam 702 (11239 kg/h) was generated at 84° C. and 0.55 atm from waste heat in the process and used as stripping vapor in beer column 700. Water vapor 707 with flow of 5901 kg/hr at 87° C. and 0.6 atm was flashed from the liquefied mash and injected into side column 730 to provide additional energy for recovering isobutanol. A gas stream 721 was vented from the distillation process via a vacuum pump with molar composition 81.1% carbon dioxide, 13.7% water, and 5.2% isobutanol, and containing 40 kg/h isobutanol. A scrubber was used to process vapors 102, 115, and 721 with a total alcohol loading of 455 kg/h isobutanol. A final isobutanol product 718 with a moisture content of less than 0.1 wt % water was produced at 14365 kg/h.

In this example, about 73% of the isobutanol produced in the fermentation vessels was removed via stream 117, with most of the remaining production leaving with the beer 101. Hot water was added to the flash tank to reduce the decline in the fermentation liquid level and because steam was added to the flash tank to vaporize a portion of the isobutanol contained in the fermentation liquid, the maximum isobutanol concentration in fermentation 100 was below 30 g/L and the average isobutanol concentration in fermentation 100 was below 20 g/L. About 87% of the carbon dioxide dissolved in stream 104 was released in pre-flash 110. A 15% higher alcohol loading was imposed on the scrubber of this example than Example 6 where ethanol was produced. The mole ratio of isobutanol to carbon dioxide in stream 107 at the inlet to flash condenser 130 is 5.4.

Example 10. Butanol Flash with Hot Water, Steam Addition, and Staged Rejection of Carbon Dioxide An ASPEN model was developed in which corn as feedstock (53400 kg/h) was fermented to produce isobutanol with a rigorous material and energy balance. This model included an approximation of sequenced batch fermentations as continuous processes. An example of this fermentation process is illustrated in FIG. 4, an example of the evaporation train is illustrated in FIG. 7, and an example of the distillation process is illustrated in FIG. 8.

Vapor 302 was vented at atmospheric pressure from fermentation 300 with an average continuous molar composition of 94.7% carbon dioxide, 4.7% water, and 0.5% isobutanol, and containing 97 kg/h isobutanol. A stream 304 of 3695 tonnes/h combined average flow was removed from the bottom of fermentation vessel 300 at a constant 32° C. and 2 atm with an average isobutanol concentration of 22.3 g/L and comprising 0.26 wt % dissolved carbon dioxide. The pressure of this stream was reduced adiabatically to 1 atm (about 14 psia) and contacted with recompressed flash vapor in spray tower 310 to produce stream 307 containing 0.13 wt % dissolved carbon dioxide. The pressure of this stream was reduced adiabatically to 0.3 atm (about 4 psia) and contacted with recompressed flash vapor in spray tower 330 to produce stream 311 containing 0.03 wt % dissolved carbon dioxide. The pressure of this stream was further reduced adiabatically to 0.04635 atm (about 0.7 psia) in flash 350 at 29.8° C. to result in a stream 303 with an average isobutanol concentration of 19.5 g/L. Liquid water 712 (9008 kg/h) at 84.1° C. and 15547 kg/h of water vapor 608 at 77.2° C. were added to the flash 350. The vapors from the pre-flash and flash were processed through a configuration that included one refrigerated contact condenser 130 removing 71.1 GJ/h chilling duty and two centrifugal compressors 140 and 160 drawing 650 kW combined power. This processing resulted in a combined liquid condensate stream 314 containing 10147 kg/h isobutanol at a concentration of 27.8 wt % and a vapor stream 305 that was vented at atmospheric pressure with an average continuous molar composition of 94.7% carbon dioxide, 4.7% water, and 0.6% isobutanol, and containing 100 kg/h isobutanol.

The mass balance of the flash system is shown in Table 11.

TABLE 11

| | Stream | | | | | | | | | | |
|---|---|---|---|---|---|---|---|---|---|---|---|
| | 304 | 306 | 305 | 307 | 309 | 308 | 311 | 712 | 608 | 312 | 303 |
| Temperature, °C. | 32 | 149.7 | 31.9 | 31.9 | 157.4 | 32.6 | 32.6 | 84.1 | 77.2 | 29.8 | 29.8 |
| Pressure, atm | 2 | 1 | 1 | 1 | 0.3 | 0.3 | 0.3 | 1 | 0.4 | 0.04635 | 0.04635 |
| Carbon dioxide, kg/hr | 8738 | 4277 | 8734 | 4281 | 1099 | 4277 | 1103 | 0 | 0 | 1100 | 3 |
| Water, kg/hr | 3098680 | 344 | 177 | 3098847 | 2845 | 344 | 3101348 | 9008 | 15547 | 29149 | 3096754 |
| Isobutanol, kg/hr | 75637 | 204 | 100 | 75741 | 4047 | 204 | 79584 | 0 | 0 | 14194 | 65390 |

Beer 301 was discharged at 32° C. and 2 atm from the bottom of fermentation vessel 300 containing 4104 kg/h isobutanol at a concentration of 33.5 g/L and containing 0.28 wt % dissolved carbon dioxide. The evaporation train generated 15547 kg/hr of water vapor 608 at 77.2° C. and 0.4 atm which provided vaporization energy to flash 350. Low pressure steam 702 (11239 kg/h) was generated at 84° C. and 0.55 atm from waste heat in the process and used as stripping vapor in beer column 700. Water vapor 707 with flow of 5924 kg/hr at 87° C. and 0.6 atm was flashed from the liquefied mash and injected into side column 730 to provide additional energy for recovering isobutanol. A gas stream 721 was vented from the distillation process via a vacuum pump with molar composition 81.1% carbon dioxide, 13.7% water, and 5.2% isobutanol, and containing 37 kg/h isobutanol. A scrubber was used to process vapors 302, 305 and 721 with a total alcohol loading of 234 kg/h isobutanol. A final isobutanol product 718 with a moisture content of less than 0.1 wt % water was produced at 14391 kg/h.

In this example, about 70% of the isobutanol produced in the fermentation vessel was removed via stream 314, with most of the remaining production leaving with the beer 301. Hot water was added to the flash tank to reduce the decline in the fermentation liquid level and because steam was added to the flash tank to vaporize a portion of the isobutanol contained in the fermentation liquid, the maximum isobutanol concentration in the fermentation vessel was below 35 g/L and the average isobutanol concentration in the fermentation vessel was below 25 g/L. About 87% of the carbon dioxide dissolved in stream 304 was released prior to entering flash 350. A 41% lower alcohol loading was imposed on the scrubber of this example than Example 6 where ethanol was produced. The mole ratio of isobutanol to carbon dioxide in stream 312 at the inlet to flash condenser 360 is 7.7. Isobutanol recovery was made simpler with this higher concentration ratio to non-condensibles (carbon dioxide). The counter-current cascade of carbon dioxide vapor from the flash through the pre-flash steps reduced the amount of isobutanol vented to the scrubber and provided some of the energy required in the flash to increase butanol vaporization.

Also, as illustrated in the Examples, the processes described herein provide a means to maintain the concentration of product alcohol in the fermentation vessel at a concentration that may minimize the inhibitory effects of the product alcohol on the microorganism.

Example 11. Dynamic Model of Butanol Batch Fermentation and Flash Process

A dynamic model of an isobutanol batch fermentation and flash process was developed in Microsoft Office® Excel 3, 2003 SP3 (Microsoft Incorporated, Seattle Wash.)

Figure 14:
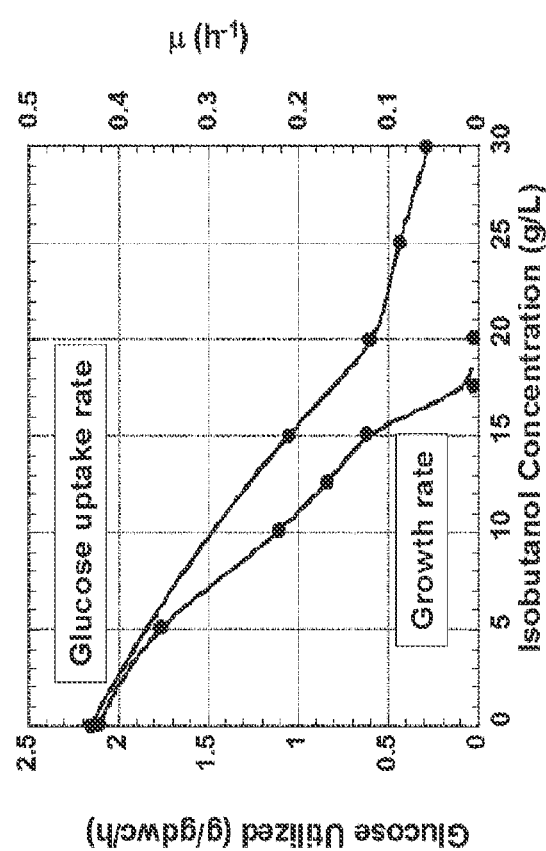
FIG. 14 shows the glucose uptake rate and cell growth rate during a butanol fermentation and flash process.
Figure 15:
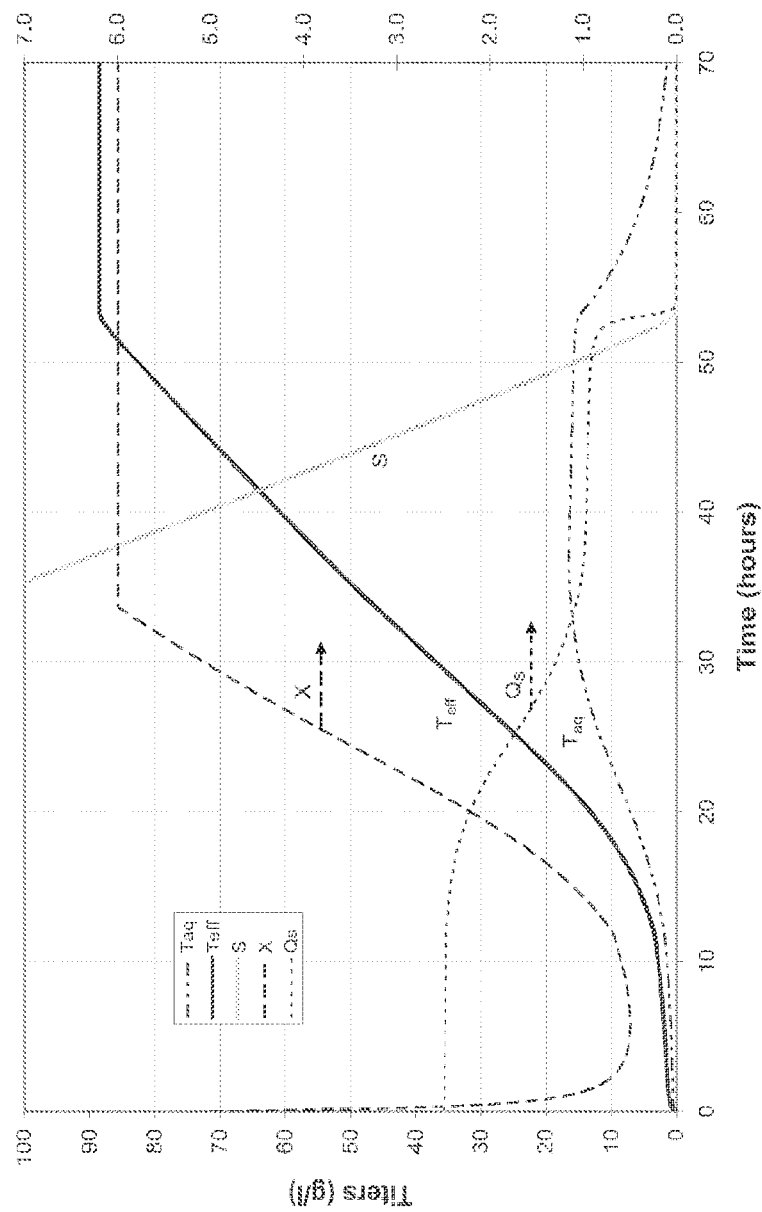
FIG. 15 illustrates output from a dynamic model when the flash was initiated at time zero.

This model included measured data on glucose uptake rate and cell growth rate as a function of isobutanol concentration at 32° C. (FIG. 14). It also included vapor liquid equilibrium data for the system isobutanol and water at relevant temperatures. These data were combined with a process equipment specification which defined fermentation batch size and allowed specification of the fraction of propagation tank (cell dry weight) charge, isobutanol flashed per pass, the circulation rate of the flash loop, and the time in the batch cycle when the flash was started. This model was operated with inputs of 0.288 g wet corn per gram feed, 0.0155 corn moisture, 0.72 corn starch content, 378.5 kg dry cell charge, 12 hour charge feed time, 807000 gallons fermentation vessel volume, 22,500 gallons per minute circulation rate through the flash and 7.5% per pass butanol removal. FIG. 15 illustrates output from the model with flash started at time zero in the fermentation cycle. This model was run with different assumed start times to produce the following results in Table 12.

TABLE 12

| Assumed Start of Flash (hr) | Minimum Time to Complete Fermentation (hr) | Isobutanol Concentration |
|---|---|---|
| 0 | 54.2 | 0 |
| 10 | 54.9 | 2.7 |
| 20 | 57.6 | 11.2 |
| 30 | 65.4 | 20.6 |

These results illustrate that starting the flash process ten hours after the start of the fermentation lengthens the cycle time only 0.7 hours, twenty hours after the start of the fermentation lengthens cycle time 3.4 hours, and thirty hours after the start of the fermentation lengthens cycle time 11.2 hours.

While various embodiments of the present invention have been described herein, it should be understood that they have been presented by way of example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

The invention claimed is:

1. A method for removing a product alcohol from a fermentation broth comprising:
   (a) at least partially vaporizing a fermentation broth or a portion thereof to form one or more vapor streams, wherein the vaporizing comprises:
      (i) vaporizing the fermentation broth or a portion thereof by one or more pre-flashes; and
      (ii) vaporizing the fermentation broth or a portion thereof by a flash;
   wherein the vapor streams comprise one or more components selected from product alcohol, water, and carbon dioxide;
   (b) contacting the one or more vapor streams with an absorption liquid selected from fatty acids, fatty esters, 2-ethyl hexanol, isolauryl alcohol, isocetyl alcohol, oleyl alcohol, phenol, glycerol, glycol, dialkyl acetamide, N,N-bis(2-ethylhexyl) acetamide, di-isobutyl isobutyramide, tri-butyl phosphate, tri-isobutyl phosphate, potassium carbonate, and mixtures thereof, wherein at least a portion of the one or more vapor streams is absorbed into the absorption liquid to form an absorption liquid phase; and
   (c) recovering the product alcohol from the absorption liquid phase.

2. The method of claim 1, wherein pressure of the flash is lower than pressure of the one or more pre-flashes.

3. The method of claim 1, further comprising sparging the one or more pre-flashes with a non-condensible gas.

4. The method of claim 1, further comprising heating the fermentation broth of step (a)(i).

5. The method of claim 1, further comprising compressing the non-absorbed vapor stream.

6. The method of claim 1, further comprising distilling the absorption liquid phase comprising the one or more absorbed vapor streams to remove at least a portion of product alcohol, water, and carbon dioxide from the absorption liquid.

7. A method for removing a product alcohol from a fermentation broth comprising:
- (a) at least partially vaporizing a fermentation broth or a portion thereof to form one or more vapor streams, wherein the vaporizing comprises:
  - (i) optionally vaporizing the fermentation broth or a portion thereof in a first pre-flash at a first pressure P1;
  - (ii) vaporizing the fermentation broth or a portion thereof in a second pre-flash at a second pressure P2; and
  - (iii) vaporizing the fermentation broth or a portion thereof in a flash at a third pressure P3;
  wherein the one or more vapor streams comprise product alcohol, water, and carbon dioxide;
- (b) contacting the one or more vapor streams with an absorption liquid selected from fatty acids, fatty esters, 2-ethyl hexanol, isolauryl alcohol, isocetyl alcohol, oleyl alcohol, phenol, glycerol, glycol, dialkyl acetamide, N,N-bis(2-ethylhexyl) acetamide, di-isobutyl isobutyramide, tri-butyl phosphate, tri-isobutyl phosphate, potassium carbonate, and mixtures thereof, under vacuum conditions wherein at least a portion of the one or more vapor streams is absorbed into the absorption liquid to form an absorption liquid phase; and
- (c) recovering the product alcohol from the absorption liquid phase.

8. The method of claim 7, wherein the third pressure P3 is lower than the second pressure P2.

9. The method of claim 7, further comprising
distilling the absorption liquid phase comprising the one or more absorbed vapor streams to remove at least a portion of product alcohol, water, and carbon dioxide from the absorption liquid.

10. The method of claim 7, further comprising sparging the first pre-flash with a non-condensible gas.

11. The method of claim 7, further comprising heating the fermentation broth of step (a)(ii).

12. The method of claim 7, further comprising compressing the non-absorbed vapor stream.

\* \* \* \* \*